US008832809B2

(12) United States Patent
Paulsen et al.

(10) Patent No.: US 8,832,809 B2
(45) Date of Patent: Sep. 9, 2014

(54) SYSTEMS AND METHODS FOR REGISTERING A USER ACROSS MULTIPLE WEBSITES

(75) Inventors: Kobus Paulsen, Kent (GB); Christopher D. Thom, Wilton, CT (US); Ian Hughes, Gwyneed (GB); Mark Holland, West Sussex (GB)

(73) Assignee: UC Group Limited, London (GB)

( * ) Notice: Subject to any disclaimer, the term of this patent is extended or adjusted under 35 U.S.C. 154(b) by 0 days.

(21) Appl. No.: 13/485,252

(22) Filed: May 31, 2012

(65) Prior Publication Data
US 2012/0311684 A1 Dec. 6, 2012

Related U.S. Application Data

(60) Provisional application No. 61/520,164, filed on Jun. 3, 2011.

(51) Int. Cl.
*G06F 7/04* (2006.01)
*G06F 15/16* (2006.01)
*G06F 17/30* (2006.01)
*H04L 29/06* (2006.01)
*H04M 15/00* (2006.01)
*G06Q 20/40* (2012.01)
*G06F 21/44* (2013.01)
*H04L 29/08* (2006.01)

(52) U.S. Cl.
CPC ........... *H04L 63/0815* (2013.01); *H04M 15/58* (2013.01); *G06Q 20/4014* (2013.01); *G06F 21/44* (2013.01); *H04L 63/168* (2013.01); *G06Q 20/4018* (2013.01); *H04L 67/02* (2013.01); *H04L 63/107* (2013.01); *H04L 63/1425* (2013.01)
USPC ............................................................ 726/6

(58) Field of Classification Search
CPC ....................................................... G06F 21/44
USPC ................................................................ 726/6
See application file for complete search history.

(56) References Cited

U.S. PATENT DOCUMENTS

| 5,530,438 A | 6/1996 | Bickham et al. |
| 5,777,305 A | 7/1998 | Smith et al. |

(Continued)

FOREIGN PATENT DOCUMENTS

| EP | 1330098 A1 | 7/2003 |
| GB | 2362242 A | 11/2001 |

(Continued)

OTHER PUBLICATIONS

International Searching Authority, Invitation to Pay Additional Fees and, Where Applicable, Protest Fee, including Partial Search Report, for International Application No. PCT/US2012/040241, mailed Oct. 1, 2012, 5 pages, European Patent Office, The Netherlands.

(Continued)

*Primary Examiner* — Christopher Revak
*Assistant Examiner* — Jason C Chiang
(74) *Attorney, Agent, or Firm* — Alston & Bird LLP

(57) ABSTRACT

Various embodiments provide systems for registering a user with one or more websites. Such systems comprise at least one processor configured to: receive an IP address for a computing device being used by the user; and after receiving the IP address: (1) obtain a location associated with the IP address; and (2) identify whether the user is in a jurisdiction that permits the user to register with a website. The systems may then receive one or more parameters obtained from the user, upon which the systems verify an age of the user; determine which of the one or more types of transaction activities the user is permitted to conduct; query one or more registration attempts over a predetermined previous time period to identify duplicate or similar parameters; and verify the user's identity based at least on one of the one or more parameters. Associated methods are also provided.

20 Claims, 14 Drawing Sheets

(56) References Cited

U.S. PATENT DOCUMENTS

| | | | |
|---|---|---|---|
| 5,799,283 A | 8/1998 | Francisco et al. | |
| 5,825,881 A | 10/1998 | Colvin, Sr. | |
| 5,903,878 A | 5/1999 | Talati et al. | |
| 5,949,876 A | 9/1999 | Ginter et al. | |
| 6,029,150 A | 2/2000 | Kravitz | |
| 6,029,154 A | 2/2000 | Pettitt | |
| 6,157,871 A | 12/2000 | Terranova | |
| 6,389,402 B1 | 5/2002 | Ginter et al. | |
| 6,454,650 B1* | 9/2002 | Aronin | 463/17 |
| 6,468,155 B1 | 10/2002 | Zucker et al. | |
| 6,629,890 B2 | 10/2003 | Johnson | |
| 6,904,408 B1 | 6/2005 | McCarthy et al. | |
| 6,993,502 B1 | 1/2006 | Gryglewicz et al. | |
| 7,124,101 B1 | 10/2006 | Mikurak | |
| 7,229,354 B2* | 6/2007 | McNutt et al. | 463/29 |
| 7,263,506 B2 | 8/2007 | Lee et al. | |
| 7,275,685 B2 | 10/2007 | Gray et al. | |
| 7,296,003 B2 | 11/2007 | Mersky et al. | |
| 7,305,350 B1 | 12/2007 | Bruecken | |
| 7,403,922 B1 | 7/2008 | Lewis et al. | |
| 7,548,886 B2 | 6/2009 | Kirkland et al. | |
| 7,575,157 B2 | 8/2009 | Barnhardt et al. | |
| 7,577,847 B2* | 8/2009 | Nguyen et al. | 713/186 |
| 7,591,413 B1 | 9/2009 | Block et al. | |
| 7,680,736 B2 | 3/2010 | Jarman et al. | |
| 7,828,652 B2* | 11/2010 | Nguyen et al. | 463/29 |
| 7,865,414 B2 | 1/2011 | Fung et al. | |
| 7,941,370 B2 | 5/2011 | Paulsen et al. | |
| 7,973,655 B2* | 7/2011 | Blinnikka et al. | 340/539.13 |
| 2001/0001321 A1 | 5/2001 | Resnick et al. | |
| 2001/0032878 A1 | 10/2001 | Tsiounis et al. | |
| 2001/0037290 A1 | 11/2001 | Lai | |
| 2001/0039535 A1 | 11/2001 | Tsiounis et al. | |
| 2001/0044787 A1 | 11/2001 | Shwartz et al. | |
| 2001/0056487 A1* | 12/2001 | Yoo | 709/225 |
| 2002/0002075 A1 | 1/2002 | Rowe | |
| 2002/0029194 A1 | 3/2002 | Lewis et al. | |
| 2002/0032905 A1* | 3/2002 | Sherr et al. | 725/38 |
| 2002/0052754 A1 | 5/2002 | Joyce et al. | |
| 2002/0055909 A1* | 5/2002 | Fung et al. | 705/42 |
| 2002/0077837 A1 | 6/2002 | Krueger et al. | |
| 2002/0099649 A1 | 7/2002 | Lee et al. | |
| 2002/0099809 A1* | 7/2002 | Lee | 709/223 |
| 2002/0116302 A1 | 8/2002 | Wilmes et al. | |
| 2002/0133466 A1 | 9/2002 | Pugh | |
| 2002/0139837 A1 | 10/2002 | Spitz et al. | |
| 2002/0143566 A1 | 10/2002 | Diveley | |
| 2002/0161707 A1 | 10/2002 | Cole et al. | |
| 2003/0045358 A1 | 3/2003 | Leen et al. | |
| 2003/0065571 A1 | 4/2003 | Dutta | |
| 2003/0070100 A1* | 4/2003 | Winkler | 713/202 |
| 2003/0097303 A1 | 5/2003 | Agee et al. | |
| 2003/0125973 A1 | 7/2003 | Mathews et al. | |
| 2003/0191709 A1 | 10/2003 | Elston et al. | |
| 2004/0019543 A1 | 1/2004 | Blagg et al. | |
| 2004/0044739 A1 | 3/2004 | Ziegler | |
| 2004/0082384 A1 | 4/2004 | Walker et al. | |
| 2004/0098337 A1 | 5/2004 | Gudgeon et al. | |
| 2004/0121841 A1* | 6/2004 | Xidos et al. | 463/40 |
| 2004/0128546 A1 | 7/2004 | Blakley, III et al. | |
| 2004/0147320 A1 | 7/2004 | Schmidt et al. | |
| 2004/0153444 A1 | 8/2004 | Senders et al. | |
| 2004/0215560 A1 | 10/2004 | Amalraj et al. | |
| 2004/0225901 A1* | 11/2004 | Colvin | 713/202 |
| 2004/0230490 A1 | 11/2004 | Barsade et al. | |
| 2004/0243832 A1 | 12/2004 | Wilf et al. | |
| 2004/0254868 A1 | 12/2004 | Kirkland et al. | |
| 2005/0010574 A1 | 1/2005 | Vaught | |
| 2005/0021853 A1 | 1/2005 | Parekh et al. | |
| 2005/0033653 A1 | 2/2005 | Eisenberg et al. | |
| 2005/0086255 A1 | 4/2005 | Schran et al. | |
| 2005/0097046 A1 | 5/2005 | Singfield | |
| 2005/0137987 A1 | 6/2005 | May et al. | |
| 2005/0187020 A1* | 8/2005 | Amaitis et al. | 463/42 |
| 2006/0010252 A1 | 1/2006 | Miltonberger et al. | |
| 2006/0047571 A1 | 3/2006 | Garcia et al. | |
| 2006/0085275 A1 | 4/2006 | Stokes et al. | |
| 2006/0095350 A1 | 5/2006 | Hall et al. | |
| 2006/0143119 A1 | 6/2006 | Krueger et al. | |
| 2006/0151598 A1 | 7/2006 | Chen et al. | |
| 2006/0212407 A1 | 9/2006 | Lyon | |
| 2006/0268319 A1 | 11/2006 | Winkel et al. | |
| 2006/0282365 A1 | 12/2006 | Lutnick et al. | |
| 2007/0094150 A1 | 4/2007 | Yuen et al. | |
| 2007/0106603 A1 | 5/2007 | Whyte et al. | |
| 2007/0136189 A1 | 6/2007 | German et al. | |
| 2007/0250392 A1 | 10/2007 | Paulsen et al. | |
| 2007/0250440 A1 | 10/2007 | Paulsen et al. | |
| 2007/0250441 A1 | 10/2007 | Paulsen et al. | |
| 2008/0040275 A1 | 2/2008 | Paulsen et al. | |
| 2008/0072305 A1 | 3/2008 | Casado et al. | |
| 2008/0215472 A1 | 9/2008 | Brown | |
| 2008/0222707 A1 | 9/2008 | Pathuri et al. | |
| 2008/0265020 A1 | 10/2008 | Copeland et al. | |
| 2008/0290154 A1 | 11/2008 | Barnhardt et al. | |
| 2009/0125430 A1 | 5/2009 | Krueger et al. | |
| 2009/0132405 A1 | 5/2009 | Scipioni et al. | |
| 2009/0138398 A1 | 5/2009 | Cole et al. | |
| 2009/0150254 A1 | 6/2009 | Dickelman | |
| 2009/0150262 A1 | 6/2009 | Mizhen | |
| 2009/0176558 A1 | 7/2009 | Englman et al. | |
| 2009/0187508 A1* | 7/2009 | Placide | 705/72 |
| 2009/0189736 A1* | 7/2009 | Hayashi | 340/5.81 |
| 2009/0327010 A1 | 12/2009 | Vadhri | |
| 2010/0057598 A1 | 3/2010 | Bercy et al. | |
| 2010/0153529 A1 | 6/2010 | Moser | |
| 2010/0312676 A1 | 12/2010 | Muthukumaran | |
| 2011/0125843 A1* | 5/2011 | Paulino | 709/204 |
| 2011/0276475 A1 | 11/2011 | Godejohn et al. | |
| 2012/0113901 A1 | 5/2012 | Jackson et al. | |
| 2012/0158541 A1 | 6/2012 | Ganti et al. | |

FOREIGN PATENT DOCUMENTS

| | | |
|---|---|---|
| GB | 2366007 A | 2/2002 |
| GB | 2366007 B | 7/2004 |
| JP | 09-244976 | 9/1997 |
| JP | 2002000889 A | 1/2002 |
| JP | 2004016252 | 1/2004 |
| JP | 2004-524599 A | 8/2004 |
| JP | 2004305390 A | 11/2004 |
| JP | 2006-285329 A | 10/2006 |
| SG | 104342 A1 | 6/2004 |
| WO | WO 00/36522 A1 | 6/2000 |
| WO | WO 00/49554 A2 | 8/2000 |
| WO | WO 01/18712 A1 | 3/2001 |
| WO | WO 01/33522 A1 | 5/2001 |
| WO | WO 01/45008 A1 | 6/2001 |
| WO | WO 01/77959 A1 | 10/2001 |
| WO | WO 01/33522 A9 | 5/2002 |
| WO | WO 02-37219 A2 | 5/2002 |
| WO | WO 00/49554 A8 | 10/2002 |
| WO | WO 02/097563 A2 | 12/2002 |
| WO | WO 02/097563 A3 | 3/2003 |
| WO | WO 03/032219 A1 | 4/2003 |
| WO | WO 2004/084113 A1 | 9/2004 |
| WO | WO 2005/022453 A1 | 3/2005 |
| WO | WO 2005/065038 A2 | 7/2005 |
| WO | WO 2006/034205 A2 | 3/2006 |
| WO | WO 2006/034205 A3 | 6/2006 |
| WO | WO 2005/065038 A3 | 11/2006 |
| WO | WO 2007/002702 A2 | 1/2007 |
| WO | WO 01/77959 A9 | 8/2007 |
| WO | WO 2007/091844 A1 | 8/2007 |
| WO | WO 2007/125316 A2 | 11/2007 |
| WO | WO 2007/125316 A3 | 4/2008 |
| WO | WO 2008/105685 A1 | 9/2008 |
| WO | WO 2009/094397 A2 | 7/2009 |
| WO | WO 2010/060438 A1 | 6/2010 |

OTHER PUBLICATIONS

International Searching Authority, International Search Report and Written Opinion for International Application No. PCT/US2012/

(56) References Cited

OTHER PUBLICATIONS 040241, mailed Nov. 30, 2012, 21 pages, The Netherlands.
International Preliminary Examining Authority, International Preliminary Report on Patentability for PCT/GB2007/001513, mailed Dec. 17, 2008, 38 pages, European Patent Office, The Netherlands.
International Searching Authority, International Search Report and Written Opinion for PCT/GB2007/001513, mailed Feb. 20, 2008, 24 pages, European Patent Office, The Netherlands.
International Searching Authority, International Search Report and Written Opinion for International Application No. PCT/GB2009/002532, mailed Apr. 15, 2010, European Patent Office, The Netherlands.
International Preliminary Examining Authority, International Preliminary Report on Patentability for Application No. PCT/GB2009/002532, mailed Feb. 9, 2011, 24 pages, European Patent Office, Germany.
United States Patent and Trademark Office, Office Action for U.S. Appl. No. 11/609,775, mailed Mar. 30, 2010, 22 pages, USA.
United States Patent and Trademark Office, Office Action for U.S. Appl. No. 11/609,775, mailed Sep. 15, 2010, 8 pages, USA.
United States Patent and Trademark Office, Office Action for U.S. Appl. No. 11/609,775, mailed Dec. 27, 2010, 7 pages, USA.
United States Patent and Trademark Office, Notice of Allowance and Fee(s) Due for U.S. Appl. No. 11/609,775, mailed Jul. 26, 2011, 7 pages, USA.
United States Patent and Trademark Office, Notice of Allowance and Fee(s) Due for U.S. Appl. No. 11/609,775, mailed Oct. 5, 2011, 9 pages, USA.
United States Patent and Trademark Office, Office Action for U.S. Appl. No. 11/609,779, mailed May 29, 2008, 13 pages, USA.
United States Patent and Trademark Office, Office Action for U.S. Appl. No. 11/609,779, mailed Nov. 14, 2008, 19 pages, USA.
United States Patent and Trademark Office, Office Action for U.S. Appl. No. 11/609,779, mailed Apr. 22, 2009, 22 pages, USA.
United States Patent and Trademark Office, Office Action for U.S. Appl. No. 11/609,779, mailed Sep. 2, 2009, 22 pages, USA.
United States Patent and Trademark Office, Office Action for U.S. Appl. No. 11/609,779, mailed Jan. 6, 2010, 19 pages, USA.
United States Patent and Trademark Office, Office Action for U.S. Appl. No. 11/609,779, mailed Jun. 22, 2010, 22 pages, USA.
United States Patent and Trademark Office, Notice of Allowance and Fee(s) Due for U.S. Appl. No. 11/609,779, mailed Jan. 6, 2011, 8 pages, USA.
United States Patent and Trademark Office, Office Action for U.S. Appl. No. 11/609,785, mailed Sep. 14, 2009, 27 pages, USA.
United States Patent and Trademark Office, Office Action for U.S. Appl. No. 11/609,785, mailed Mar. 16, 2010, 16 pages, USA.
United States Patent and Trademark Office, Office Action for U.S. Appl. No. 11/609,792, mailed Oct. 8, 2008, 15 pages, USA.
United States Patent and Trademark Office, Office Action for U.S. Appl. No. 11/609,792, mailed May 14, 2009, 22 pages, USA.
United States Patent and Trademark Office, Office Action for U.S. Appl. No. 11/609,792, mailed Oct. 14, 2009, 30 pages, USA.
United States Patent and Trademark Office, Office Action for U.S. Appl. No. 11/609,792, mailed Mar. 17, 2010, 21 pages, USA.
United States Patent and Trademark Office, Office Action for U.S. Appl. No. 11/609,792, dated Sep. 20, 2010, 15 pages, USA.
United States Patent and Trademark Office, Office Action for U.S. Appl. No. 11/609,792, dated Feb. 24, 2011, 38 pages, USA.
United States Patent and Trademark Office, Office Action for U.S. Appl. No. 11/609,792, mailed Jul. 7, 2011, 42 pages, USA.
United States Patent and Trademark Office, Office Action for U.S. Appl. No. 11/609,792, dated Nov. 8, 2011, 54 pages, USA.
United States Patent and Trademark Office, Office Action for U.S. Appl. No. 12/257,883, mailed Mar. 22, 2011, 124 pages, USA.
United States Patent and Trademark Office, Office Action U.S. Appl. No. 12/257,883, mailed Sep. 8, 2011, 31 pages, USA.
State Intellectual Property Office of the People's Republic of China, Notification of the First Office Action for Application No. 200780023244.X, Dec. 27, 2010, 6 pages, China.

State Intellectual Property Office of the People's Republic of China, Notification of the Second Office Action for Application No. 200780023244.X, dated Mar. 23, 2012, 15 pages, China.
Japan Patent Office, Office Action for Application No. 2009-507154, dated Sep. 2, 2011, 4 pages, Japan.
Japan Patent Office, Decision of Rejection for Application No. 2009-507154, dated Dec. 26, 2011, 4 pages, Japan.
European Patent Office, Extended European Search Report for Application No. 11169023.6, dated Jul. 20, 2011, 8 pages, The Netherlands.
Unknown, Authorize.Net—"How It Works" Diagram; available at http://www.authorize.net/resources/howitworksdiagram, Oct. 10, 2006, 1 page, Lightbridge, Inc., USA.
Baker, Michael B., "Selecting a Corporate Payment System", Business Travel News, Apr. 24, 2006, p. 89(7),vol. 23, No. 7, Northstar Travel Media, USA.
Banasiak, Michael, "Behavior Scoring (credit management)", Business Credit (Magazine), Mar. 1, 2001, 5 pages, USA.
Cole, Joe, "Merchant Account Reserve," printed Feb. 11, 2009, 4 pages, Ezine Articles, Internet-and-Businesses-Online/Ecommerce, http://ezinearticles.com/?Merchant-Account-Reserve&id=1249597.
Unknown, "Credit Card Fraud Prevention Using ASP and COM Technology", Hexa Software Development Center, 2002-2003, pp. 1-4, Malaysia.
Unknown, "Do you want to know where your Internet visitors are coming from? Which country? Which state? Which city? Which ISP?", IP2Location, http://web.archive.org/web/20050424080032/http://www.ip2location.com, Apr. 24, 2005, pp. 1-7, retrieved Jan. 8, 2008, Malaysia.
Unknown, "Do you want to know where your Internet visitors are coming from? Which country? Which state? Which city? Which ISP?", IP2Location, http://web.archive.org/web/20060424142741/http://www.ip2location.com, IP2 Location, Apr. 24, 2006, pp. 1-9, retrieved Jan. 8, 2008, Malaysia.
Herrera, Sebastian, "Method for Geolocation Based on the Unique Identifier Information of an Electronic Device Detected by the First Router in a Network.Connection. Georanking"; IP.com, May 24, 2007, 23 pages, New York.
Unknown, "Introduction," IP2Location, http://www.ip2location.com, Apr. 24, 2006, pp. 1-4, Malaysia.
Webster's Ninth New Collegiate Dictionary 1988, Definition of "associate", p. 110, Merriam-Webster Inc., USA.
Wolfe, Daniel, "IP Address Analysis Becoming a Bigger Fraud-Detection Tool", American Banker, May 19, 2005, p. 17, vol. 170, No. 96, USA.
Vallerius, Bradley, "U.S. Online Gambling Prohibition Likely Not Enforceable", Oct. 5, 2006, 2 pages, http://www.rgtonline.com/Article.cfm?ArticleId=67957&CategoryName=Article%20Search%20 . . . , retrieved Oct. 5, 2006, RGT Online, Casino City.
Unknown, "White Paper—Security Best Practices", 2005, pp. 1-5, Authorize.net, USA.
Unknown, "White Paper—Fraud Detection Suite", 2005, pp. 1-3, Authorize.net, USA.
Carstens, Juergen, "Teilnehmeridentifizierung im Internet unter Verwendung von Geolocation Services", Nov. 10, 2006, pp. 1-3, Siemens AG, Germany.
European Patent Office, Communication Pursuant to Article 94(3) EPC for Application No. 07732550.4, May 29, 2009, 9 pages, The Netherlands.
State Intellectual Property Office of the People's Republic of China, Fourth Office Action for Application No. 200780023244.X, Jun. 3, 2013, 12 pages, China.
Canadian Intellectual Property Office, Examiner Requisition for Application No. 2,741,408, Jul. 9, 2013, 3 pages, Canada.
Japan Patent Office, Notice of Reasons for Rejection for Application No. JP 2011-532713, mailed Apr. 9, 2013, 3 pages, Japan.
United States Patent and Trademark Office, Office Action for U.S. Appl. No. 13/485,240, dated May 17, 2013, 24 pages, USA.
United States Patent and Trademark Office, Office Action for U.S. Appl. No. 13/485,228, dated Jun. 10, 2013, 27 pages, USA.

(56) References Cited

OTHER PUBLICATIONS

Japan Patent Office, Office Action for Application No. 2011-532713, mailed Oct. 1, 2013, 6 pages, Japan.

Japan Patent Office, Office Action for Application No. 2012-094096, mailed Jul. 26, 2013, 6 pages, Japan.

United States Patent and Trademark Office, Office Action for U.S. Appl. No. 13/485,240, mailed Oct. 10, 2013, 19 pages, USA.

United States Patent and Trademark Office, Office Action for U.S. Appl. No. 13/485,228, Feb. 24, 2014, 21 pages, USA.

Japan Patent Office, Office Action for Application No. 2012-094096, Feb. 25, 2014, 4 pages, Japan.

United States Patent and Trademark Office, Office Action for U.S. Appl. No. 13/485,220, Mar. 21, 2014, 31 pages, USA.

State Intellectual Property Office of the People's Republic of China, Office Action for Application No. 200780023244.X, Apr. 2, 2014, 12 pages, China.

* cited by examiner

GENERAL
REGISTRATION
PROCESS

GENERAL
VALIDATION
PROCESS

REGISTRATION MODULE 500

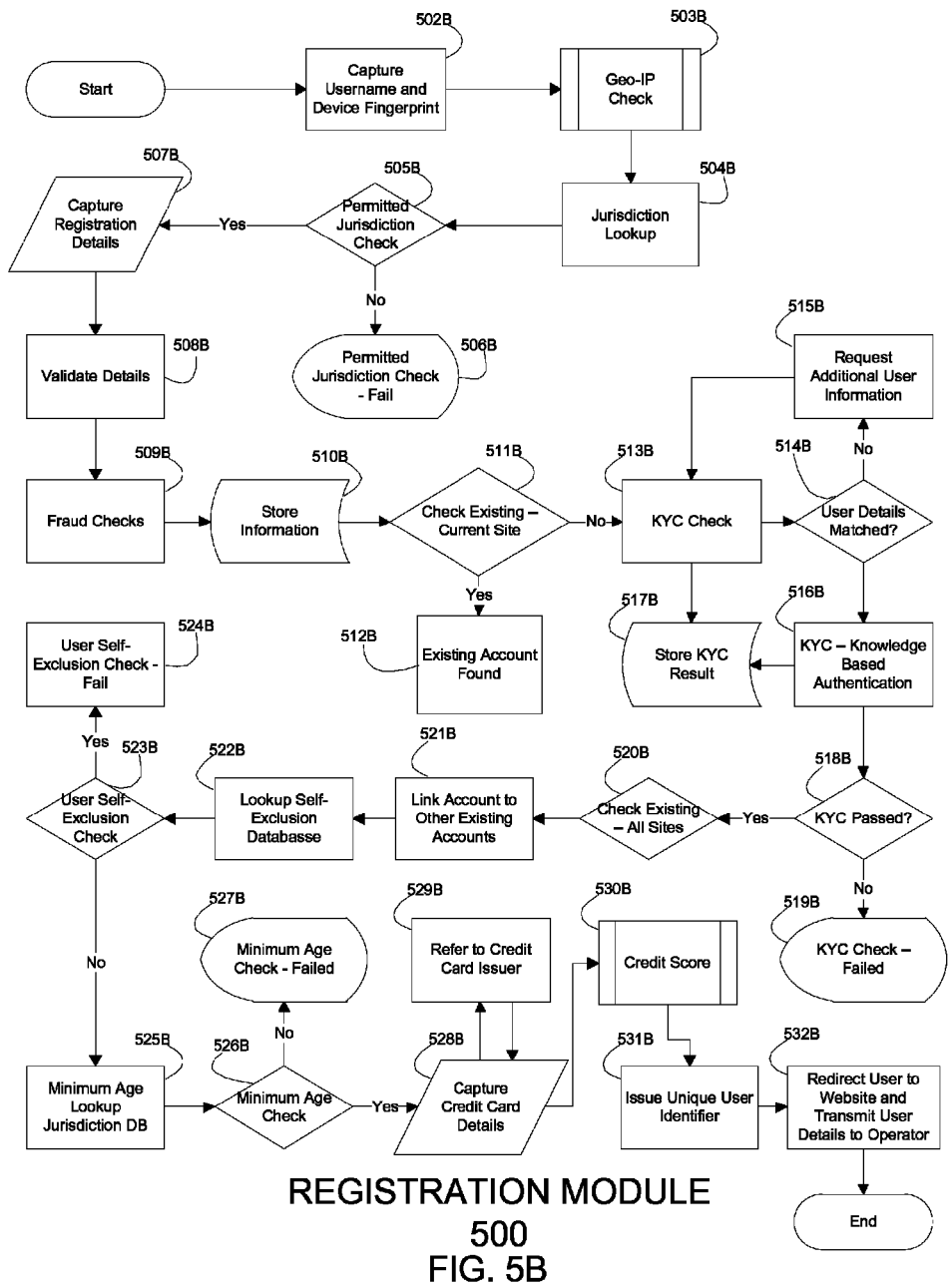
FIG. 5B REGISTRATION MODULE 500

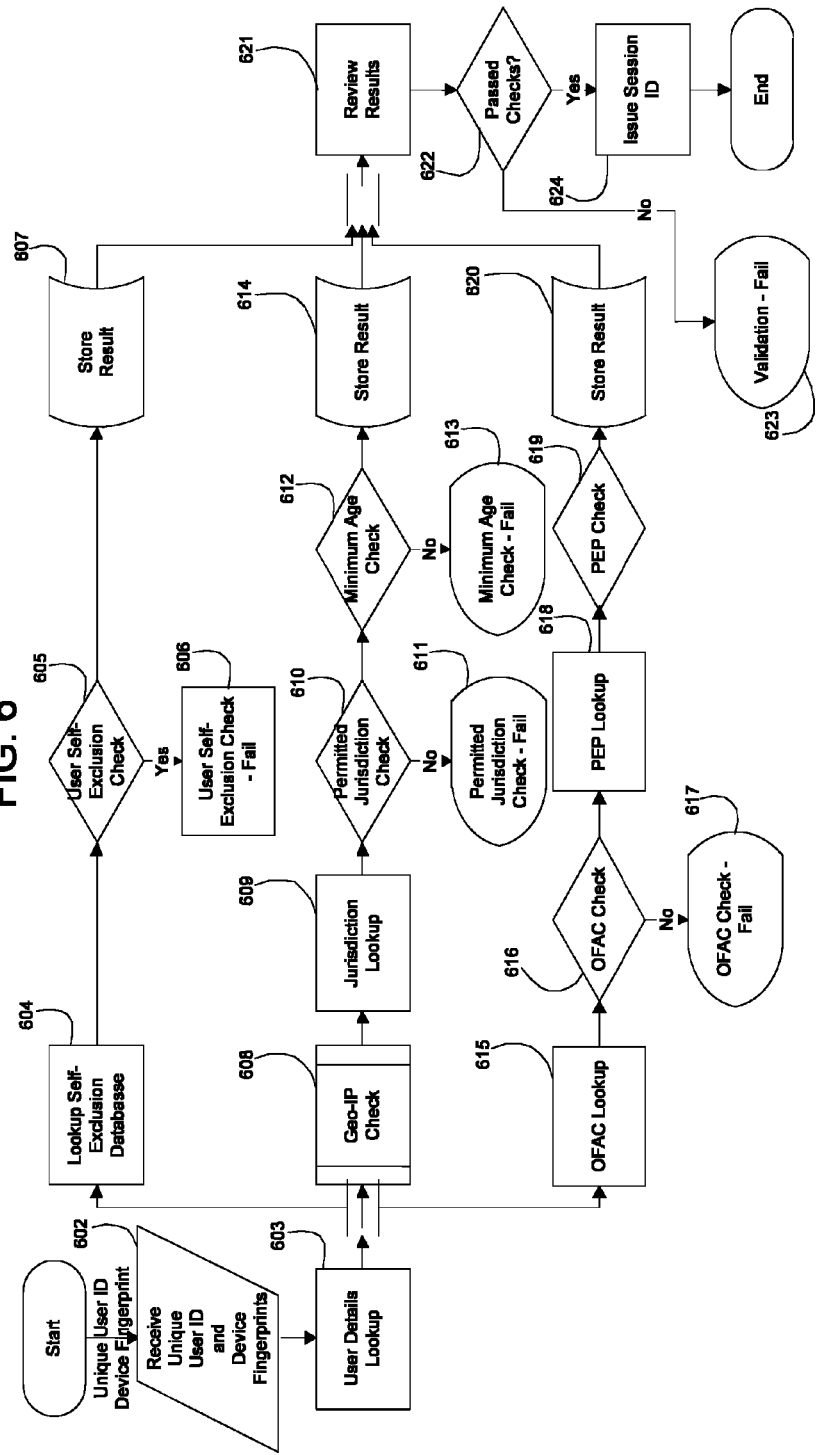

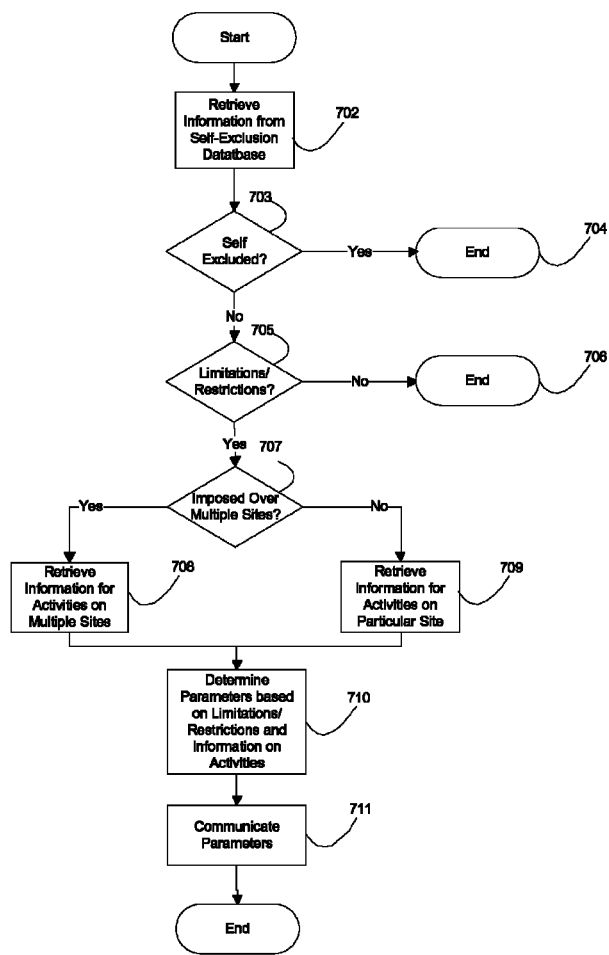

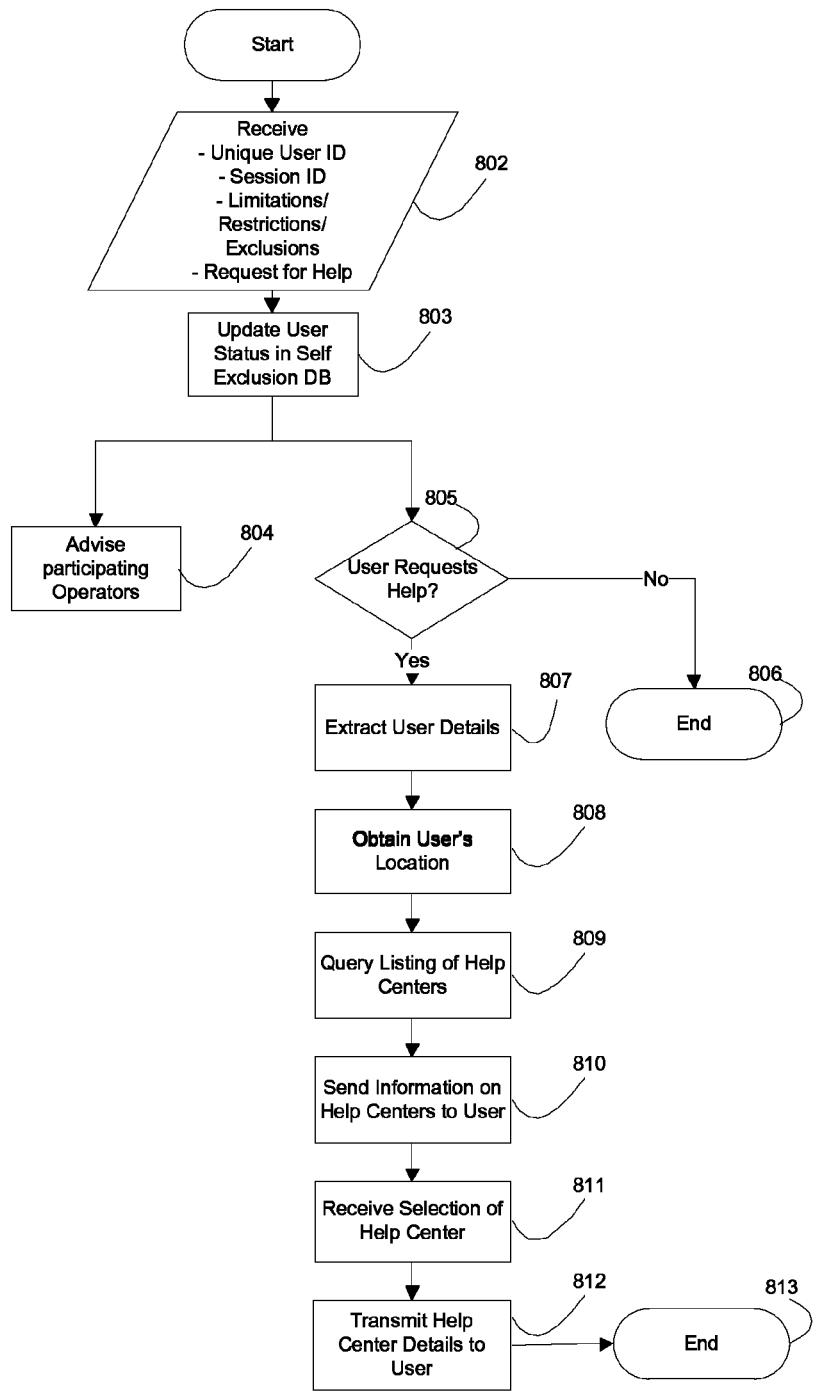

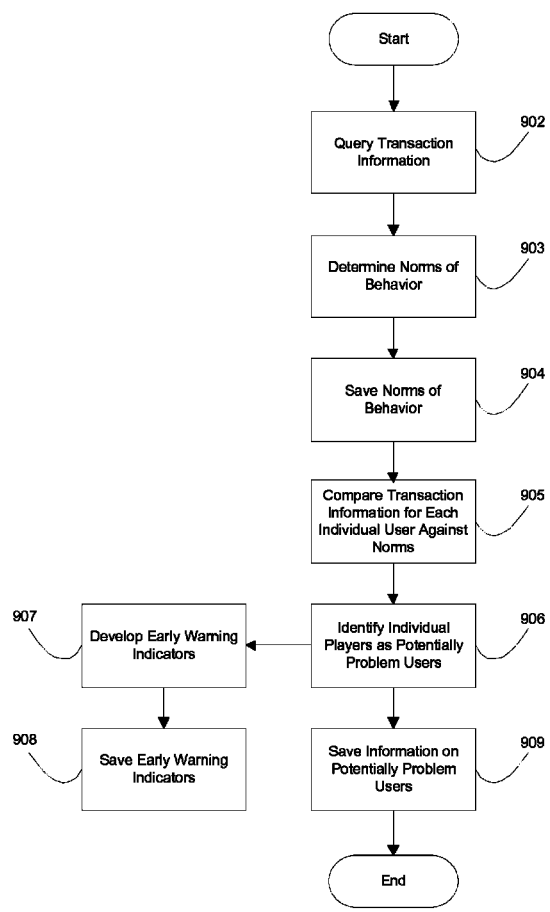

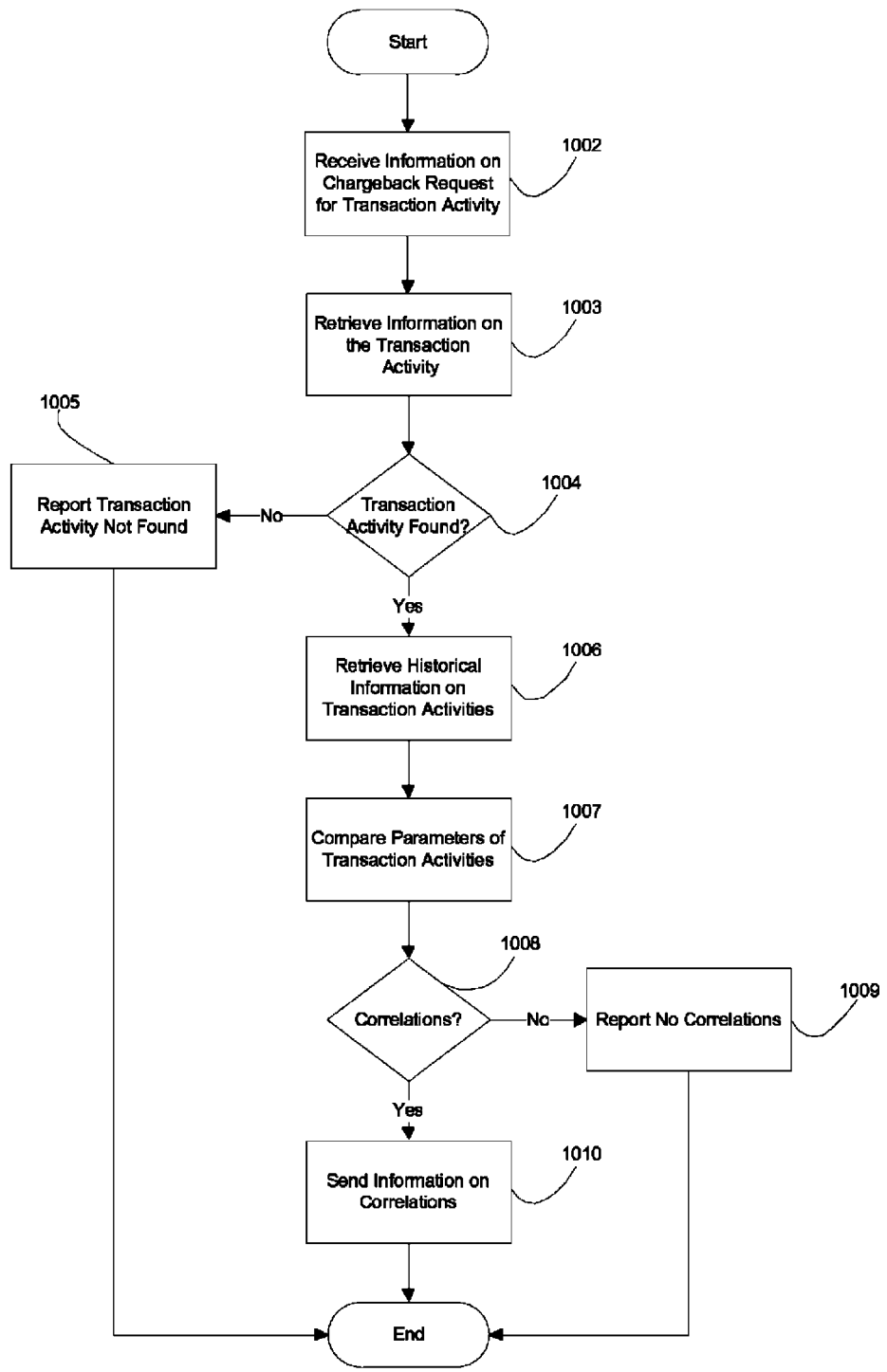

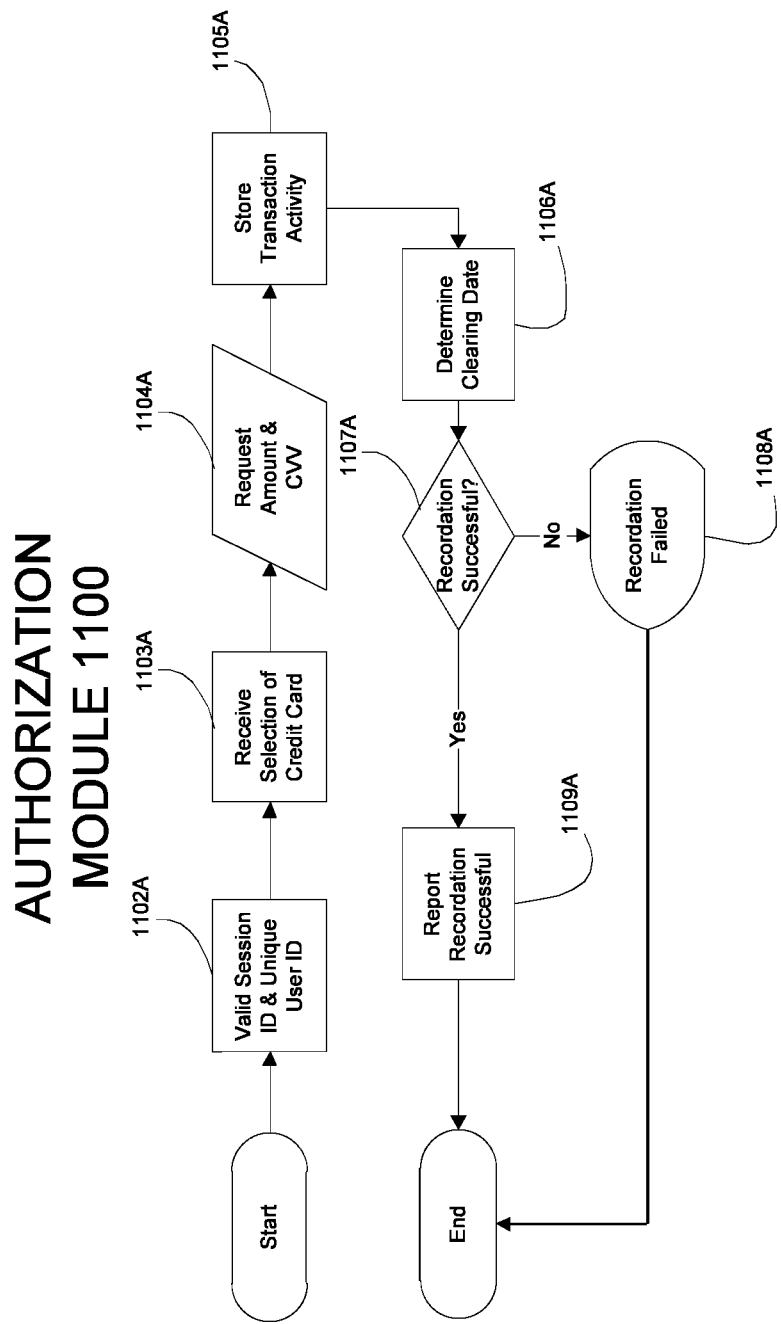

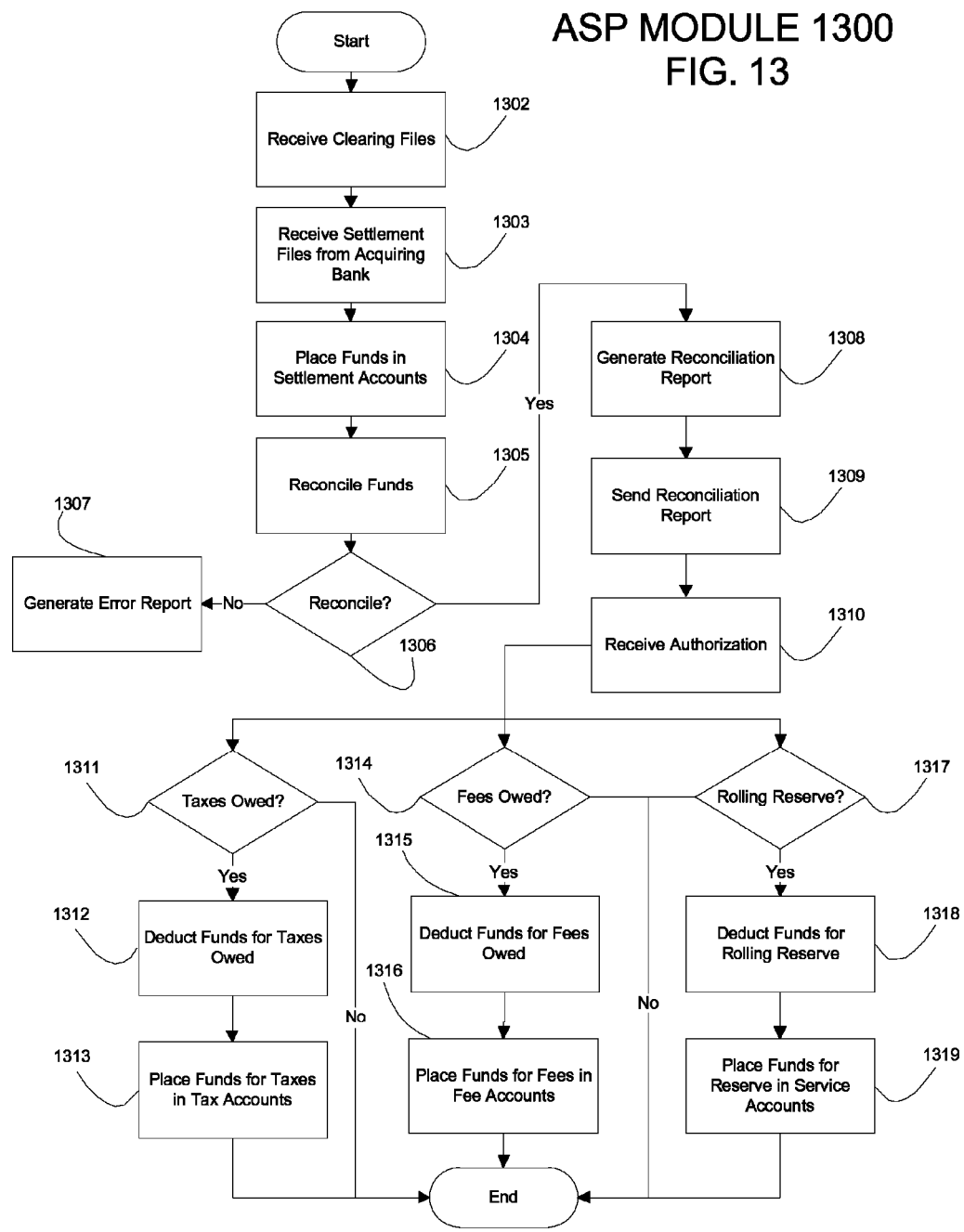

SYSTEMS AND METHODS FOR REGISTERING A USER ACROSS MULTIPLE WEBSITES

CROSS REFERENCE TO RELATED APPLICATIONS

This application claims priority to U.S. Provisional Application Ser. No. 61/520,164, filed Jun. 3, 2011, the contents of which, including any appendices attached thereto, is hereby incorporated herein by reference in its entirety.

This application further herein incorporates by reference U.S. Provisional Patent Application Ser. No. 60/745,561, entitled "Systems and Methods for Providing Financial Transactions over a Network," filed on Apr. 25, 2006, and U.S. patent application Ser. No. 11/609,775, entitled "Systems and Methods for Determining Taxes Owed for Financial Transactions Conducted over a Network," filed on Dec. 12, 2006 and now U.S. Pat. No. 8,099,329, U.S. patent application Ser. No. 11/609,779, entitled "Systems and Methods for Funding Payback Requests for Financial Transactions," filed on Dec. 12, 2006 and now U.S. Pat. No. 7,941,370, co-pending U.S. patent application Ser. No. 11/609,785, entitled "Systems and Methods for Identifying Potentially Fraudulent Financial Transactions and Compulsive Spending Behavior," filed on Dec. 12, 2006, co-pending U.S. patent application Ser. No. 11/609,792, entitled "Systems and Methods for Determining Regulations Governing Financial Transactions Conducted Over a Network," filed on Dec. 12, 2006, and co-pending U.S. patent application Ser. No. 12/257,883, entitled "Financial Transactions Systems and Methods", filed on Oct. 24, 2008, the contents of all of which are herein incorporated by reference in their entirety.

BACKGROUND

Every day, millions of individuals choose to engage in online transaction activities. Such transaction activities may include buying, selling, trading, and sharing of products and services, experiencing media such as videos, games, music, pictures, and written material, and participating in interactive experiences such as blogging, posting, tweeting, and engaging in social networks. In many instances, individuals engaging in online transaction activities with other individuals may be concerned with knowing specific information about the individuals they are dealing with online. Such information may be vital in determining whether a particular individual is willing and able to engage in a particular transaction activity with another individual.

For instance, a media operator (e.g., HBO®) may be operating a website on the Internet that makes available adult-themed media. For example, the media operator may have a website that may provide movies for visitors to the website to watch. Some of the movies may have an R-rating and the operator may want to confirm a particular visitor who has requested to view such a movie is of proper age. In other instances, an online merchant may want to verify the identity of a shopper prior to completing a sales transaction with the shopper on the merchant's website in order for the merchant to minimize fraud occurring in such transactions. For example, the merchant may want to confirm the individual using a particular credit card for payment is actually the individual the credit card was issued to.

In other instances, particular transaction activities may be subject to regulations. For example, Internet gambling and the sale of certain goods such as alcohol, fire arms, and/or adult materials may be restricted by one or more authorities (e.g., governments). Such restrictions may be based on a number of factors such as the age of the potential participate/purchaser and/or the location of the potential participate/purchaser. For instance, one specific example of such a potential regulation is the Internet Gambling Regulation, Consumer Protection, and Enforcement Act ("Act") that has been proposed in the United States. This Act is aimed at providing a federal regulatory and enforcement framework under which Internet gambling operators must obtain licenses authorizing them to accept bets and wagers from individuals in the United States, on the condition they maintain effective protections. These protections include such items as: (1) ensuring an individual placing a bet or wager is of legal age as defined by the jurisdiction in which the individual is located; (2) ensuring an individual placing a bet or wager is physically located in a jurisdiction that permits Internet gambling; (3) protecting the privacy and security of the individual; (4) combating fraud and money laundering; and (5) combating compulsive gambling.

Thus, as a result, many online operators are in need of services and mechanisms to assist them in determining specific information about individuals the operators may engage in transaction activities with and/or to help these operators ensure certain protections are effectively enforced. Accordingly, various embodiments of the present invention involve systems and methods for providing such services and mechanisms. For instance, various embodiments described herein provide systems and methods for facilitating such services and technical mechanisms as registering users, validating users, underage controls, jurisdiction controls, compulsive behavior controls, settlement functions, and tax identification and collection. In addition, a number of these services and technical mechanisms are designed to ensure they are provided in an effective and efficient manner to help reduce computer processing capacity, minimize system requirements, and reduce memory usage.

BRIEF SUMMARY OF VARIOUS EMBODIMENTS

Various embodiments of the present invention provide a system for registering a user with one or more websites. According to particular embodiments, the system comprises at least one processor configured to: (a) receive a request to register the user; (b) receive an IP address for a computing device being used by the user; (c) after receiving the IP address: (1) obtain a location associated with the IP address; and (2) identify whether the user is in a jurisdiction that permits the user to register with a website; (d) receive one or more parameters obtained from the user, the one or more parameters comprising characteristics of the user; (e) after receiving the one or more parameters: (1) verify an age of the user based on at least one of the one or more parameters; (2) after verifying the age of the user, determine which of the one or more types of transaction activities the user is permitted to conduct on the one or more websites based on the age of the user; (3) query one or more registration attempts over a predetermined previous time period to identify duplicate or similar parameters associated with the one or more registration attempts as the one or more parameters obtained from the user; and (4) verify the user's identity based at least on one of the one or more parameters obtained from the user; and (f) after: (1) not identifying duplicate or similar parameters from (e)(3); and (2) verifying the user's identity from (e)(4), generate a unique user identifier associated with the user.

Various embodiments of the present invention provide a method for registering a user with one or more websites.

According to particular embodiments, the method comprises the steps of: (a) receiving a request to register the user over a network from the website; (b) receiving an IP address for a computing device being used by the user over the network; (c) after receiving the IP address: (1) obtaining a location associated with the IP address; and (2) identify, whether based on the location by at least one computing device comprising at least one processor, the user is in a location which permits registration with a particular website; (d) receiving one or more parameters obtained from the user and sent over the network, the one or more parameters comprising characteristics of the user; (e) after receiving the one or more parameters: (1) verifying an age of the user based on at least one of the one or more parameters; (2) after verifying the age of the user, determining which of the one or more types of transaction activities the user is permitted on the one or more websites based on the age of the user by the at least one processor; (3) querying one or more registration attempts over a predetermined previous time period from memory to identify duplicate or similar parameters associated with the one or more registration attempts as the one or more parameters obtained from the user by the at least one processor; and (4) verifying the user's identity based at least on one of the one or more parameters obtained from the user; and (f) after: (1) not identifying duplicate or similar parameters during step (e)(3); and (2) verifying the user's identity during step (e)(4), generating a unique user identifier associated with the user.

BRIEF DESCRIPTION OF THE DRAWINGS

Figure 1:
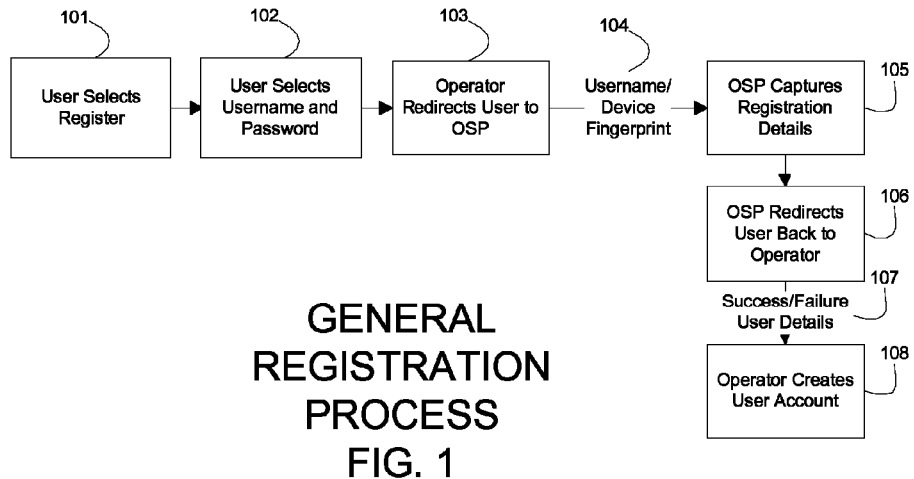

Having thus described various embodiments of the invention in general terms, reference will now be made to the accompanying drawings, which are not necessarily drawn to scale, and wherein:

FIG. 1 is a flow diagram illustrating the registration process according to various embodiments of the invention.

Figure 2:
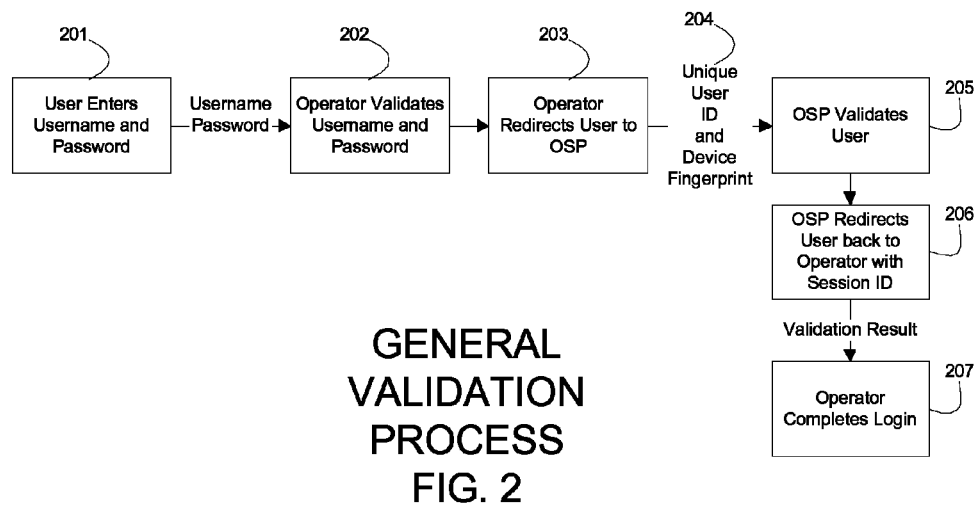

FIG. 2 is a flow diagram illustrating the validation process according to various embodiments of the invention.

Figure 3:
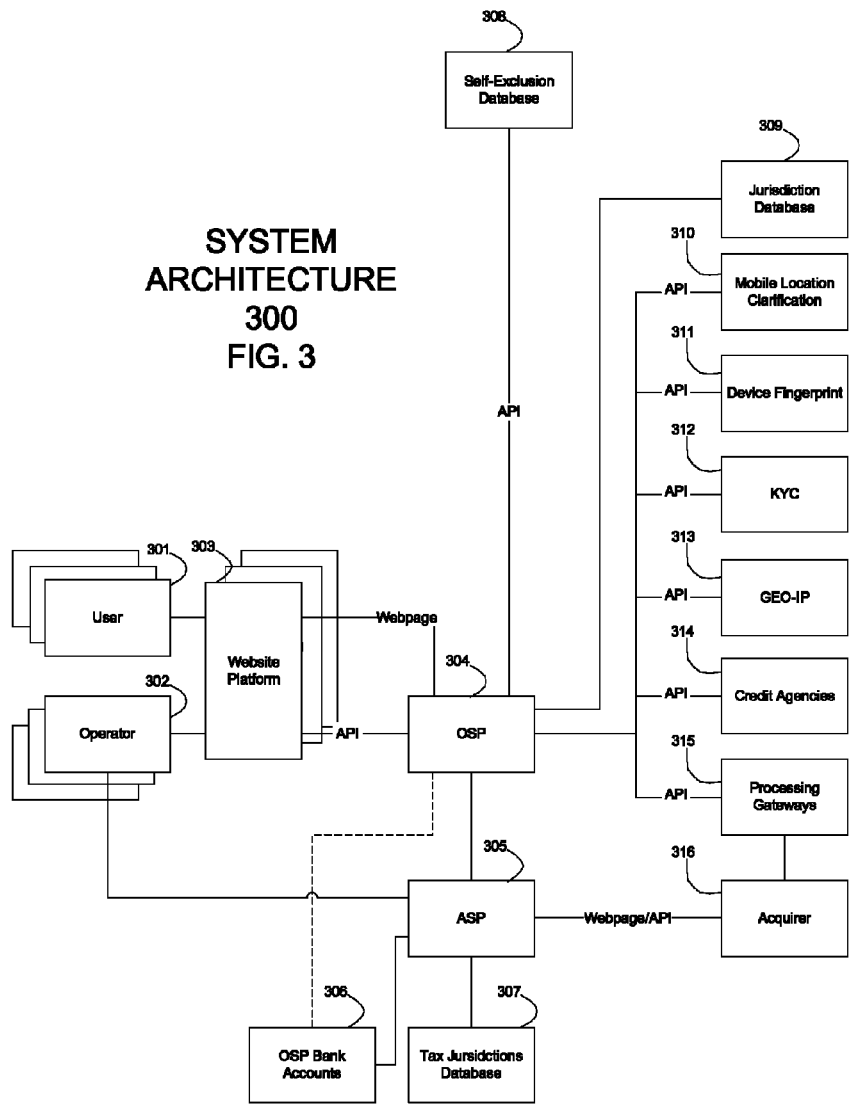

FIG. 3 is a schematic diagram illustrating a system architecture that can be used in conjunction with various embodiments of the present invention.

Figure 4:
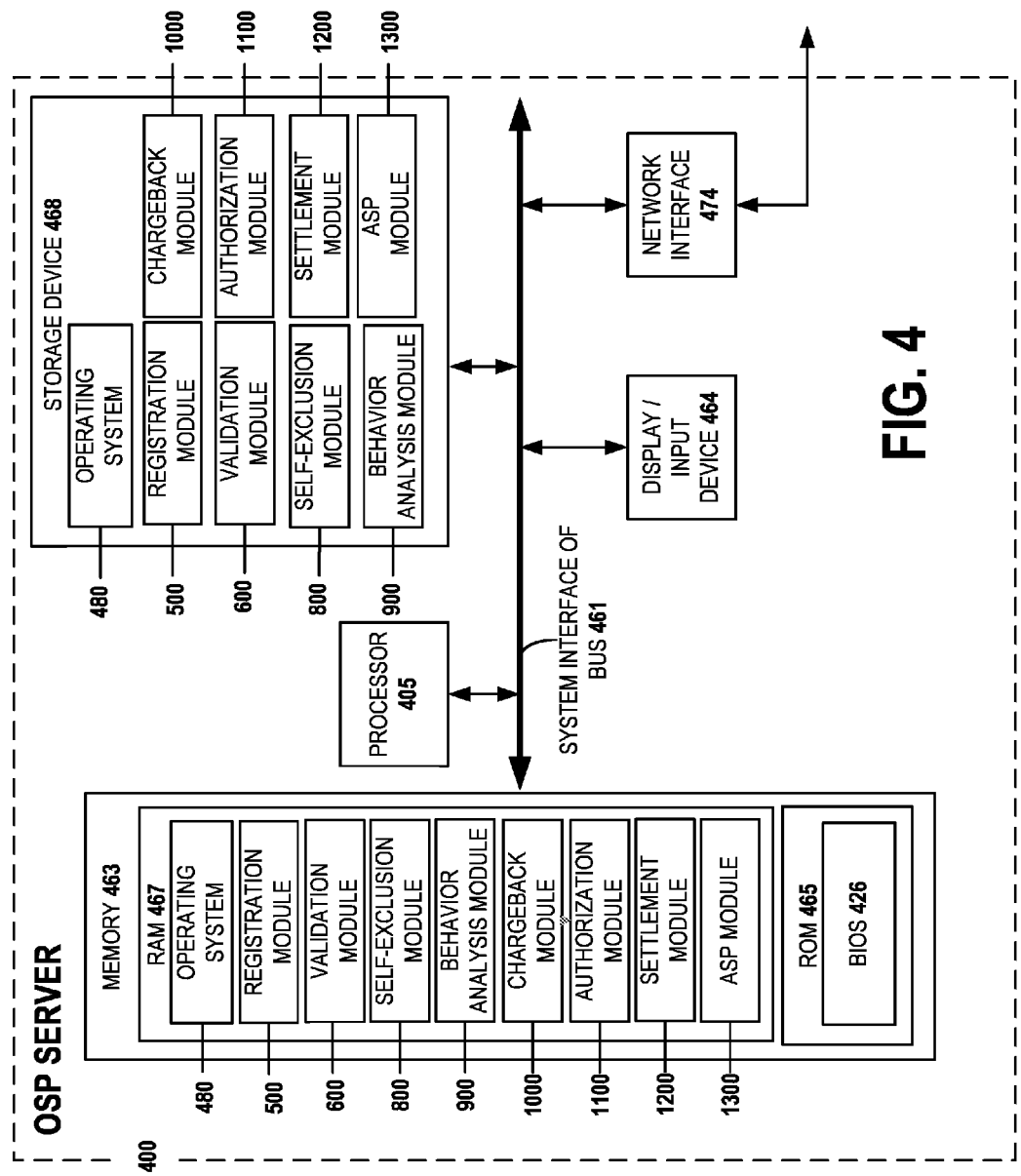

FIG. 4 is a schematic diagram illustrating an OSP server according to various embodiments of the invention.

Figure 5A:
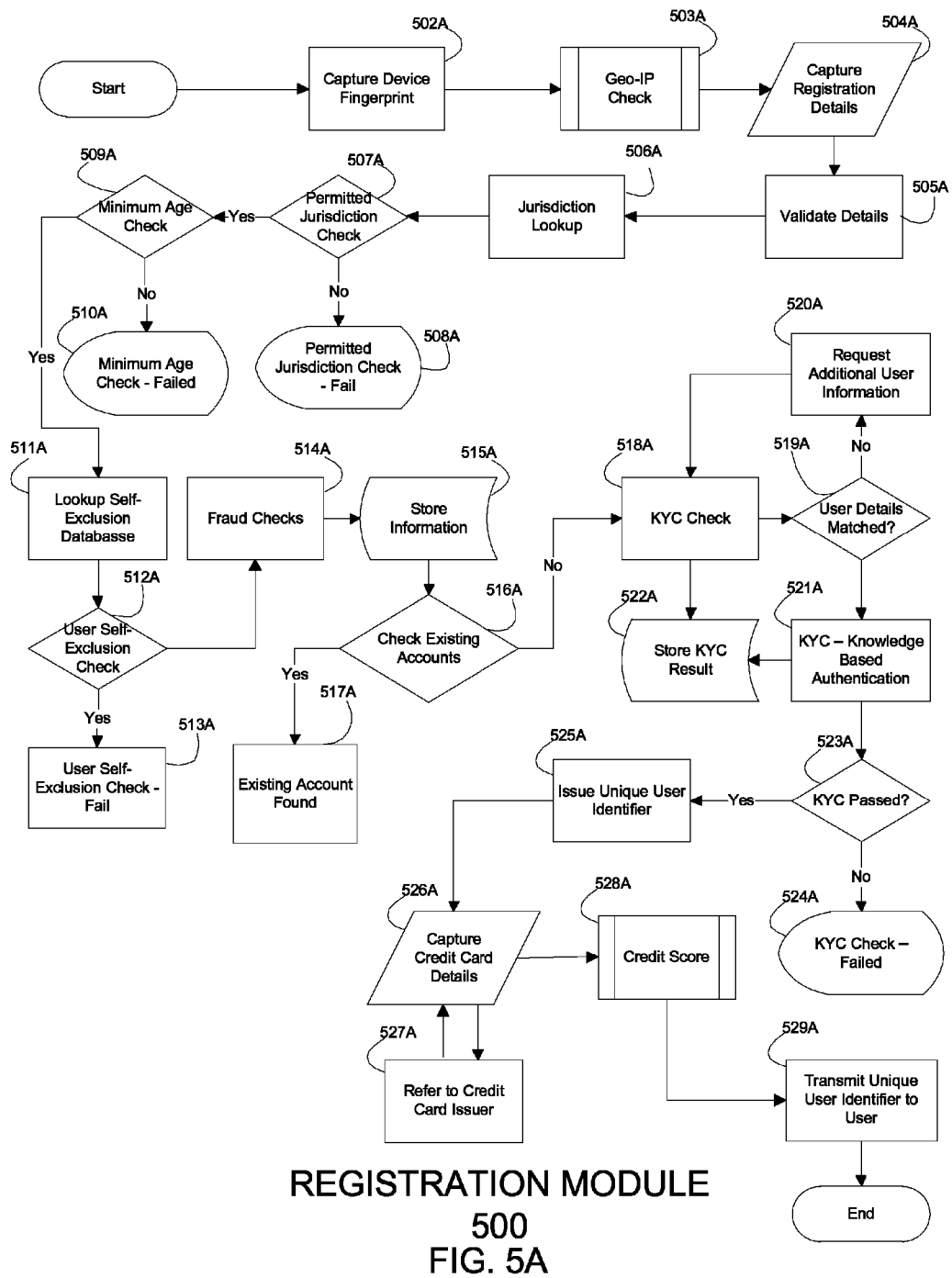

FIG. 5A is a flow diagram of a registration module according to various embodiments of the invention.

FIG. 5B is another flow diagram of a registration module according to various embodiments of the invention.

FIG. 6 is a flow diagram of a validation module according to various embodiments of the invention.

FIG. 7 is a flow diagram of a self-exclusion check according to various embodiments of the invention.

FIG. 8 is a flow diagram of a self-exclusion module according to various embodiments of the invention.

FIG. 9 is a flow diagram of a behavior analysis module according to various embodiments of the invention.

FIG. 10 is a flow diagram of a chargeback module according to various embodiments of the invention.

Figure 11:
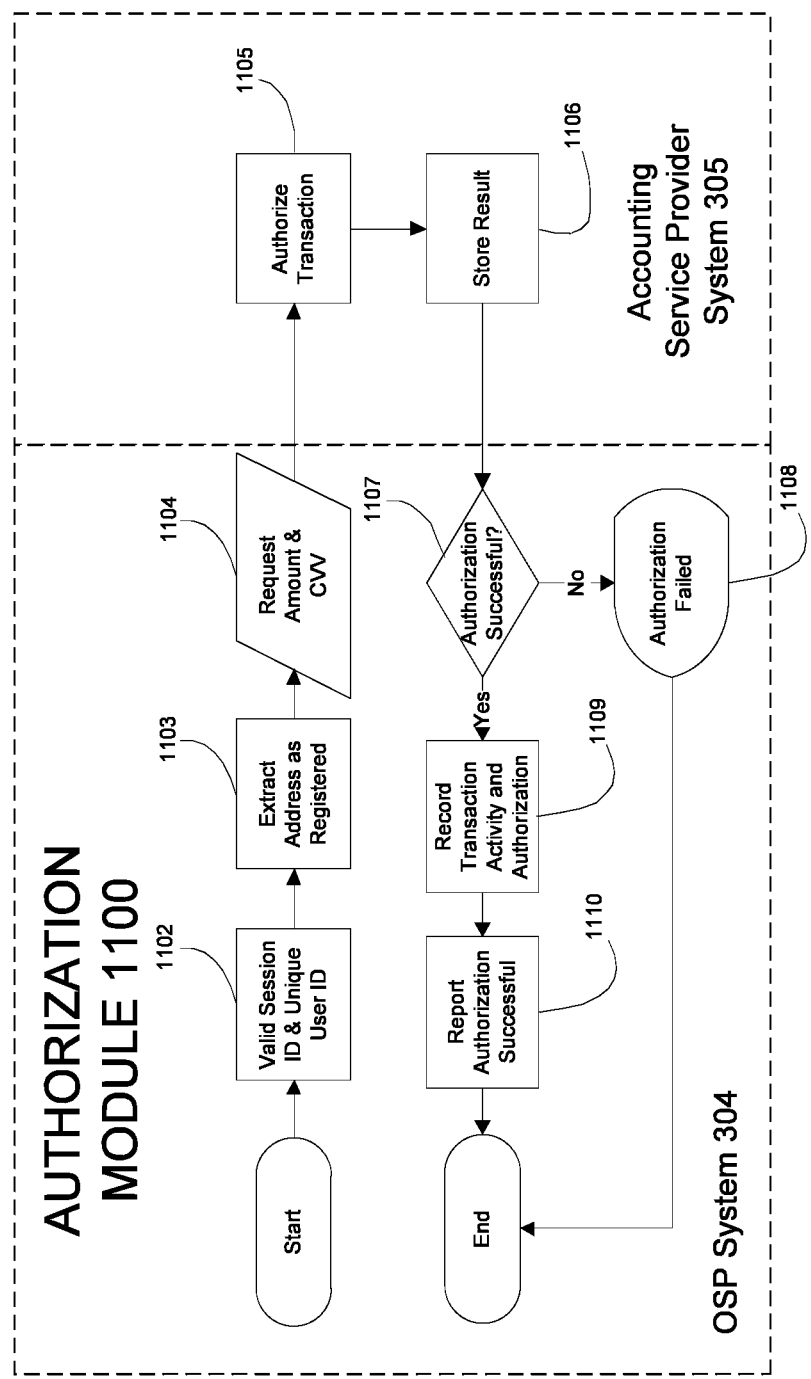

FIG. 11 is a flow diagram of an authorization module according to various embodiments of the invention.

FIG. 11A is a flow diagram of an authorization module according to other embodiments of the invention.

Figure 12:
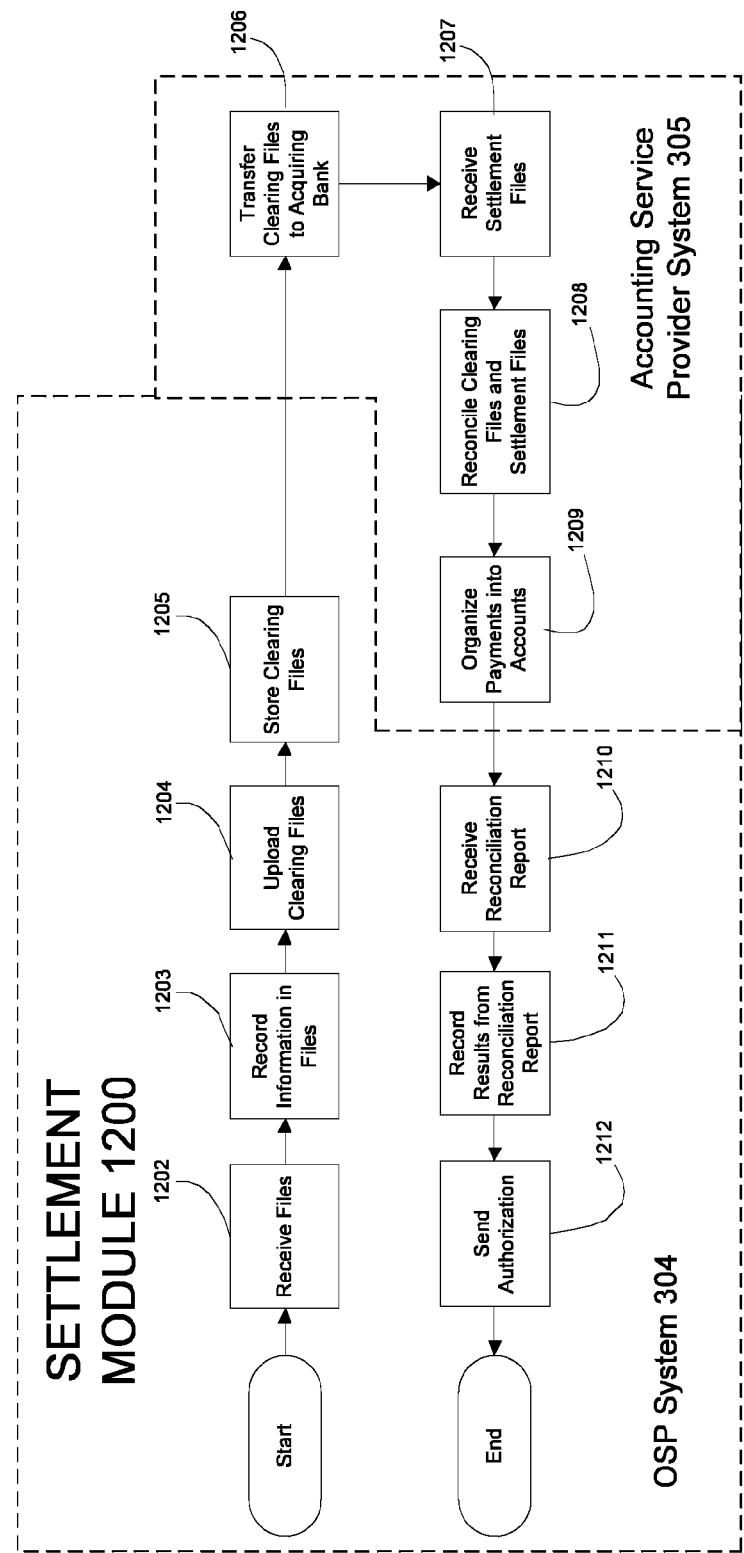

FIG. 12 is a flow diagram of a settlement module according to various embodiments of the invention.

FIG. 13 is a flow diagram of an ASP module according to various embodiments of the invention.

DETAILED DESCRIPTION OF VARIOUS EMBODIMENTS OF THE INVENTION

Various embodiments of the present invention now will be described more fully with reference to the accompanying drawings, in which some, but not all embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

Brief Overview

In general, various embodiments of the present invention involve systems and methods providing services and mechanisms to online websites (and operators thereof) for gathering information about individuals (e.g., the users that the websites may engage in transaction activities with) and for facilitating the provision of restricted activities to these users. In addition, various embodiments of the present invention involve systems and methods ensuring certain protections are maintained with regard to these transaction activities. In various embodiments, the systems and methods provide a seamless user experience and a straight forward integration by the online website into its existing platform. Further, in various embodiments, the systems and methods provide such services and mechanisms as user registration, user validation, underage controls, jurisdiction controls, compulsive behavior controls, settlement functions, and tax identification and collection.

The various parties that may be involved in the systems and methods described herein include users, websites, and an online service provider (OSP). A "user" is an individual that requests to engage in one or more transaction activities on one or more websites. A "website" is an Internet-based site owned and operated by an entity (e.g., organization), who may also be referred to elsewhere herein as an "operator." In some instances, a website may be a "restricted website" that provides restricted products and/or restricted services that may be "restricted" with respect to the users who may engage in/purchase such products and/or services. As commonly known and understood in the art, websites generally contain a set of related web pages containing a variety of content, which is accessible from a simple Uniform Resource Locator (URL), also referred to as the web address of the website. With that in mind, in some instances, where two or more independent websites are referred to elsewhere herein, such should be understood to refer to two distinct URL domain names (e.g., www.A.com and www.B.com), two distinct URL subdomain names (e.g., www.A.com/one and www.A.com/two), or any of a variety of alternative distinct URLs, as may be desirable for particular applications. Notably, however defined, the two or more websites may be, according to certain embodiments, independently owned and operated. Of course, in still other embodiments, the two or more websites may be commonly owned and/or generally related, as may be desirable for particular applications.

Thus, in various embodiments, the OSP provides services and mechanisms to a number of different websites and/or users conducting a variety of different transactions on a number of different websites. In many instances, websites (e.g., operators' systems) communicate directly with the OSP (e.g., the OSP's system) to acquire particular services and mechanisms from the OSP. In other instances, users (e.g., computing devices associated with the users) communicate directly with the OSP (e.g., the OSP's system).

Further, in various embodiments, third parties may be used by the OSP for implementing several of the OSP's services. For instance, the OSP may use third parties for such services as Geo-IP-location, know-your-customer provisions, digital fingerprint analysis, credit scoring, and mobile location services. Finally, in various embodiments, the OSP may interface with other systems such as, for instance, an accounting service provider (ASP). In particular embodiments, the ASP provides the OSP with such services as settlement of credit card transactions, reconciliation of transactions, generation of reconciliation reports, and taxation services.

In various embodiments, many of the services and mechanisms provided by the OSP may be broken down into two distinct processes: (1) registration and (2) validation. In order for a user to engage in transaction activities on particular Internet websites associated with the OSP, the user may first need to register with the OSP, directly or indirectly through the website. In addition, in particular embodiments, in order for a user to engage in transaction activities on a particular Internet website, the user may need to first open an account that is used on the particular website. This is accomplished as an adjunct to the registration process. In this manner, as will be described in further detail below, the registration of an individual may serve multiple purposes. For instance, in particular embodiments, the registration of a user may serve to facilitate and track the user's activities across multiple websites. In other embodiments, the registration of a user may serve to provide a validation of the user so that the user such that the website may forego the need to undertake a full verification of the user prior to the occurrence of each restricted purchase, all as will be described in further detail below.

According to various embodiments, websites may register with the OSP to participate in the verification and validation service. Accordingly, in certain embodiments, a website may refer a user who has not previously signed up to the OSP for registration and validation. In other embodiments, for example, where the user is already registered, the website may pass the user to the OSP for a fast and simple validation, via the user's unique user identifier, as will be described in further detail below. In this manner, the OSP may then issue the website with a session identifier, which may comprise a certificate, both or either of which may subsequently be embodied into the financial transaction as proof of compliance with the law.

Of course, in still other various embodiments, the registration of a user may serve both purposes. The OSP therefore can provide two types of service. First, in certain embodiments, the OSP may provide a white label on behalf of service that is invisible to the user as the registration pages carry the associated individual website's branding. This white label model according to various embodiments would be typically employed for websites that have account relationships with the user or for websites that have recurring transactions by users. Second, the OSP may, in still other various embodiments, provide a branded user facing service whereby the user will log directly into the OSP's website to register. In this model, on successful verification, the user may be, according to certain embodiments, issued with the unique user identifier and asked to choose a password. Such registration will enable the user to make purchases on participating websites via only a simple validation process. This OSP branded model would typically be employed across multiple restricted-product merchant websites, all as will be described in further detail below.

According to various embodiments, the validation process involves validating what transaction activities a user may perform on a particular website while the user is engaged in an interactive session with the website. For example, these activities may include purchasing an item or service, depositing funds with the website, viewing media, playing games, placing wagers, withdrawing funds from the website, and setting up limiting parameters and/or self-exclusion parameters in connection with deterring potentially problematic behavior. Described below are the registration and validation processes in general terms. Although these general descriptions of the processes are provided as an overview of these processes, the descriptions immediately following herein should not be construed to limit the scope of the claimed invention.

FIG. 1 provides a general diagram of a registration process according to various embodiments. The process begins in certain embodiments with the user visiting an operator's website over the Internet. For instance, the user may be visiting a gambling website, a merchant website, or a media website for a particular operator. Once on the website, the user selects an option to register with the website and invokes a registration webpage, shown as Step 101. According to various embodiments, this webpage may be hosted by the website or may be hosted by the OSP (e.g., the user may be redirected to a website of the OSP and corresponding registration webpage). The particular embodiment shown in FIG. 1 displays the registration process in which the registration webpage is hosted by the OSP.

In various embodiments, the user may further be requested to enter a username and/or password, shown as Step 102. For instance, in one particular embodiment, the registration webpage provides a text box for the user to enter a username and a text box for the user to enter a password. The user types in a username and password and selects the "enter" button on the webpage. The website's system may then check to ensure the username is unique. That is, the website's system may check to make sure the particular username entered by the user has not already been selected by another user. If the website's system determines the username is not unique, the system may facilitate having the user enter a new username and/or password. For instance, in one embodiment, the website's system generates a message that appears on the webpage informing the user that the username has already been used and requesting a new username be entered. In other embodiments, the user may not be required to enter a username and/or a password. For instance, in particular embodiments, the user may be automatically or otherwise provided with some type of unique identifier that services as a username. In these particular embodiments, the user may or may not be requested to provide a password to use along with the unique identifier. That being said, as will be described in further detail later, the user benefits from being able to complete purchases with a simple validation, rather than repetitive and lengthy verifications across multiple websites.

Once the user has entered a valid username and password (if required), the website's system redirects the user to the OSP's system, shown as Step 103. For instance, in one embodiment, the website's system redirects the user to a corresponding registration webpage hosted by the OSP's website. In Step 104, the OSP's system receives the user's username. Further, in particular embodiments, the OSP's system also retrieves a fingerprint for the user's computing device being used to access the OSP's webpage. For instance, the system may retrieve the IP address being used by the user's device and/or the MAC address for the user's device.

In Step 105 according to various embodiments, the OSP's system captures additional registration details from the user. For instance, in certain embodiments, the OSP's webpage requests the user to enter additional information on the webpage, such as, for example, the user's full name, home address, telephone number, date-of-birth, gender, and social security number. Once the OSP's system has captured the additional registration details, the system undertakes to match these details with publically held data and credit data. Through this process, oftentimes referred to as "Know Your Customer," the user will or will not be verified to predefined certainty standards. If the user is not sufficiently verified, the system, in certain embodiments, redirects the user back to the website with an appropriate notification. If the user is verified, the system may then enter into an interactive session with the user, whereby the user is asked a series of personal questions to confirm that the user, who provided the registration data, is whom he or she purports to be. According to various embodiments, this process is oftentimes referred to as "Knowledge Based Authentication".

Remaining with the previous example, if, in accordance with various embodiments, the user is confirmed, the OSP system will issue a unique user identifier and may, in at least certain embodiments, request the user to generate a password that meets predefined criteria. Thus, in these and still other embodiments, the OSP's system redirects the user back to the registration webpage or a different webpage on the website, as shown as Step 106. When so redirected according to various embodiments, the OSP's system further provides a notification of the unique user identifier, which the website will use on all future communications for this user with the OSP. In certain of these and still further embodiments, the website may ask the user to choose a password instead of the OSP, as may be desirable for particular applications.

At this point, the OSP's system determines whether the registration of the user is successful, shown as Step 107. To accomplish this, in various embodiments, the OSP's system conducts a number of checks based on the registration information gathered about the user. For example, in one particular embodiment, the OSP's system conducts a location check to determine whether the user is located in a jurisdiction in which the types of transaction activities associated with website are permitted. As is described in more detail below, the location check may be any one of a geo-IP check system, a registration correlation system, a mobile locator system, a wireless locator system, and/or a latency analysis system, and the OSP's system may conduct one or more of these checks according to various embodiments.

At the conclusion of the checks, the OSP's system according to various embodiments determines whether the user has successfully registered and sends a message to the website's system informing the system of the registration result. In turn, the website's system informs the user whether the user has successfully registered or not. For instance, in one embodiment, the system facilitates having a message appear on the current webpage the user is on informing the user whether registration was successful or not. Further, in particular embodiments, the system provides the user and/or website with a unique user identifier for the user. This may allow the website to request the OSP to validate a previously registered user, who would utilize the user's unique user identifier and password on subsequent visits by the user, thereby allowing the website to attach the unique user identifier to requests sent to the OSP's system. Therefore, if registration was successful, the website's system creates a user account for the user, shown as Step 108 and the user may benefit from being able to conduct subsequent transactions with a simple validation process, as will be described in further detail below, without the need for repetitive and lengthy registrations and verifications.

In particular embodiments, as mentioned, the OSP's system generates a unique user identifier for the user upon determining the user's registration has been successful. Further, as mentioned, in particular embodiments, the unique user identifier may be used as the user's username. As is described in greater detail below, this unique user identifier is used in the OSP's system to associate with various information (e.g., the user's registration information or subsequent transaction history) and with various checks (e.g., the checks performed during the registration process) stored in the OSP's system. Thus, the system can retrieve the various information and checks from system storage media by using the unique user identifier.

In various embodiments, the user's unique user identifier is also associated with information gathered and checks performed with regard to the user having visited multiple websites. For instance, in particular embodiments, when the user visits another website that is associated with the OSP (e.g., a restricted website), the user may simply use his or her user account (e.g., unique user identifier) already issued by the OSP on the second website. Therefore, in this instance, the user is passed to the OSP to enter his unique user identifier and password and the OSP's system provides confirmation to the website that the user is validated to conduct transactions on the website. Thus, in particular embodiments, the user only needs to register once with the OSP and receive a unique user identifier that may be used on multiple operators' websites in order to engage in activities on these websites. In other words, as will be described in further detail later, the user benefits from being able to complete purchases with a simple validation, rather than repetitive and lengthy verifications across multiple websites.

However, in other embodiments, when the user visits the second website, the user may be required to register with the second website. In this case, the user is again redirected to the OSP's system (e.g., redirected to a webpage hosted on the OSP's website). Similar to registering with the first operator's website, the user is requested to provide registration information. However, in these and still other embodiments, the OSP's system also compares the registration information with archived registration information stored in the system's storage media to determine whether the user associated with the registration information may have already registered on another website (e.g., the first website). Therefore, in various embodiments, if the system determines the user has already registered on another website, the system links the registration information gathered in connection with the user registering on the second website with the user's unique user identifier and archived information. As a result, the user's registration information and checks associated with multiple websites are linked via the user's unique user identifier, thereby introducing still further efficiency and accuracy within the various processes.

Further, in various embodiments, the system may also provide archived information to the second website and/or may use the results of checks previously performed for the particular user. Although the providing of archived information and use of results of previously performed check may be contingent on the amount of time that has passed since the archived information was gathered or the check was performed to ensure circumstances have not changed with respect to the information and/or check. This can result in more efficient processing with respect to the OSP and the second website in various embodiments because the OSP's system may not need to re-gather information and/or re-perform certain checks for the user in connection to the user engaging in activity on the second website. In addition, the second website may not need to gather as much information from the user. As a result, such a registration process may result in the use of less processing capacity and storage media on the OSP's system and/or the second website's system.

Turning now to FIG. 2, a general diagram of the validation process is illustrated. According to various embodiments, the validation process begins with the user visiting a website over the Internet in which the operator is associated with the OSP. As shown in Step 201, in various embodiments, the user may enter a username and/or password on a login page provided on the website. As explained in greater detail below, in particular embodiments, the username may be the unique user identifier issued to the user by the OSP during a time the user registered with the OSP, although in other embodiments, the username may be otherwise configured, as may be desirable for particular applications. In response, the website's system validates the username and password, shown as Step 202. For instance, in certain embodiments, the website's system stores various user's usernames and passwords in local storage media (such as a database) and the system confirms that the password is associated with the username entered by the user by querying the local storage media. In other embodiments, the website's system may query an external resource, such as the OSP's system, for example, to determine whether the username and password entered by the user match.

Upon validation of the username and/or password entered by the user, the website's system according to various embodiments redirects the user to the OSP's system, shown as Step 203. Thus, similar to the registration process, the website's system may redirect the user to a webpage hosted by the OSP. In turn, the OSP's system obtains the user's unique user identifier (e.g., directly from the website or by using the username provided by the user on the operator's website) and a device fingerprint for the user's computing device, shown as Step 204. For instance, in certain embodiments, the OSP's system obtains the user's computing device's IP address.

In various embodiments, the OSP's system then performs a number of checks (similar to the checks described in regard to the registration process) to validate whether and what transaction activities the user may be allowed to participate in on the website, shown as Step 205. For example, the OSP's system may validate that the user is located in a jurisdiction (based on the user's computing device's IP address) in which the user is allowed to place a wager in a gambling activity being played on the website. Further, in particular embodiments, the OSP's system may request additional information from the user in performing one or more of these checks and/or may use results of previous checks performed for the user. In addition, in particular embodiments, the OSP's system may be able to bypass certain checks because these checks were previously performed during the registration or a previous validation process for the user, as will be described in further detail below. Such capabilities may streamline the validation process and may result in the use of less processing capacity and storage media on the OSP's system. Thus, at the end of this step, the OSP's system has validated whether and what transaction activities the user can engage in while on the website.

In Step 206, the OSP's system issues a session identifier for the user's particular interactive session with the website and directs the user back to the website along with the session identifier. In various embodiments, this session identifier is associated with the user (e.g., user's unique identifier), the website, and the list of transaction activities the OSP's system has validated the user can engage in while on the website. Therefore, upon receiving the session identifier from the OSP's system, the website's system completes the login for the user so that he may engage in transaction activities on the website, shown as Step 207. Still further, in any of these and still other embodiments, the assignment of a session identifier will permit the user to undertake multiple transactions during the log on period, all of which are approved through a single validation.

According to various embodiments, when the user requests to engage in a particular transaction activity or series of activities on the website (e.g., request to purchase a good, request to view a video, or request to place a wager), the website's system and/or website confirms that the user has been validated to engage in the particular activity or activities based on the issued session identifier. In certain embodiments, information is included along with the session identifier on the transaction activities the user has been validated to engage in on the website. Therefore, in this particular embodiment, the website's system and/or website reference the information to determine whether the user has been validated to engage in the particular activity or activities. In other embodiments, the website's system submits a request to the OSP's system to verify the user has been validated to engage in the particular activity or activities. In these and still other embodiments, the request includes information on the particular activity or activities and the session identifier. The OSP's system then uses the session identifier to determine whether the user has been validated to engage in the particular transaction activity or activities and reports its determination back to the website's system and/or website. Further, in still other embodiments, the OSP's system and/or the website's system record any transaction activities requested/performed by the user (and associated information) along with the session identifier.

According to various embodiments, the session identifier remains "locked" to the user as long as the user remains engaged in the interactive session with the particular website. Therefore, any transaction activities requested by the user during the particular interactive session are validated and recorded with respect to the particular session identifier issued for the particular interactive session. The recordation may be carried out by the OSP and/or the website depending on the embodiment. Further, in particular embodiments, the session identifier is associated with the user's computing device's IP address and/or a connection token. This minimizes the chance of someone "hijacking" the user's interactive session to try and impersonate the user on the website. Thus, as a result, in various embodiments, the validation process provides an efficient and effective way to validate the transaction activities a user can engage in while involved in an interactive session with an Internet website. Still further, in certain embodiments, the validation process may issue a certificate within or alongside the session identifier, wherein at least the certificate (and oftentimes the session identifier itself) may be embedded within purchase transaction data as proof that the user was validated for conducting the activity. As will be described in further detail below, in these and still other embodiments, such features provide a heightened degree of not only efficiency, but also security and confidence for the various parties involved with any of a variety of transactions.

Methods, Apparatus, Systems, and Computer Program Products

As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Particular embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

Exemplary System Architecture

FIG. 3 provides an illustration of a system architecture 300 that can be used in conjunction with various embodiments of the present invention. The architecture 300 includes a plurality of users' computing devices 301 in communication with a plurality of website platforms 303. Each user's computing device 301 may be a device such as a desktop computer, notebook or laptop, personal digital assistant (PDA), tablet, cell phone, or other processing device. In various embodiments, each website platform 303 comprises a web server and supporting system components (such as, for example, an application server). The web server delivers web pages to browsers as well as other data files to web-based applications and includes the hardware, operating system, web server software, TCP/IP protocols and site content (web pages, images and other files). Thus, a user engages in transaction activities with an operator by using a browser residing on the user's computing device 301 interacting with various web pages hosted by the operator's website platform 303 over the Internet.

In various embodiments, a plurality of operators' systems 302 are in electronic communication with the website platforms 303 and the website platforms 303 are in electronic communication with the OSP's system 304. However, in other embodiments, the operators' systems 302 are in electronic communication with the OSP's system 304. Any electronic communication described herein may be over one or more wireless or wired networks such as a wired or wireless Personal Area Network ("PAN"), Local Area Network ("LAN"), Metropolitan Area Network ("MAN"), Wide Area Network ("WAN"), the Internet, or the like. In addition, in various embodiments, the OSP's system 304 may make use of an application programming interface (API) module to interface with the website platforms 303 and/or websites' systems 302. (As shown in FIG. 3, the OSP's system 304 may also make use of API modules to interface with other components of the system architecture 300.) As described in more detail below, the OSP's system 304 may include one or more hardware and software components such as servers, storage media, routers, gateways, and corresponding software.

In addition, the OSP's system 304 may interface with other systems and components. For instance, as shown in FIG. 3, the OSP's system 304 is also in communication with a system for an accounting service provider (ASP) 305. As previously mentioned, in particular embodiments, the ASP provides the OSP with such services as settlement of credit card transactions, reconciliation of transactions, and generation of reconciliation reports. Further shown in FIG. 3, the ASP's system 305 may be in electronic communication with one or more accounts 306 controlled by the ASP. As is described in further detail below, these accounts 306 are used to hold funds for various obligations that are a result of the settlement process. In addition, the ASP's system 305 may be in communication with one or more storage media 307 storing tax jurisdiction information. For instance, in various embodiments, the storage media 307 and other storage media described herein may be one or more types of media such as hard disks, magnetic tapes, or flash memory. Further, the storage media 307 may include one or more databases. The term "database" refers to a structured collection of records or data that is stored in a computer system, such as via a relational database, hierarchical database, or network database.

In various embodiments, the OSP's system 304 may also be in direct contact with one or more storage media, such as the self-exclusion storage 308 depicted in FIG. 3. Similar to the storage media 307 in communication with the ASP's system 305, the self-exclusion storage 308 may be one or more types of media such as hard disks, magnetic tapes, or flash memory along with supporting components and may include one or more databases. As is described in greater detail below, the self-exclusion storage 308 stores information on limits, restrictions, and/or exclusions placed on individual users with regard to engaging in transaction activities on websites.

Further, in various embodiments, the architecture 300 includes one or more service systems in communication with the OSP's system 304. For instance, the architecture 300 depicted in FIG. 3 includes a jurisdiction database 309, a mobile location clarification system 310, a device fingerprint system 311, a know-your-customer (KYC) system 312, a Geo-IP system 313, and a credit agency system 314. As is described in greater detail below, in particular embodiments, these systems are associated with different third parties and provide mechanisms for the various checks performed in the registration and validation processes. For instance, in a particular embodiment, the device fingerprint system 311 is contacted by the OSP's system 304 to capture the active device fingerprint of a user's computing device 301 on which the user is currently interacting with a website.

It should be noted that the architecture 300 shown in FIG. 3 is for illustrative purposes only and should not be construed as the only architecture that may be employed in practicing the claimed invention. For instance, in various embodiments, the architecture 300 may include or exclude one or more service systems. For example, in one embodiment, the OSP's system 304 may include the functionality provided by the device fingerprint system 311. Therefore, when such is the case, the architecture 300 may not include this system 311. Thus, FIG. 3 illustrates the various systems and components according to one configuration of the architecture 300 however the various embodiments are not limited to this particular architecture 300.

OSP Server

As previously mentioned, the OSP's system 304 may, according to various embodiments, include one or more servers. Thus, FIG. 4 provides a schematic of a server that may reside in the OSP's system 304 according to one embodiment of the present invention. The term "server" is used generically to refer to any computer, computing device, desktop, notebook or laptop, distributed system, server, gateway, switch, or other processing device adapted to perform the functions described herein. As is understood from this figure, in this embodiment, the server 400 includes a processor 405 that communicates with other elements within the server 400 via a system interface or bus 461. The processor 405 may be embodied in a number of different ways. For example, the processor 405 may be embodied as various processing means such as a processing element, a microprocessor, a coprocessor, a controller or various other processing devices including integrated circuits such as, for example, an application specific integrated circuit ("ASIC"), a field programmable gate array ("FPGA"), a hardware accelerator, or the like. In an exemplary embodiment, the processor 405 may be configured to execute instructions stored in the device memory or otherwise accessible to the processor 405. As such, whether configured by hardware or software methods, or by a combination thereof, the processor 405 may represent an entity capable of performing operations according to embodiments of the present invention while configured accordingly. A display device/input device 464 for receiving and displaying data is also included in the server 400. This display device/input device 464 may be, for example, a keyboard or pointing device that is used in combination with a monitor. The server 400 further includes memory 463, which may include both read only memory ("ROM") 465 and random access memory ("RAM") 467. The server's ROM 465 may be used to store a basic input/output system ("BIOS") 426 containing the basic routines that help to transfer information to the different elements within the server 403.

In addition, in one embodiment, the server 403 includes at least one storage device 468, such as a hard disk drive, a CD drive, and/or an optical disk drive for storing information on various computer-readable media. The storage device(s) 468 and its associated computer-readable media may provide nonvolatile storage. The computer-readable media described above could be replaced by any other type of computer-readable media, such as embedded or removable multimedia memory cards ("MMCs"), secure digital ("SD") memory cards, Memory Sticks, electrically erasable programmable read-only memory ("EEPROM"), flash memory, hard disk, or the like. Additionally, each of these storage devices 468 may be connected to the system bus 461 by an appropriate interface.

Furthermore, a number of program modules (e.g., set of computer program instructions) may be stored by the various storage devices 468 and/or within RAM 467. Such program modules may include an operating system 480, a registration module 500, a validation module 600, a self-exclusion module 800, a behavior analysis module 900, a chargeback module 1000, an authorization module 1100, a settlement module 1200, and an ASP module 1300. These modules 500, 600, 800, 900, 1000, 1100, 1200, and 1300 may control certain aspects of the operation of the server 400 with the assistance of the processor 405 and operating system 480, although their functionality need not be modularized.

Also located within the server 400, in one embodiment, is a network interface 474 for interfacing with various computing entities. This communication may be via the same or different wired or wireless networks (or a combination of wired and wireless networks), as discussed above. For instance, the communication may be executed using a wired data transmission protocol, such as fiber distributed data interface ("FDDI"), digital subscriber line ("DSL"), Ethernet, asynchronous transfer mode ("ATM"), frame relay, data over cable service interface specification ("DOCSIS"), or any other wired transmission protocol. Similarly, the server 400 may be configured to communicate via wireless external communication networks using any of a variety of protocols, such as 802.11, general packet radio service ("GPRS"), wideband code division multiple access ("W-CDMA"), or any other wireless protocol.

Of course, it will be appreciated that one or more of the server's 400 components may be located remotely from other server 400 components. Furthermore, one or more of the components may be combined and additional components performing functions described herein may be included in the server 400.

Additional Exemplary System Components The users' computing devices 301 and servers that may reside in other systems depicted in the architecture 300 shown in FIG. 3 may each include components and functionality similar to that of the OSP server 400. For example, in one embodiment, each of the entities may include: (1) a processor that communicates with other elements via a system interface or bus; (2) a display device/input device; (3) memory including both ROM and RAM; (4) a storage device; and (5) a network interface. These architectures are provided for exemplary purposes only and are not limiting to the various embodiments. The term "computing device" is used generically to refer to any computer, computing device, desktop, notebook or laptop, distributed system, server, gateway, switch, or other processing device adapted to perform the functions described herein.

Exemplary System Operation

Reference will now be made to FIGS. 5A-13, which illustrate operations and processes as produced by various embodiments of the invention. For instance, FIGS. 5A and 5B provide flow diagrams of a registration module 500 that registers users with various websites and with the OSP according to various embodiments. FIG. 6 provides a flow diagram of a validation module 600 that validates the transaction activities a user can conduct on a website during an interactive session on the website according to various embodiments. FIG. 8 provides a flow diagram of a self-exclusion module 800 that facilitates a user setting limits/restrictions on the transaction activities the user can engage in while interacting with one or more websites and/or excluding the user from engaging in one or more transaction activities on the one or more websites according to various embodiments. FIG. 9 provides a flow diagram of a behavior analysis module 900 that is configured to analyze various transaction activities conducted by users over multiple websites, to identify norms of behavior with respect to the transaction activities conducted on the websites, to identify potentially problem users as users whose behavior deviates from the identified norms, and to monitor deviation from norms and changes in individual user behavior over time according to various embodiments. FIG. 10 provides a flow diagram of a chargeback module 1000 that is configured to facilitate providing information associated with a chargeback request received by a website for a transaction activity the user has conducted on the website according to various embodiments. FIG. 11 provides a flow diagram of an authorization module 1100 that is configured to facilitate a website seeking authorization for a purchase to a user's credit card according to various embodiments. FIG. 11A also provides a flow diagram of the authorization module 1100 according to other embodiments. FIG. 12 provides a flow diagram of a settlement module 1200 that is configured to facilitate settlement of transaction activities for a particular website according to various embodiments. FIG. 13 provides a flow diagram of an ASP module 1300 that is configured to facilitate dispersing settlement funds from transaction activities according to various embodiments. These modules 500, 600, 800, 900, 1000, 1100, 1200, and 1300 are described in greater detail below.

Registration Module for Registration Directly with OSP

As previously described herein, in various embodiments, the OSP server 400 may include a branded registration module 500 that is configured to register users directly with the OSP. Once registered in accordance with this model, the user may, in certain embodiments, use this registration to engage in activities on one or more of the websites associated with the OSP (e.g., purchasing restricted goods and/or services, experiencing media such as a video, or placing a wager). Typically, in these and still other embodiments, a user will arrive at a registration webpage either by visiting the OSP's branded webpage directly, or by accessing the webpage through an operator's website and being redirected to the OSP's branded webpage. For instance, in at least one embodiment, the user may visit a website branded and hosted by the OSP over the Internet and may directly therefrom access the registration webpage. In other embodiments, the user may first visit an operator's website over the Internet and be redirected to the registration webpage for the OSP.

Accordingly, FIG. 5A illustrates a flow diagram of the registration module 500 according to various embodiments. This flow diagram may correspond to the steps carried out by the processor 405 in the OSP server 400 shown in FIG. 4 as it executes the module 500 in the server's RAM memory 467 according to various embodiments.

According to various embodiments, the user visits a website branded and hosted by the OSP and selects an option on the website to register with the OSP. In these embodiments, once the user is registered, he can visit the OSP webpage that lists all participating websites and be redirected to a website of his choice and engage in a transaction without further need for validation. The OSP's system will provide a session certificate (as will be described in further detail below) to the website, which can be added to a credit card transaction. In other embodiments, the user visits an operator's website and selects an option on the website to register and is directed to the OSP's webpage. In response, the OSP's website directs the user to a registration webpage either branded with the operator's website brand or with the OSP's brand, depending on the service proposition desirable for particular applications.

According to various embodiments, the OSP's system 304 is also configured to retrieve (or the website platform 303 provides) one or more device fingerprints for the computing device 301 the user is using to interact with the website. According to certain embodiments, the one or more device fingerprints may include such indicators as the IP address being used by the user's device 301 to communicate with the website and/or some various pieces of data concerning the configuration of the device 301, or hardware identifiers on the device 301, to uniquely identify the device 301, such as the device's MAC address or other unique hardware serial numbers.

Therefore, in these and still other embodiments, the registration process begins with the registration module 500 capturing the device fingerprint, as shown as Step 502A. In particular embodiments, the registration module 500 invokes a location check in response to receiving the user's device fingerprint (e.g., device's IP address), shown as Step 503A. As is described in further detail below, the location check may be any one or more of a geo-IP check system, a registration correlation system, a mobile locator system, a wireless locator system, and/or a latency analysis system. Still further, in certain embodiments, the location check may be performed by a third party provider or by third party software loaded onto the OSP's system.

In any of these and still other embodiments, however, it should be understood that the location check involves at least identifying the physical location of the user's device based on the fingerprint. Therefore, the registration module 500 provides the device fingerprint to the third party provider and the provider returns the location of the user's device 301 to the registration module 500. The location may be accurate to various degrees depending on the embodiment. For instance, the location may be accurate to the national level, the state level, the city/town/area level, and/or within a certain number of feet, all depending on the third party provider's capability and the degree of accuracy desired for particular applications. For example, certain embodiments, may require reasonable assurance of the precise location of the user, down to 500 feet or less, as may be desirable in, for example, online gambling operations.

Further, in various embodiments, the third party provider's location check system/service may be hosted within the OSP's system 304. Such a configuration can, amongst other benefits, help to ensure quicker response times from the third party provider when a request is made for a location. The same applies to other third party providers of various services, all as will be described in further detail below Of course, it should be further understood that in any of these and still other particular embodiments, the registration module 500 is configured to store the location returned by the third party provider in some type of storage media (either local or external) so that the location can be retrieved for later reference, whether by the registration module or otherwise, as may be desirable for particular applications.

In Step 504A, the registration module 500 according to various embodiments captures additional registration details from the user. In particular embodiments, the user may enter the details on the initial registration webpage or may be directed to a different webpage that provides fields requesting the additional registration details. The additional registration details may include a variety of different information according to various embodiments. For instance, such details may include the user's full name, email address, date-of-birth, gender, home address, landline telephone number, mobile telephone number, social security number, driver's license number and state or country, and device fingerprint. In addition, some of these details may be mandatory such as full name, email address, date-of-birth, gender, and home address. Further, the registration details may indicate what types of transaction activities the user wishes to register for so that the user may engage in such activities on the websites associated with the OSP. In still other embodiments, the website registration process may record the type of goods sold, and also allocate a merchant category code thereto. In this way the user validation service in these various embodiments will efficiently and accurately apply any specific legal requirements applicable to such goods and/or that the jurisdictions, where the website and/or the user are located, as may be desirable for particular applications.

In Step 505A, the registration module 500 according to various embodiments, may be configured to validate one or more parts of the additional registration details. For instance, in certain embodiments, the registration module 500 validates the email address, driver's license number, social security number, and home address provided by the user are in correct format. In these and still other embodiments, if the registration module 500 determines one or more of these particular pieces of information are not in the correct format, the registration module 500 may request the user to re-enter the information in the correct format.

Remaining with FIG. 5A, in Step 506A, the registration module 500 according to various embodiments performs a look-up against a jurisdiction database 309 to identify the types of transaction activities the user may engage in for the jurisdiction in which the user is located. For instance, in certain embodiments, the registration module may use the location of the user identified from the device fingerprint and/or the address provided by the user to perform the lookup against the jurisdiction database 309. In particular embodiments, the database 309 may include a mapping of locations versus legality to engage in certain transaction activities in the locations, including registration. Thus, in various embodiments, the legality of engaging in transaction activities on a particular operator's website may be dependent on the types of transaction activities that may be conducted on the website. For instance, the types of transaction activities may involve the purchasing of restricted goods such the non-limiting examples of alcohol, fire arms, and/or adult materials or may involve engaging in activities such as gambling or viewing restricted material. Still further non-limiting examples may comprise tobacco-containing products, alcohol-containing products, weapon-oriented products, drug-oriented products, adult-oriented products, and explosive-oriented products.

Further, in various embodiments, the database 309 may be stored locally on one or more storage media within the OSP's system 304 or stored externally from the OSP's system 304. Thus, in particular embodiments, the lookup performed by the registration module 500 returns a result stipulating the types of transactions the user may engage in based on the location of the user. In embodiments in which the user has identified certain transaction activities to register for, the registration module 500 confirms the results returned from the look up include such transaction activities, shown as Step 507A. If the results do not include the identified transaction activities, the registration module 500 may end the registration process and inform the website and/or the user that the user may not register to engage in such activities, shown as Step 508A.

As a non-limiting example, according to various embodiments, the registration module 500 checks the date-of-birth entered by the user to ensure the user is over the relevant age for the user's jurisdiction, for the identified transaction activities, and/or for a particular minimum age set by the website. For instance, in certain embodiments, the registration module 500 queries one or more external data sources (such as the department of motor vehicles for the state in which the user resides) to verify the user has entered his correct date-of-birth on the registration screen. Once the registration module 500 has verified the user's date-of-birth, the registration module 500 determines whether the user's age is over the required age for the user's jurisdiction for the identified transaction activities, as shown as Step 509A. Such determination may limit the types of transactions the user may be able to engage in on various websites.

Further, in embodiments in which the user or website has identified certain transaction activities for the user to register for, the registration module 500 may confirm whether the user is of the proper age to engage in such transaction activities. If not, the registration module 500 may end the registration process and inform the website and/or user that the user may not register to engage in such activities, shown as Step 510A. Still further, in any of these and still other embodiments, the registration module 500 may save an age verification identifier along with the user's registration information. This identifier may be referenced and/or provided to other websites (e.g., during the registration/validation processes of the user on the other websites) to verify that the user's age has been determined and confirmed.

As described in further detail below, in various embodiments, the OSP (and in particular instances, participating websites) provides users with the opportunity to set limits/restrictions for and/or to voluntarily exclude (e.g., self-exclude) themselves from being able to engage in one or more transaction activities on one or more of the participating websites. Such a mechanism may be helpful in controlling and/or proactively preventing and/or identifying compulsive behavior by limiting the type and/or amount of transaction activities a user may engage in on one or more websites and/or by all-together restricting the user from engaging in transaction activities on one or more websites. For instance, in at least one embodiment, the OSP's website may provide the website with the ability for the user to set limits/restrictions for the user and/or to exclude the user from engaging in transaction activities on one or more participating websites.

As yet another non-limiting example, the OSP may according to various embodiments provide the user with one or more webpages on which the user can enter limits on the amount of money the user is allowed to spend, deposit, and/or wager within a single interactive session with one or more websites and/or over a defined period of time. Further, the user may indicate on one of the webpages to exclude the user from engaging in any transaction activities on one or more of the participating websites. Alternatively the OSP system can be, in these and still other embodiments, configured to automatically exclude the user from all licensed operators' websites when the user elects self-exclusion at one operator's website. In particular embodiments, the externally imposed and/or user imposed limits/restrictions/exclusions and supporting information are stored in one or more exclusion databases 308 within or external to the OSP's system 304, as will be described in further detail below. In at least one embodiment, the OSP may be further configured to search and/or post data to the one or more exclusion databases, as may be desirable for particular applications, upon receipt of pertinent exclusion data for one or more users. In other embodiments, the OSP may be configured to receive on-line exclusion data from multiple websites and from government bodies at Federal, State and Tribal levels, in response to which that data is stored and updated periodically. According to these and still other embodiments, the systems and methods may likewise receive on-line look up requests from websites and conducts searches against user data to determine if a user is excluded, as may be desirable for particular applications.

Thus, in Step 511A, the registration module 500 according to various embodiments performs a lookup in the self-exclusion database 308 based on one or more pieces of information obtained during the registration process to determine whether the user has previously requested to be excluded from being able to engage in any types of transaction activities on the participating websites. (The self-exclusion check according to various embodiments is explained further in FIG. 7 below.) In Step 512A, if the registration module 500 determines from the lookup that the user has requested to be excluded from engaging in certain transaction activities, the registration module 500 may further limit the types of transactions the user may be able to engage in on various websites. In addition, in embodiments in which the user or website has identified certain transaction activities to register for, the registration module 500 determines whether the user has self-excluded from engaging in such transaction activities. If so, the registration module 500 may end the registration process and inform the website and/or the user that the user has been excluded from engaging in such activities, shown as Step 513A. Further, this step of the process may involve a lookup on one or more "black lists" to see if the user has been excluded from registration for some other reason besides self-exclusion, such as being a convicted criminal, or any of a variety of externally-imposed exclusion criteria, as will be described in further detail below.

Continuing with the registration process, in Step 514A according to various embodiments, the registration module 500 performs one or more fraud checks to attempt to prevent organized fraud from occurring on the website. For instance, in certain embodiments, this step includes the registration module 500 performing a "velocity" check to determine whether any registration attempts received within a settable predefined time period (e.g., within the last sixty minutes) includes duplicate and/or similar registration information. Further, in particular embodiments, this step includes the registration module 500 monitoring the device fingerprints (e.g., IP addresses) received along with the registration attempts to determine whether there are duplicate registration attempts originating from a particular device fingerprint. If the registration module 500 detects possible fraud from any check, the module 500 may end the registration process for the user and/or may record the potential fraudulent attempt (along with the registration information) for future referral. Therefore, in any of these and still other embodiments, the OSP may include fraud checks on its system 304 to attempt to prevent its system 304 from being "flooded" with fraudulent attempts that may affect the performance of the system 304.

At this point, the registration module 500 stores the registration information in storage media located either within or outside of the OSP's system 304, as shown as Step 515A according to various embodiments. In addition, in particular embodiments, the registration module 500 queries the information stored for existing users already registered with the OSP to determine whether the user already has an existing account, shown as Step 516A. For instance, in one embodiment, the registration module 500 searches the information stored for existing users based on a combination of one or more of email address, full name, home address, telephone number, and/or date-of-birth entered by the user. If the registration module 500 determines the user's registration information matches information for an existing user (e.g., determines an account already exists for the user), the registration module 500 ends the registration process and informs the user, shown as Step 517A. Alternatively or additionally, according to any of these and still other embodiments, the information match may relate to an account at another operator's website and may expedite the registration of the user at a second operator's website.

In contrast, if, according to various embodiments, the registration module 500 determines the user does not have an existing account, the registration module 500 performs a "Know-Your-Customer" (KYC) check to verify the identity of the user, shown as Step 518A. In certain embodiments, the KYC check involves the registration module 500 contacting a third party provider to verify the user's identity. As is described in further detail below, this may involve the registration module 500 providing a single submission of registration information to the third party provider and providing a dialogue type of submission of registration information to the third party provider in various embodiments (e.g., submitting information, receiving a response, and requesting subsequent information from the user). For instance, the registration module 500 submits initial registration information to the third party provider. In response, the third party provider confirms the initial registration information matches to other available information such as publicly held information or credit information. For example, the third party provider confirms the user provided his correct driver's license number by comparing the number with available records for the department of motor vehicles for the appropriate state.

In various embodiments in which the third party is unable to match the user's initial registration information with information from the one or more data sources, the third party provider requests additional information from the user to use in obtaining a match for the user with the one or more data sources. In these particular instances, the third party provider may send an indicator to the registration module 500 as to whether the user's details were matched along with a request for additional information. Thus, in Step 519A, the registration module 500 determines if the third party was able to match the user's details. If the registration module 500 determines the third party provider was unable to match the user's details, the registration module 500 requests additional information from the user, shown as Step 520A. For instance, in one embodiment, the registration module 500 requests the user to provide information for optional questions in which the user did not originally provide an answer for. The user provides the answers to the questions and the registration module 500 forwards the answers to the third party provider. As a result, the third party provider can use the additional information provided in the answers to increase the probability of matching the user's details with information found in the one or more data sources. For example, the third party provider may be unable to establish a match for the user based on the user's name and address. The third party provider may then request the user's social security number to improve the likelihood of finding a match for user's details with information stored in the one or more data sources.

According to various embodiments, if the third party provider is able to match the user's details with information found in the one or more data sources, the process continues with the registration module 500 asking one or more questions formulated to verify the user providing the information is actually the user registering with the OSP, shown as Step 521A. This may be referred to as knowledge based authentication ("KBA"). In certain embodiments, these questions are based on details only the user, as identified, would normally be able to provide. For instance, a possible question may be to have the user provide a date-of-birth for his spouse and/or his mother's maiden name. In particular embodiments, the registration module 500 may formulate the questions, while in other embodiments the third party provider may formulate and provide the questions. The answers to the questions are then used by the third party provider to determine whether the answers are correct by authenticating the answers using the user's details from the one or more data sources and thus verifying the user providing the information is actually the user registering with the OSP. Further, in particular embodiments, the registration module 500 stores the results of the Know Your Customer ("KYC") and/or Knowledge Based Authentication ("KBA") check(s), shown as Step 522A.

Therefore, in Step 523A according to various embodiments, the registration module 500 determines whether the user has passed the KYC check. For instance, in certain embodiments, the registration module 500 makes this determination by evaluating whether the information provided by the user and the details obtained from the data sources correlate (e.g., whether the information provided by the user adequately matches the details obtained from the data sources). While in other embodiments, the registration module 500 receives some indication from the third party provider whether the user's identity has been authenticated. If the registration module 500 determines the user's identity has not been authenticated (e.g., the KYC check failed), the registration module 500 ends the registration process, shown as Step 524A. Thus, in particular embodiments, the registration module 500 sends an indication to the website and/or the user that the user's identity could not be authenticated. However, if the registration module 500 determines the user's identity has been authenticated, the module 500 issues a unique user identifier to the website or to particular user, shown as Step 525A. As is described in greater detail below, this unique user identifier is unique within the OSP's system 304 and is associated with the user along with any information (e.g., one or more accounts) stored in the system 304 for the user.

In various embodiments, the registration module 500 may wait to perform this step until the entire registration process has successfully completed and the module 500 has not encountered a failure within the process. However, in other embodiments, the registration module 500 may perform this step earlier in the registration process so that any information obtained and/or failures/successes of various checks may be stored along with the unique identifier at the time the information and/or results for the checks are obtained by the registration module 500 so that such information/failures/successes may be referenced at a later time. (However, it should be noted that the registration module 500 may be configured in various embodiments to associate the information/failures/successes with the unique user identifier at a later time in the process such as at the successful completion of registration.) According to various embodiments, the unique user identifier may be any one of a number of different types of identifiers. For instance, in one embodiment, the unique user identifier is represented as an alphanumeric value.

Once the registration module 500 has issued the user a unique user identifier, the module 500 may request the user to provide a password to associate with the identifier in particular embodiments. Of course, in other embodiments, the module 500 may generate a password along with the unique user identifier. In still other embodiments, the website may generate the password and possibly a user name for the user, and that data will be linked to the unique user identifier provided by the OSP registration module, as may be desirable for particular applications.

In various embodiments, the registration module 500 may request the user to register a credit card with the OSP. Once registered, the credit card may be used by the user for certain transaction activities such as making purchases on a website and/or depositing funds with a website. Further, in particular embodiments, the credit card may be used by the website to make payments to the user such as, for example, paying winnings to the user as a result of gambling activities. Therefore, in Step 526A, the registration module 500 captures credit card details from the user. For instance, this step may entail the user being presented with one or more webpages on which to provide the appropriate information such as the type of credit card, the credit card number, the name on the card, the billing address, and the expiration date for the credit card.

In addition, in various embodiments, the registration module 500 may encrypt one or more pieces of the credit card information before storing the information. The OSP's system in these and still other embodiments will generally be PCI compliant. However, if the website is not PCI compliant, the OSP system will generate a token identifier for the credit card to pass to the website, thereby obviating the need for the website to go through the expensive process of becoming PCI compliant and maintaining it.

If for some reason the user does not have a valid credit card to register, in various embodiments, the registration module 500 may according to various embodiments refer the user to a credit card issuer, shown as Step 527A. Thus, in certain embodiments, the registration module 500 may be in communication with one or more third party providers (e.g., credit card issuers) and the registration module 500 directs the user to a website associated with one of the credit card issuers so that the user may "sign up" for a credit card with the credit card issuer. Once the user has signed up for the card and has obtained the card (e.g., credit card number), the user may be redirected back to the registration process and associated webpages for entering the information for the credit card at Step 526A.

Further, in particular embodiments, the registration module 500 may acquire a credit score for the user, shown as Step 528A. Similar to other registration steps, in these embodiments, the registration module 500 may communicate with one or more third party providers to obtain the credit score for the user. For example, in one embodiment, the registration module 500 communicates with Equifax® (e.g., Equifax's system) over a secured communication channel to obtain the user's credit score. Once the registration module 500 receives the score, the module 500 stores the score along with the other information collected for the user. Finally, upon successful completion of the registration process, the registration module 500 transmits the unique user identifier and password (if applicable) to the website, shown as Step 529A. The credit score may be used to set or recommend user limits on the website.

Thus, an advantage experienced in various embodiments of the invention as a result of registering with the OSP is that the OSP may provide a branded website directly to the user, whereby the user may use the registration (e.g., the unique user identifier) on a plurality of websites associated with the OSP to facilitate engagement in activities on the websites. For instance, the OSP may require participating websites to go through a signup process and may provide an identifier (e.g., branding mark/logo) to place on operators' websites to indicate to users that they may use their OSP registration on the operators' websites. Therefore, a user visiting a particular operator's website associated with the OSP that provides restricted transaction activities such as alcohol purchases may use his unique user identifier and password on the website to "log in" and be validated to engage in such purchases on the website with a simple validation process and without having to go through a registration process for the particular website.

Further, in various embodiments, use of the unique user identifier may identify and link information obtained from a plurality websites for the user. As a result, the information associated with multiple websites may be shared among the websites in various embodiments. In addition, a user having a unique user identifier employed across multiple websites allows data to be collated and results in a reflection of the user's complete behavior across the multiple websites. Further, such capabilities may provide better efficiencies and may reduce needed computing capacities in these various embodiments because each individual website may not be required to conduct a registration process for a particular user to determine whether the user may engage in transaction activities with each individual website. Instead, each individual website may rely on the registration completed by the user with the OSP and a simple validation process.

Thus, in particular embodiments, the validation of the unique user identifier and user password may be used by the website as "proof" that the user has successfully gone through the registration process with the OSP. For instance, as explained in greater detail below, a website may redirect the user to the OSP to validate the unique user identifier and password and thereby to verify what transaction activities the user may be "approved" to engage in on the website. As a non-limiting example, the user may wish to engage in a restricted transaction activity on the website such as viewing adult material. In these and still other embodiments, the OSP responds back to the website's redirection of the user for validation of the user's unique identifier and password indicating that the user may be "approved" to view such material. As a result, the user is not required to go through the registration process with the specific operator and/or website in order to engage in transaction activities on the website. The OSP will provide a session certificate, which can be incorporated into a credit card transaction data field to signify that the user complied with any restricted sale's legal obligations.

Of course, wherever referenced previously and/or subsequently herein, it should be understood that the particular flow diagram shown in FIG. 5A represents one embodiment of the many various embodiments of registration module 500 and it is contemplated that the sequence of steps shown in the diagram may be ordered differently in other embodiments and/or where such may be desirable for particular applications. As a non-limiting example and as previously described herein, the registration module 500 may be configured in particular embodiments to issue the unique user identifier earlier in the registration process so that the gathered information and/or results for checks can be stored and associated with the identifier as the module 500 obtains the information and/or performs the checks.

Still further, it should be understood that in various embodiments, the registration module 500 may not be required to perform all of the steps in the registration process in light of the types of transaction activities the OSP may be registering the user to engage in with regard to certain websites. For instance, as a non-limiting example, a user may initially register with the OSP to engage only in unrestricted transaction activities such as making purchases on various clothing websites. Therefore, such an instance, the registration module 500 may not be required to verify the age of the user because the purchasing of clothing is not typically restricted based on age. In addition, in various embodiments, a user may register with a website through the OSP to conduct certain types of transaction activities that may be applicable to other types of transaction activities. For instance, the user may initially register with a website contracted with the OSP so that the user may engage in gambling activities. The user may later wish to register directly with the OSP so that he may engage in adult-themed activities. In this particular instance, the registration module 500 may receive the request to register the user for adult-themed activities and the registration module 500 may identify that the user has previously been registered to engage in gambling activities.

Therefore, it should be understood that according to various embodiments of the registration module 500, such may be configured to determine that the registration process for both types of transaction activities is the same and may apply the successful registration for engaging in gambling activities to the registration of adult-themed activities. Indeed, in certain embodiments and as previously described herein (e.g., for gambling activities) the OSP will be operating in white label mode on behalf of the gambling website, while in other embodiments (e.g., for adult themed activities) the user will be registering with the OSP's branded site and the OSP will therefore provide the user, upon successful registration, with his unique user identifier and password. Hence, in any of these and still other embodiments, the user can then use the unique user identifier and password at any participating merchant going forward, supplying a heightened degree of efficiency and effectiveness across the system, as has been described previously herein.

Registration Module for Registration on an Operator's Website

In various embodiments, as has been at least briefly described previously herein, an operator and/or website may require a user to open an account with the particular operator and/or website in order for the user to engage in transaction activities on a particular website. For instance, one or more gambling websites may require users to have accounts associated with each particular gambling website to help facilitate gambling activities conducted on these websites. For example, such accounts may help to facilitate users depositing funds with the gambling websites to be used in placing bets on these websites. Under this type of registration, a user will typically select the website's registration option first and then be redirected to the registration webpage for the OSP. Of course, in still other embodiments, the user may also visit the OSP's directly to register with a particular operator and/or website, as may be desirable or more beneficial for particular applications.

Accordingly, FIG. 5B illustrates a flow diagram of the registration module 500 according to various embodiments for this type of registration. Similar to above, this flow diagram may correspond to the steps carried out by the processor 405 in the OSP server 400 shown in FIG. 4 as it executes the module 500 in the server's RAM memory 467 according to various embodiments.

According to various embodiments, the user visits a website hosted by a website associated with the OSP and selects an option on the website to register on the website. In response, the website directs the user to a registration webpage. In particular instances, the webpage may request the user to enter a username and password. Thus, the user types in a username and password and the website checks to ensure the username is unique. That is, the website checks to ensure that another user has not already used the username to register with the website. Once the website has verified the username is unique, the website (e.g., website platform 303) redirects the user to the OSP's system 304 and provides the username of the user.

In particular embodiments, the OSP's system 304 may generate a connection token for the particular user and may send the connection token back to the website's system 302. If the user is returned back to the OSP's system 304 (e.g., the registration webpage) during the registration process, the website's system 302 provides the connection token. The OSP's system 304 then verifies the connection token is valid. If the connection token is valid, the registration process is allowed to continue. On the other hand, if the connection token is invalid, the registration process is not allowed to continue and the user is directed back to the website. In these particular embodiments, such a token provides a mechanism to prevent connection hijacking of a user during transfer of the user between the website and the OSP's system 304. Such a token may also be issued during the validation process (described below) and returned back to the OSP's system 304 during an interactive session with the website to prevent session hijacking of a user.

Returning to the registration process according to various embodiments, the OSP's system 304 invokes the registration module 500. In the particular embodiments in which the user has been required to provide a username that has been forwarded to the OSP's system 304, the system 304 provides the module 500 with the username. Further, in particular embodiments, the OSP's system 304 retrieves (or the website platform 303 provides) one or more device fingerprints for the computing device 301 the user is using to interact with the website. Therefore, the registration process begins in at least these and still further embodiments with the registration module 500 capturing the device fingerprint, shown as Step 502B. Similar to the previous registration process described, in particular embodiments, the registration module 500 invokes a location check in response to receiving the user's device fingerprint (e.g., device's IP address) to identify the user's location, shown as Step 503B. In certain embodiments, the location check may comprise one or more of the non-limiting examples of a geo-IP check system, a registration correlation system, a mobile locator system, a wireless locator system, a latency analysis system, and/or any of a variety of combinations of one or more of such systems.

In Step 504B, the registration module 500 performs a lookup against a jurisdiction database 309 to identify whether the user is located in a jurisdiction (e.g., based on the location returned from the Geo-IP check) that permits the user to register with the website. As previously mentioned, in various embodiments, the legality of registering on a particular website may be dependent on the types of transaction activities that may be conducted on the website. Thus, in particular embodiments, the lookup performed by the registration module 500 returns a result stipulating whether the user is allowed to proceed with the registration process. Therefore, in Step 505B, the registration module 500 evaluates the result of the lookup to determine if the user is located in a jurisdiction that permits the user to engage in the transaction activities involved with the website. For example, if the registration module 500 determines that the user is not in a jurisdiction that permits the user to engage in the particular transaction activities (Step 506B), the module communicates such to the website. In turn, the website informs the user that he is not permitted to register (and engage in the transaction activities) with the website.

Instead, however, if the registration module 500 determines the user is located in a jurisdiction that permits the user to engage in at least one type of transaction activity involved with the website, the registration module 500 captures additional registration details from the user, shown as Step 507B. In particular embodiments, the user may enter the details on the initial registration webpage or may be directed to a different webpage that provides fields requesting the additional registration details. As discussed with respect to the previous registration process described above, the additional registration details may include a variety of different information according to various embodiments.

Remaining with FIG. 5B, in Step 508B according to various embodiments, the registration module 500 validates one or more parts of the additional registration details according to various embodiments. For instance, in certain embodiments, the registration module 500 may query one or more external data sources (such as the department of motor vehicles for the state in which the user resides) to verify the user has entered his correct date-of-birth on the registration screen. If the registration module 500 determines the user's age is not over the required age for the user's jurisdiction and/or set by the website, the registration module 500 may end the registration process and may inform the website of the determination. In turn, the website may inform the user that he is too young to register.

Continuing with the registration process, in Step 509B, the registration module 500 performs one or more fraud checks to attempt to prevent organized fraud from occurring on the website. Therefore, although it is contemplated that the website may institute its own fraud checks on its website to prevent fraudulent activity occurring, as previously explained, in various embodiments the OSP may include additional fraud checks on its system 304 to attempt to prevent its system 304 from being "flooded" with fraudulent attempts that may affect the performance of the system 304.

Once the user has entered the additional registration details and the details have been verified and the fraud checks have been performed, the registration module 500 stores the registration information in storage media located either within or outside of the OSP's system 304, shown as Step 510B. At this point, in particular embodiments, the registration module 500 queries the information stored for existing users already registered with the OSP to determine whether the user already has an existing account, shown as Step 511B. For instance, in one embodiment, the registration module 500 searches the information stored for existing users based on a combination of one or more of email address, full name, home address, telephone number, and/or date-of-birth entered by the user.

If the registration module 500 determines the user's registration information matches information for an existing user (e.g., determines an account already exists for the user) and is of recent set up, the registration module 500 ends the registration process and informs website, shown as Step 512B, of the user's successful registration. If the previous user registration was with the same website, the website will be advised accordingly and the website may facilitate providing the user with a reminder displayed on the website to the user to help the user remember the username and/or password previously used to register with the website. In contrast, if according to various embodiments the registration module 500 determines the user does not have an existing account, the registration module 500 performs a KYC check to verify the identity of the user, shown as Step 513B. In various embodiments, this check is carried out in similar fashion as detailed with respect to the previous registration process described above.

In various instances in which the third party is unable to match the user's initial registration information with information from the one or more data sources, the third party provider may, according to various embodiments, request additional information from the user to use in obtaining a match for the user with the one or more data sources. Thus, the third party provider may send an indicator to the registration module 500 that the user's details were not matched, along with a request for additional information in Step 514 B and Step 515B. As a result, the third party provider can use the additional information to increase the probability of matching the user's details with information found in the one or more data sources. If the registration module 500 determines, in these and/or still other embodiments, that the third party provider is able to match the user's details with information found in the one or more data sources, the registration module 500 facilitates asking one or more KBA questions that typically only the user could correctly answer formulated to verify the user's identity, shown as Step 516B. Still further, in particular embodiments, the registration module 500 stores the results of the KYC and KBA checks, shown as Step 517B.

Therefore, in Step 518B, the registration module 500 determines whether the user has passed the KYC check, e.g., provided accurate registration information and correct answers to the questions. If the registration module 500 determines the user's identity has not been verified (e.g., the KYC check failed), the registration module 500 ends the registration process, shown as Step 519B. Thus, in particular embodiments, the registration module 500 may send an indication to the website that the user's identity could not be authenticated and the website may inform the user of the same. In other embodiments, the registration module 500 may be configured to perform "fuzzy" type matching with respect to one or more of the attributes of the registration information and/or stored information for various subscribers already registered. In particular embodiments, the registration module 500 may use a confidence factor to determine whether a match is found. Of course, it should be understood that any of a variety of factors and/or logic analysis may be performed and/or incorporated within the registration module 500, as may be desirable for particular applications, without departing the nature and scope of the invention, as described herein.

If, in accordance with various embodiments, the registration module 500 identifies one or more accounts that have information that matches and/or is similar to the information received from the user, the module 500 links the user's information (e.g., new account) with the existing accounts, shown as Step 521B. In certain embodiments, this may be accomplished via a unique user identifier that has been issued by the OSP to the one or more websites or to the particular user, depending on the type of registration. Further, in particular embodiments, this step may also identify an account the user has already opened with the particular website (similar to the check performed in Step 511B). This may be the case because in at least these particular embodiments, this check may involve comparing more information than what was reviewed in the initial check performed in Step 511B. Further, in particular embodiments, if the module 500 determines the user has already registered with the OSP and/or any of the, the module 500 may skip later steps in the process such as checking the minimum age of the user, capturing the user's credit card details, and/or checking the user's credit score.

In Step 522B, the registration module 500 performs a lookup in the self-exclusion database 308 based on one or more pieces of information obtained during the registration process to determine whether the user has previously requested to be excluded from being able to engage in transaction activities on the website. (The self-exclusion check according to various embodiments is explained further in FIG. 7 below.) In Step 523B, if the registration module 500 determines from the lookup that the user has requested to be excluded from engaging in transaction activities on the website, the registration module 500 ends the registration process and informs the website that the user has requested to be excluded, shown as Step 524B. In turn, the website may report this to the user.

However, if the registration module 500 determines that the user has not requested to be excluded, the registration module 500 performs a lookup in the jurisdiction database 309 to determine whether the user's "verified" age (as a result of the KYC check) is over the minimum age requirement for the particular jurisdiction the user is located in, shown as Step 525B. Thus, in various embodiments, having identified the user's jurisdiction from the Geo-IP check (Step 503B) as well as the user's age from the KYC check (see Step 513B), the registration module 500 performs a check to ascertain whether the user is of sufficient age to register for the jurisdiction where he is located. Depending on legal parameters, the jurisdiction check could alternatively be conducted based on his residency address. Further, as previously mentioned, the jurisdiction database 309 may be configured so that, as a secondary check requirement, individual websites can specify the minimum age required to engage in transaction activities with the website (e.g., an age limit higher than that set by the jurisdiction). In addition, in particular embodiments, individual websites may specific in the jurisdiction database to exclude users from engaging in transaction activities altogether with the websites regardless of age.

In Step 526B, if the registration module 500 determines the user's age is not above the required minimum(s), the registration module 500 ends the registration process and notifies the website, shown as Step 527B. If the registration module 500 determines the user's age is above the required minimum(s) for the jurisdiction and website, in particular embodiments, the registration module 500 may save an age verification identifier along with the user's registration information. This identifier may be referenced and/or provided to other websites (e.g., during the registration process of the user on the other websites) to verify that the user's age has been determined and confirmed.

As previously described, in particular embodiments, the OSP's registration module 500 may request the user to register a credit card with the particular website. Therefore, in Step 528B according to certain embodiments, the registration module 500 captures credit card details from the user and performs a specific authorization request for a predetermined monetary value (e.g., $1) to confirm the card is not fraudulent. Of course, in still other embodiments, if for some reason the user does not have a valid credit card to register, the registration module 500 may refer the user to a credit card issuer, shown as Step 529B. In such embodiments, the website may have an arrangement for the issuer to provide a co-branded credit card to the user. In any of these and still other embodiments, once the user has signed up for the card and has obtained the card, the user may be redirected back to the registration process and associated webpages for entering the information for the credit card at Step 528B. Still further, in particular embodiments and as previously described herein, the registration module 500 may acquire a credit score for the user, shown as Step 530B.

As previously mentioned, at Step 520B, the registration module 500 determines whether any other accounts exist for the particular user with regard to the other participating websites. As further mentioned, if the registration module 500 finds such account(s), the registration module 500 links the account being created for the particular website with the other existing accounts for the user in Step 521B. These accounts are linked in the OSP's system 304 via the unique user identifier for the particular user.

However, if in any of these and still other embodiments the registration module 500 does not locate any existing accounts for the particular user in Step 520B, then a unique user identifier is not identified for the user. In such embodiments, the registration module 500 issues a unique user identifier for the user, shown as Step 531B. In various embodiments, the registration module 500 may wait to perform this step until the entire registration process has successfully completed and the module 500 has not encountered a failure within the process. However, in other embodiments, the registration module 500 may perform this step earlier in the registration process so that any information obtained and/or failures/successes of various checks may be stored along with the unique identifier at the time the information and/or results for the checks are obtained by the registration module 500 so that such information/failures/successes may be referenced at a later time, such as at another time in which the user may be attempting to register with the same or another website. Of course, it should be noted that the registration module 500 may be configured in various embodiments to associate the information/failures/successes with the unique user identifier at a later time in the process such as at the successful completion of registration.

Thus, an advantage experienced in various embodiments of the invention is that the unique user identifier may be used to identify and link information obtained from a plurality of websites for the user, including subsequent transaction history. As a result, the information associated with the multiple websites may be shared on a sanitized basis among the—websites in various embodiments and used for analysis. Such capabilities may provide better efficiencies and may reduce needed computing capacities in these various embodiments because each individual website may not be required to conduct all of the registration process steps for a particular user. This is because one or more steps may have been performed in a previous registration process for the user and the result of the one or more steps may be "shared" and used in the current registration process.

As a non-limiting example according to various embodiments, during a previous registration process for the user, the registration module 500 may have verified the user's age. Therefore, in a current registration process for the same user, the registration module 500 may use the result obtained in the previous registration (e.g., the verified age) and may not need to execute the step in the current registration process to verify the user's age. Thus, the registration module 500 will not need to "waste" the time, resources, and computing capacity to re-verify the user's age Finally, in Step 532B, the registration module 500 redirects the user back to the website and transmits the user's details to the website (e.g., website's system 302). In particular embodiments, this transmission also indicates to the website that the user has successfully registered with the website. The details transmitted to the website may include such information as the user's unique user identifier, name, gender, residential address, email address, phone, and the user's credit score. It should be noted that the user may be redirected back to the website earlier in the registration process according to various embodiments. In these particular embodiments, the website may display a message to the user indicating whether registration was successful or not.

In addition, in particular embodiments, the details transmitted to the website may include a certificate (e.g., digital certificate) indicating the user has been successfully registered and a session identifier to validate the user for allowed transactions. This certificate and session identifier may be used by the website as "proof" that the user has successfully gone through the registration and validation processes with the OSP. For instance, the website may submit the certificate along with a purchase transaction (e.g., submit the certificate along with an authorization request to an issuing bank on a credit card transaction) to demonstrate the user's identity and/or age has been successfully verified. Further, in particular embodiments, the certificate may also be generated by the OSP following the user being validated through a different website to show that the user has successfully gone through the registration and validation process with the OSP. In these particular embodiments, the user may then repeat the validation process with a subsequent website, who will redirect the user to the OSP to prompt for his unique user identifier and password. In response, the OSP may by-pass some of the registration process and simply validate the user and issue a new certificate to the subsequent website.

It should be understood, of course, that in certain embodiments, the session identifier may comprise within the identifier the certificate, which in turn operates as proof the user was validated for conducting a purchase transaction activity. In still other embodiments, the session identifier may actual operate as the proof that the user was validated for conducting the purchase transaction activity, without the need for a separate embedded and/or stand-alone certificate, as may be desirable for particular applications. In any of these and still other embodiments, as described elsewhere herein, the OSP may be configured to send the session identifier and/or certificate to the first website for incorporation within purchase transaction data for the purchase transaction activity. In at least one embodiment, the session identifier and/or certificate may comprise at least an indication that the user satisfied an age requirement for conducting the purchase transaction activity.

Similar to the registration process described above, it should be understood that the particular flow diagram shown in FIG. 5B represents one embodiment of the registration module 500 and it is contemplated that the sequence of steps shown in the diagram may be ordered differently in other embodiments. For instance, in particular embodiments, the registration module 500 may not capture the user's username. In these particular embodiments, once the user has been re-directed back to the website, the website then requests the user to enter a username and password. The OSP then relies solely upon the unique user identifier when communicating with the website concerning this customer.

Further, in particular embodiments, the registration module 500 may be configured to process a number of users' registrations with a particular website by accepting one or more files from the website that include information for a plurality of users (e.g., the registration module 500 may be configured to perform batch processing of users). Thus, in these particular embodiments, the registration module 500 then executes the registration process for each user listed in the one or more files. However, some of the steps of the registration process may be performed differently than if the registration process 500 were processing a user in real-time. For instance, each user's information (including the user's registration details) is obtained from the one or more files and not directly from the user. Thus, in these particular embodiments, the registration module 500 must be able to perform the KYC check without having to request any additional information from the user at the time the module 500 performs the check. Once the registration module 500 has processed each user listed in the one or more files, the registration module 500 issues a unique user identifier for each user successfully registered (and in some embodiments also for each user unsuccessfully registered) and writes to a summary file information on each user as to whether registration was successful or unsuccessful to be sent to the website.

Finally, it should be understood that in particular embodiments, the registration module 500 may not be required to perform all of the steps in the registration process in light of the types of transaction activities being performed on the website and/or in light of the website's requirements. For instance, if the website is a merchant website for selling chocolate, the registration module 500 may not be required to verify the age of the user because the purchasing of chocolate is not typically restricted based on age. In addition, in various embodiments, the registration of a user on a particular website conducting certain types of transaction activities may be applicable to the registration of the user on another website conducting different types of transaction activities. For instance, the user may initially register with a gambling website though the OSP (and the registration module 500). The user may later visit an adult website and wish to register with the adult website. In this case, the registration module 500 may receive the request to register the user on the adult website and the registration module 500 may identify that the user has previously been registered with the gambling website successfully. In these particular instances, the registration module 500 may be configured to determine that the registration process for both websites is the same and may apply the successful registration on the gambling website to the registration on the adult website. As a result, in various embodiments, the registration of a user may be applicable across multiple industries.

Validation Module

In various embodiments, the OSP server 400 may also include a validation module 600 that is configured to validate what transaction activities users may engage in when logging in to a website associated with the OSP (e.g., validate sessions with the various websites associated with the OSP). This module 600 is invoked when a user logs in to a particular website for a separate session to the successfully registration. If the website is configured to allow a user to proceed in the original registration session to undertake transactions, further validation is not necessary. In this instance, the handover of the user to the website on successful registration will include a session identifier to permit allowed transactions within the same session. FIG. 6 illustrates a flow diagram of the validation module 600 according to various embodiments. This flow diagram may correspond to the steps carried out by the processor 405 in the OSP server 400 shown in FIG. 4 as it executes the module 600 in the server's RAM memory 467 according to various embodiments.

In various embodiments, the validation process is integrated in the middle of a website's login process. Therefore, in these particular embodiments, a part of the login process on a website is the validation of the user's details within the OSP's system 304. The OSP's system 304 will use the details to check to ensure the user is allowed to login into the particular website and engage in transaction activities on the website.

As previously mentioned, in various embodiments, the website may provide some indication on its website that it is associated with the OSP. For instance, the website may display the OSP's logo to indicate to users that they may use their branded OSP registrations (e.g., their unique user identifiers and/or passwords) on its website. While in other embodiments, the website may require users to use its branded registrations to be able to log in to its website. Therefore, the validation process begins with the user visiting the website and either entering his username and password for access to the website or with the user responding to the OSP branded prompt that he is an OSP registered user.

In the first instance according to various embodiments, the website validates the username and password and links the user to the unique users' identifier and then redirects the user to a validation webpage within the OSP's system 304. In the second instance according to various embodiments, the website redirects the user with a request for an OSP registered user validation. The OSP system then prompts for the user to enter his unique user identifier and password for validation. In response, the OSP's system 304 invokes the validation module 600 and provides the module 600 with the login information.

Depending on the embodiment, the website may retrieve the user's unique user identifier assigned during the registration period and may submit the unique user identifier to the OSP's system 304. In other embodiments, the website may simply submit the user's username (and in some cases, an identifier for the website) and the OSP's system 304 retrieves the unique user identifier from either local or external storage. Further, in various embodiments, the OSP's system 304 may also obtain one or more device fingerprints from the device the user is using to communicate with the website, such as the device's IP address and/or MAC address. Similar to the unique user identifier, the website may submit the one or more device fingerprints to the OSP's system 304 or the OSP's system 304 may retrieve the fingerprints directly from the user's device. As a result, in Step 602, the validation module 600 residing in the OSP's system 304 receives the unique user identifier and the one or more device fingerprints.

In Step 603, the validation module 600 performs a lookup of the user's details. In various embodiments, this entails the validation module 600 querying one or more data storage devices based on the unique user identifier to retrieve information stored on the user in such storage. For instance, the information on the user may include the information gathered from the user and from checks performed during one or more registration and/or validation processes for the user.

As shown in FIG. 6, the validation module 600 in various embodiments may be configured to perform various steps of the validation process at substantially the same time. For instance, the flow diagram shown in FIG. 6 presents the module 600 performing the self-exclusion check, the jurisdiction check, the OFAC check and the PEP check at virtually the same time. Describing first the self-exclusion check, in Step 604, the validation module 600 performs a lookup on the self-exclusion database 308 to determine whether the user has imposed one or more limits/restrictions and/or has voluntarily excluded himself from being able to engage in one or more types of transaction activities. In certain embodiments, the lookup may seek to identify a match against a unique user identifier provided by the user, while in other embodiments, the lookup may seek to identify and match the user based upon at least a portion of user-provided and/or previously stored registration data. In any event, as previously described, such a mechanism may be helpful in controlling compulsive behavior by limiting the types and/or amount of transaction activities a user may engage in and/or by all-together restricting the user from engaging in certain types of transaction activities. Therefore, in Step 605, the validation module 600 determines whether the user has imposed such a restriction on themselves with respect to the types of transaction activities performed on the website. This check is conducted by the OSP rather than the website to accommodate self-exclusions that apply nationally, at State level or across multiple websites.

If the validation module 600 determines the user has self-excluded from being able to engage in all the types of transaction activities conducted on the website, the validation module 600 fails to validate the user's session with the website, shown as Step 606. Thus, in particular embodiments, at the end of this check the validation module 600 has identified any limitations, restrictions, and/or exclusions with respect to the types of transactions conducted on the website. Further, the validation module 600 may also store and/or post to one or more databases the result of the check, in Step 607, so that it may be later referenced during the session identifier issue/validation step as described below. Of course, it should be further understood that, in addition to self-exclusion criteria, the validation module 600 may, according to various embodiments, be configured to apply user exclusions based upon one or more externally-imposed exclusions, including the non-limiting examples of age, jurisdiction, criminal record, or the like, as will be described in further detail elsewhere herein. That being said, any of such exclusions, upon identification, may be stored, posted, and/or updated by the module 600, however as may be desirable for particular applications.

In Step 608, the validation module 600 performs a location check, which may be facilitated by one or more of the non-limiting examples of a geo-IP check system, a registration correlation system, a mobile locator system, a wireless locator system, a latency analysis system, and any of a variety of combinations of one or more of such systems. Similar to the registration module 500, in various embodiments, the validation module 600 may, in at least certain embodiments, call a third party provider to assist in this check. Therefore, in these particular embodiments, the validation module 600 provides one or more device fingerprints (e.g., the user's device's IP address) to the third party provider and the provider returns the location of the user's device based on the one or more fingerprints to the validation module 600. Thus, in Step 609, the validation module 600 performs a look-up against a jurisdiction database 309 to identify the types of transaction activities the user may engage in while in the jurisdiction (e.g., the location returned from the location check). Therefore, in Step 610, the validation module 600 evaluates the result. If the validation module 600 determines the user is not in a jurisdiction that permits the user to engage in any of the types of transaction activities conducted on the website, the validation module 600 fails to validate the session with the website, shown as Step 611.

Instead, however, if the validation module 600 determines the user is located in a jurisdiction that permits the user to engage in at least one of the types of transaction activities conducted on the website, the validation module 600 performs a check on the user's age, shown as Step 612. Similar to the registration module 500, the validation module 600 performs a lookup in the jurisdiction database 309 to determine whether the user's age is over the minimum age requirement for the types of transaction activities conducted on the website for the particular jurisdiction the user is located in (identified in Step 609) or above the in-house age limit set by the website. In Step 613, if the validation module 600 determines the user's age is not above the required minimum, the validation module 600 fails to validate the session with the website. In various embodiments, the validation module 600 may also store the results of the checks and lookups, in Step 614, so that they may be later referenced during the session identifier issue/validation step as described below.

Of course, it should be understood that for various applications, regulatory guidelines exist that require determination of location with varying degrees of certainty. Although each generally require at least a reasonable degree of assurance of location accuracy, upon return of a location check, as previously described herein, varying requirements exist. As a non-limiting example, in the gambling context, location determination may be necessary to a resolution of 500 feet or less, which may require a combination of location checks, including one or more wireless locator systems that incorporate some degree of triangulation upon a device being used by the user. Of course, any of a variety of systems may be incorporated to determine location with a desirable degree of accuracy and reasonable assurance, as may be desired for particular applications, without departing the scope and intent of the present invention.

Further, in particular embodiments dealing with websites, who have users who are US citizens, or websites in the United States, in Step 615, the validation module 600 performs a lookup in one or more third parties' databases holding information on individuals identified by the Office of Foreign Assets Control (OFAC) as having economic sanctions enforced on them. The OFAC compiles a list of entities (e.g., companies and individuals) for which sanctions have been imposed preventing these entities from engaging in trade or financial transactions and other dealings in the United States. Therefore, the validation module 600 performs the lookup to determine whether the user has been identified by the OFAC on this list. Similar to other third party databases previously described, in various embodiments, the one or more databases may be locally hosted by the OSP's system 304 and the system 304 receives periodic updates for the one or more databases. Therefore, in Step 616, the validation module 600 determines whether the user is listed in one or more of the databases (e.g., the validation module 600 queries the one or more databases using the user's full name). If the validation module 600 determines the user is listed, the module 600 fails to validate the session with the website, shown as Step 617. In various embodiments, similar lists may exist with respect to other countries that the validation module 600 may be configured to check.

Similar to the OFAC lookup, in particular embodiments, the validation module 600 also performs a lookup in one or more third parties' databases holding information on individuals identified as political exposed persons (PEP) who are government officials and/or high profile people, shown as Step 618. Similar to other third party databases previously described, in various embodiments, the one or more databases may be locally hosted by the OSP's system 304 and the system 304 receives periodic updates for the one or more databases. In Step 619, the validation module 600 determines whether the user is listed in one or more of the PEP databases (e.g., the validation module 600 queries the one or more databases using the user's full name). In various embodiments, if the validation module 600 determines the user is listed, such information may be communicated to the website and the website may monitor the user appropriately. Thus, in Step 620, the validation module 600 may according to various embodiments store the results of the OFAC lookup and the PEP lookup so that the results may be referenced during the session identifier issue/validation step as described below.

Once the validation module 600 has performed all of the checks and lookups, the validation module 600 reviews the results for the validation checks to confirm whether the user has "passed" the checks, shown as Step 621. In various embodiments, this may involve the validation module 600 retrieving the stored results for all of the checks. Therefore, in Step 622, if the validation module 600 determines the user has failed one or more of the checks, the validation module 600 may end the validation process, shown as Step 623. This may entail the validation module 600 notifying the website that the user could not be validated along with the reason why the user has failed the validation process. In certain embodiments, the validation module 600 may be further configured to notify one or more exclusion databases of the users' inability to engage in certain transaction activities based upon failure of the validation process. In turn, at least the website may, according to these and still other embodiments, notify the user that he is excluded from engaging in transaction activities on the website. As a result, the user will be unable to complete logging into the website and engaging in transaction activities on the website.

However, in Step 622 according to various embodiments, if the validation module 600 determines the user has passed the checks, the validation module 600 issues a session identifier for the user, shown as Step 624. The validation module 600 then redirects the user back to the website and transmits the session identifier to the operator (e.g., operator's system 302 and/or website). In particular embodiments, this transmission may also include information along with the identifier, such as, for example, information on the various transaction activities the user may engage in while involved in the interactive session with the website. For instance, the information may indicate the types of transaction activities the user may engage in along with the times in which the user is allowed to engage such transaction activities in the user's jurisdiction/location and any limitations, restrictions, and/or exclusions with respect to such transaction activities. In the alternative, the information may indicate the types of transaction activities the user is forbidden to engage in along with any limitations, restrictions, and/or exclusions with respect to such forbidden transaction activities. This information is automatically framed by the website's merchant category code, assigned when it registered with the OSP. As a result, the user is able to complete logging into the website and is able to engage in transaction activities on the website.

In various embodiments, a new session identifier is issued for each session the user logs into a participating website. Similar to the unique user identifier, the session identifier may be any one of a number of different types of identifiers according to various embodiments. For instance, in one embodiment, the session identifier is represented as an alphanumeric value. The session identifier identifies the user (e.g., user's unique identifier), the website, the particular interactive session, and, in many instances, the types of transaction activities the user may engage in during the interactive session (or, in the alternative, the types of transaction activities the user may not engage in during the interactive session). Therefore, in various embodiments, the user must go through the entire validation process and be issued a new session identifier each time the user engages in a new interactive session with the website (e.g., each time the user logs into the website).

Thus, in particular embodiments, the session identifier identifies one or more transaction activities the user is "authorized" to engage in on the website during the interactive session. For instance, these activities may include buying, selling, and/or trading goods, viewing and/or listening to media, viewing restricted material, depositing funds with the website, placing a wager (e.g., participating in a gambling activity), and/or withdrawing funds from website. In many instances, the OSP's system 304 is not involved directly with the user engaging in such transaction activities on the website. In these particular instances, the OSP's system simply provides the list of "authorized" transaction activities and the website references the list during the user's interactive session on the website. In addition, in these particular instances, the website may record information on the transaction activities conducted by the user during the interactive session on the website.

In addition, according to various embodiments the OSP's system may provide a certificate along with the session identifier and the list of "authorized" transaction activities to the website confirming validation has been performed for the user's particular interactive session. In certain embodiments, the session identifier may serve as the certificate, while in other embodiments the certificate may be appended to or otherwise embedded within the session identifier, however, may be desirable for particular applications. It should be understood that for any of these and still other embodiments, the website or the OSP may provide the certificate along with a purchase transaction as proof to parties within the value chain that the user was validated. In certain embodiments, as will be described in further detail later, the certificate may provide compelling evidence of validation, as may be desirable for particular applications.

However, in other embodiments, the OSP's system 304 may record the activities conducted by the user during the interactive session with the website along with the session identifier (and, in some cases, information related to the activities). As with other information stored by the OSP's system 304, the system may store the activities and related information in storage media that is located within or outside of the OSP's system 304. Therefore, in these particular embodiments, once a user has been validated and issued a session identifier and the user has requested to engage in a particular transaction activity (e.g., making a purchase) on the website, the website completes the activity for the user and also forwards the information on the activity and corresponding information to the OSP's system 304 along with the session identifier so that the OSP's system 304 can record the transaction activity and corresponding information along with the session identifier.

It should be understood that in various embodiments the session identifier is always linked to the user's unique user identifier. Therefore, according to certain embodiments, a user's sessions conducted with the various participating websites (along with the associated activities, in at least a particular embodiment) can be retrieved from the OSP's system 304 by simply querying the appropriate storage using the user's unique identifier. As a result, a user's validation with respect to the types of transaction activities approved across multiple websites may be reviewed and monitored.

Of course, the particular flow diagram shown in FIG. 6 represents one exemplary embodiment of the validation module 600 and it is contemplated that the sequence of steps shown in the diagram may be ordered differently in other embodiments. For instance, the validation module 600 may be configured in one particular embodiment to execute the self-exclusion check, the jurisdiction check, and the OFAC check sequentially instead of virtually at the same time. Further, in another embodiment, the validation module 600 may be configured to exit once the module 600 has determined that the user has failed any one of the checks. In this embodiment, the module 600 then notifies the operator and/or the website that the user was not validated and gives the reason for failing to validate the user. Finally, the validation module 600 may be configured in various embodiments to issue a session identifier initially after receiving the request to validate the user and before conducting the various checks. In these particular embodiments, the validation module 600 records the results of the each check along with the issued session identifier as each check is performed.

Further, in various embodiments, the validation module 600 may or may not perform various steps of the validation process based on factors such as the website submitting the validation request and/or the types of transaction activities performed on the particular website. For example, the validation module 600 may not perform the minimum age check 612 in a case where the website is a website on which men's clothing is sold. This is because the selling of men's clothing is typically not age restricted.

Therefore, once the website has received the session identifier, the website may use the identifier to validate whether the user can engage in one or more requested transaction activities during the interactive session on the website and may use the identifier to record and identify the activities the user requests and engages in during the interactive session. For instance, as explained, in one embodiment the website receives information along with the session identifier that identifies the transaction activities the user may engage in during the interactive session (and/or the transaction activities the user may not engage in during the interactive session). In this particular embodiment, once the user has requested to engage in a particular activity on the website (such as, for example, making a purchase or placing a wager), the website references the information received along with the identifier to verify that the user has been validated to engage in the particular activity. In another embodiment, upon receiving a request from the user to engage in a particular activity, the website automatically sends information identifying the requested activity and the session identifier to the OSP's system 304. In this particular embodiment, the OSP's system 304 uses the session identifier and determines whether the user has been validated to the conduct the particular activity on the website. The OSP's system 304 then returns information on the determination to the website.

It should further be understood that although various embodiments have been described herein as being configured to provide the session identifier to website with details of all the transaction types the user is allowed to conduct, together with any restrictions such as legal time windows when such transactions can be conducted, in still other embodiments, as may be desirable for particular applications, the session identifier may be additionally and/or alternatively provided to the user, at least initially. In this manner, the user, like the website could be enabled to facilitate subsequent approved transaction activity without further referral between the website and the OSP.

Additional Details on Various Checks

Additional details are provided below on the various checks the registration module 500 and/or the validation module 600 perform according to various embodiments.

Location Check

As previously mentioned, the location check is performed to identify the physical location of one or more device fingerprints (e.g., the IP address) associated with the user's computing device 301. As further mentioned, in various embodiments, this location check may utilize and/or incorporate any one or more of a geo-IP check system, a registration correlation system, a mobile locator system, a wireless locator system, a latency analysis system, and/or a comparable configurable and available system, as may be desirable for particular applications. Where a geo-IP check system is involved, the location check according to certain embodiments involves the registration module 500 and/or the validation module 600 utilizing a third party provider to assist in performing the check. In particular embodiments, this entails the registration module 500 and/or validation module 600 referencing an electronic geo-directory provided by the third party provider. In various embodiments, the directory comprises a database or some other type of searchable application that manages and stores data. Further, in particular embodiments, the OSP's system 304 hosts the geo-directory so that lookups on the directory may be performed more quickly than if the geo-directory was located remotely from the system 304.

Therefore, in various embodiments, the registration module 500 and/or validation module 600 checks the captured device fingerprints against the geo-directory. According to various embodiments, the geo-directory may provide such information as the city, county, state, zip code, latitude, and/or longitude for U.S. locations and/or the city, country, state, providence, latitude, and/or longitude for non-U.S. locations. In addition, the geo-directory may provide a confidence value along with the information that indicates a level of confidence that the provided information is correct for the queried device fingerprints. In particular embodiments, the registration module 500 and/or the validation module 600 may compare the confidence value against a predetermined threshold established by the OSP, the website to determine whether the determined location is acceptable. If the confidence level is not above the predetermined threshold, the registration module 500 and/or validation module 600 may end the registration/validation process.

Further, in particular embodiments, the geo-directory may include information that indicates whether the one or more of the device fingerprints are considered "suspect" or not. For example, in some instances, the user may be using an Internet service provider such as Online America® or EarthLink®. Many times in these instances, the IP address, a device fingerprint captured for the user's device 301, is actually an IP address of a gateway associated with the Internet service provider. Therefore, the physical location of the IP address is the location of the gateway and not the location of the user. A similar instance in which this may also occur is when a user is accessing a website using a browser on the user's mobile device. In this instance, the IP address received from the user is that of a gateway associated with the user's wireless carrier. In these particular embodiments, the geo-directory may have some type of indicator marking such IP addresses. As a result, the geo-directory is able to return information (e.g., the indicator) indicating the IP address is considered "suspect."

According to various embodiments, in instances in which one or more of the device fingerprints are "suspect," the registration module 500 and/or validation module 600 may be configured to perform a mobile IP locator check. First, the registration module 500 and/or validation module 600 retrieves the user's mobile phone number from the information gathered from the user. If the module phone cannot be retrieved, the registration module 500 and/or validation module 600 facilitates having the OSP, website request the user to enter his mobile number, which is sent to the OSP's system 304. The registration module 500 and/or validation module 600 passes the user's mobile number to a third party provider which performs a mobile location check and sends back the jurisdiction result to the registration module 500 and/or validation module 600. One such third party provider is Spriv located in New York. If the user refuses to provide his mobile number then, in various embodiments, the on line registration process and/or validation process is ended.

It should be further understood, as previously mentioned herein, that the location check may comprise one or more (or any combination of) the non-limiting examples of a geo-IP check system, a registration correlation system, a mobile locator system, a wireless locator system, and a latency analysis system. Due to various regulatory guidelines and regimes, the degree of certain to which a determination of location is required varies. Although generally at least a reasonable degree of assurance of location accuracy is required, more stringent requirements do exist. As a non-limiting example, in the gambling context, location determination may be necessary to a resolution of 500 feet or less, which may require a combination of location checks, including one or more wireless locator systems that incorporate some degree of triangulation upon a device being used by the user. Of course, any of a variety of systems may be incorporated to determine location with a desirable degree of accuracy and reasonable assurance, as may be desired for particular applications, without departing the scope and intent of the present invention.

Fraud Check

In various embodiments, the fraud check is performed to ensure users do not enter "garbage" data into the OSP's system 304. As already described, the fraud check may involve checking certain information to identify multiple registration attempts from a single source. In addition, in particular embodiments, once the user has entered and submitted valid registration details and the OSP's system 304 has captured these details, the registration module 500 causes an image with some characters to display on the current webpage the user is on at the time. The webpage then requests the user to fill an adjoining text box to the image on the webpage with the characters on the image. The user enters the characters and the result is returned to the OSP's system 304. Such a request helps to verify that the information being entered by the user is actually coming from the user and that the user's registration has not been "hijacked" by some other party who has provided false details about the user. Thus, if the characters entered by the user match the characters displayed on the image, the registration module 500 updates a fraud flag (included with the information stored for the user) to indicate that fraud has not been detected with regard to the user's registration.

If the entered characters do not match the characters displayed on the image, the user may again be shown an image with characters and the user may again be requested to enter the characters in the text box according to particular embodiments. Depending on the embodiment, the user may be given a predetermined number of chances to enter the correct characters. If at that point the user has still failed to provide the correct characters, the registration process is ended.

KYC Check

As previously mentioned, in various embodiments, the KYC check is performed to verify the identity of a user who is attempting to register with the OSP and/or a website. That is, the KYC check is performed to verify that a user attempting to register is actually the person who he is entering information during the registration process. As further mentioned, in particular embodiments, the registration module 500 makes use of a third party provider to assist in this check. In these particular embodiments, the registration module 500 passes the validated captured registration details to the third party provider. In response, the third party provider cross references this information with one or more data sources (e.g., databases) to attempt to find a match for the details. For instance, the third party provider may cross reference such data sources as state department of motor vehicles databases, internal revenue databases, credit card company databases, and/or the like.

In particular embodiments in which the third party provider does not find a match, the registration module 500 may first request the user to provide information for one or more of the optional fields the user may have previously failed to provide information for during the time the user provided his registration details. The registration module 500 receives the additional details and forwards the additional details to the third party provider. As a result, the third party provider may be able to locate a match based on the additional details provided by the user.

If the third party provider is able to locate a match, in various embodiments, the third party provider (or the registration module 500 in other embodiments) may then perform a knowledge-based authentication check to confirm the identity of the user and may automatically research and formulate one or more questions from public data or credit data. In particular embodiments, these questions may be in the form of multiple choice questions and may concern information about the user that normally only the user would be able to provide the correct answer for. These questions are then presented on line to the user to answer and the registration module 500 forwards the answers to the questions to the third party provider. For example, the third party provider may formulate one or more questions to request the user to identify the banking entity that provided a previous car loan the user had or to identify a car he purchased in a particular year.

Once the third party receives the answers to the questions, the third party provider uses the information initially provided by the registration module 500 along with the answers to the questions to verify the user's identity (e.g., the third party provider confirms the user has provided accurate information by answering the questions correctly). If the third party provider has successfully verified the user's identity, the third party provider sends the results back to the registration module 500 along with a unique identifier (e.g., KYC identifier). In turn, the registration module 500 stores the KYC identifier along with the other registration information gathered for the user. If the third party provider is unable to verify the user's identity after conducting the knowledge based authentication, the third party provider reports the results to the registration module 500 and the module 500 ends the registration process. In particular embodiments, the third party provider may still provide a KYC identifier along with the results for the failed attempt so that the identifier can be stored along with the user's information in the OSP's system 304 to record the failure.

Exclusion & Self-exclusion Checks

In various embodiments, the exclusion and self-exclusion checks are performed to verify whether an external regulation or entity, or alternatively and/or additionally a user has self-excluded from engaging in one or more transaction activities on one or more of the websites. In particular, the self-exclusion check is also performed to determine whether the user has imposed limitations and/or restrictions on the activities the user may engage in on one or more of the websites. As previously mentioned, in particular embodiments, the registration module 500 performs the self-exclusion check to determine whether the types of transaction activities a user may engage in should be limited for a particular user's registration. In other embodiments, the registration module 500 performs the self-exclusion check to determine whether a user has self-excluded from engaging in particular types of transaction activities and therefore should not be allowed to register with a particular website that provides such particular types of transaction activities.

However, in other embodiments, the validation module 600 performs the self-exclusion check to determine whether the user may have imposed one or more limitations and/or restrictions on the activities the user may engage in on a particular website. For example, the validation module 600 may consider whether the user has imposed a limit on the amount of funds the user may lose over a predetermined time period (such as a month) on a gambling website and/or whether the user has imposed a limit on the amount of time the user may spend on an adult website. Accordingly, FIG. 7 illustrates a flow diagram of the self-exclusion check performed by the validation module 600 according to such embodiments.

As previously mentioned, in various embodiments, the validation module 600 typically performs the self-exclusion check (e.g., Step 605 in FIG. 6) during the validation process in which the module 600 validates what transaction activities the user may engage in during the user's interactive session with a particular website. Therefore, in Step 702, the validation module 600 retrieves the self-exclusion information for the user. For instance, in one embodiment, the validation module 600 queries the self-exclusion database 308 using the user's unique identifier to retrieve the information on the user.

In various embodiments, the exclusion database 308 may actually comprise a plurality of databases, at least some of which may not even be "self-exclusion" related. Indeed, externally imposed exclusions exist, such as the non-limiting examples of age, jurisdiction, and/or criminal record, just to name a few. As such, in various embodiments, the exclusion database 308 may be configured at different levels to accommodate searching and reporting (e.g., different hierarchical levels). For instance, in particular embodiments, methods may be in place to organize information on users on different levels in the database 308 such as on a website level, a type of website level, and/or a governmental entity level. For example, legislation may be in place that requires the exclusion database 308 to be configured such that users registered to conduct gambling transactions in the United States are organized on a website level, a type of website level, a state level, and a national level. Thus, in this particular example, a restriction and/or exclusion for a particular user may be managed, searched, and/or applied at a website level, a type of website level, a state level, and/or a national level. Therefore, if a particular state implements a regulation restricting a particular gambling activity, the regulation may be applied, managed, and searched for registered users located in or resident in the state at the time of the transaction session. If a particular user is located in the state that has implemented the restriction on the particular gambling activity the validation module 600 may apply the restriction to the particular user by searching the jurisdiction requirements on a state level during the validation process. Further, in particular embodiments, if the OSP is managing the exclusion database 308 on behalf of an entity such as a state or federal regulator, the OSP may make available a posting, searching, and reporting capability of the exclusion database 308 to websites who otherwise do not use the OSP's services. In this manner, external (e.g., environmental or otherwise) exclusion criteria may also be applied against the user, in addition to, or alternatively to any self-exclusion criteria either provided directly by the user or garnered from the one or more exclusion databases.

Returning now specifically to the "self-exclusion" check process, in Step 703, the validation module 600 determines whether the user has excluded himself from engaging in all of the types of transaction activities provided on the website. Thus, in various embodiments, the user may exclude himself, subject to the law, at any hierarchical level setup in the database 308. For instance, the information stored in the database 308 may indicate the user has excluded himself from the particular website or has excluded himself from all of the participating or licensed websites associated with particular types of transactions (e.g., type of website level such as gambling websites and/or adult websites). In particular instances, the user may have also imposed a cool-off period indicating a period of time the user has requested to be excluded from engaging in particular types of transaction activities. In these particular instances, the validation module 600 also determines whether the cool-off period still applies with respect to the user. For example, the information stored in the database 308 may include a parameter indicating the period of time the cool-off period is to apply for. Therefore, if the validation module 600 determines from the queried information that the user has been excluded, the validation module 600 fails to validate the user's session with the website (e.g., Step 606 in FIG. 6) and ends the self-exclusion check, shown as Step 704.

However, if the validation module 600 determines the user has not excluded himself from engaging in all of the types of transaction activities conducted on the website, the validation module 600 determines whether the user has imposed any limitations and/or restrictions on the activities the user may engage in on the website, shown as Step 705. For example, the user may have imposed a restriction on what types of transactions the user may engage in on the particular website or on all of the participating websites associated with similar types of transactions the user may have imposed a limitation on the number of transactions the user can engage in over a predetermined period of time, or the user may have imposed a restriction on the amount of funds the user may spend/deposit on the particular website or type of websites over a predetermined period of time. In various embodiments, information on the limitations and/or restrictions may be stored in the self-exclusion database 308.

If the validation module 600 determines the user has not imposed any limitations and/or restrictions on himself, the validation module 600 exits the self-exclusion check, shown as Step 706. However, if the validation module 600 determines the user has imposed limitations and/or restrictions on himself, the validation module 600 determines whether the user has or legal compliance requirements have imposed the limitations and/or restrictions over multiple websites (e.g., over all of the participating websites associated with the same types of transaction activities) or has imposed the limitations and/or restrictions for only the particular website, shown as Step 707. For instance, in one embodiment, a flag may be stored along with the information for each limitation or restriction that indicates whether the limitation or restriction is to be imposed on all of the participating websites for the same types of transaction activities or on one or more particular websites. Further, the information may indicate what website(s) the limitation or restriction is to be imposed on.

If the limitation or restriction is to be imposed on multiple websites, the validation module 600 may retrieve information, if available, for the activities conducted by the user on the websites over the applicable period of time, shown as Step 708. For instance, in the example in which the user has imposed a limit on the number of wagers the user can make over a predetermined period of time (e.g., over a month), the validation module 600 retrieves the user's information on wagers the user has conducted on the various websites over the past month. (For instance, this information may be queried using the unique user identifier or, if not available, through a data matching process, following which the unique user identifier can be applied.) If the limitation or restriction is to be imposed on only a particular website, the validation module 600 retrieves information for the transaction activities conducted by the user on the website over the applicable time period in a similar fashion, shown as Step 709.

Once the validation module 600 has retrieved the applicable activity information for the user, in Step 710, the validation module 600 determines one or more parameters based on each limitation or restriction and the activity information. In particular embodiments, these parameters are communicated to the particular website the user is currently interacting with so that the parameters may be used to impose the limitations and/or restrictions on the website, shown as Step 711. For example, the user may have imposed a limit of one-hundred and twenty (120) minutes the user is allowed to spend on the participating websites providing video gaming over a particular month. The activity information for the various websites may indicate that the user has played games for forty-two (42) minutes in the current month on the various websites. Therefore, in this example, the validation module 600 determines a parameter indicating the user may still spend seventy-eight (78) more minutes on these websites during the month and sends this parameter to the website. In turn, in various embodiments, the website enforces the restriction during the user's interactive session with the website. Further, in various embodiments, the website sends information to the OSP's system 304 each time the user engages in gaming on the website. As a result, the next time the validation module 600 performs the self-exclusion check, the parameter indicating the number of minutes the user has left during the month will reflect the minutes the user engaged in gaming during his recent interactive session on the website.

Self-exclusion Module

In various embodiments, the OSP server 400 may also include a self-exclusion module 800 that is configured to facilitate users registering limitations/restrictions on the transaction activities they can conduct on the various websites associated with the OSP and/or to facilitate users excluding themselves from engaging in one or more types of transaction activities on one or more associated websites. Therefore, in various embodiments, the user may, at any time, decide to exclude himself from being able to engage in and/or place limitations/restrictions one or more types of transaction activities associated with one or more websites. However, it should be noted that in many instances, limitations/restrictions on certain transaction activities may be placed on these activities (e.g., mandated) by a website or by some regulatory authority. For instance, the United States may implement federal regulations that mandate limitations/restrictions be placed on certain gambling activities conducted online on websites run by United States based operators.

As previously mentioned, the OSP's system 304 may include or be in communication with a self-exclusion database 308 that contains records on users who have excluded themselves and/or have places limitations/restrictions on certain types of transaction activities they may engage in on the websites. For instance, a particular user may set limits on the amount of funds the user may wager over a predefined period of time or may set limits on the number of wagers the user may place during the predefined period of time. Therefore, although the user may not wish completely to exclude himself from engaging in all activities on one or more websites, the user may wish to "control" his engagement in such activities. Accordingly, in various embodiments, this self-exclusion database 308 may be checked during the registration and validation processes to confirm whether the user has not excluded himself before proceeding with either process.

Typically, a user will arrive at an exclusion webpage either by visiting the webpage directly, or by accessing the webpage from a particular website. For instance, in at least one embodiment, the user may visit a website hosted by the OSP over the Internet and may directly access the exclusion webpage via the website. In another embodiment, the user may first visit the particular website over the Internet and be redirected to the exclusion webpage. Accordingly, FIG. 8 illustrates a flow diagram of the self-exclusion module 800 according to various embodiments. This flow diagram may correspond to the steps carried out by the processor 405 in the OSP server 400 shown in FIG. 4 as it executes the module 800 in the server's RAM memory 467 according to various embodiments.

In certain embodiments, the user initially logs into a website and provides his username (e.g., unique user identifier) and/or password. In response, the website may also initiate the validation process and as a result receive a session identifier. The user selects an option on the website to set up exclusion parameters (e.g., limitations, restrictions, and/or exclusions) and the user is directed to the exclusion webpage and the website provides the user's unique identifier and session identifier, if applicable.

The exclusion webpage may provide the user with a number of options for setting up limitations, restrictions, and exclusions. For instance, in certain embodiments, the webpage may provide the user with the options to set up an exclusion for a selected period of time, such as a twenty-four (24) hour cool-off period, a six-month self-exclusion, a one-year self-exclusion, a two-year self-exclusion, and/or a five-year self-exclusion. In addition, the webpage may provide the user with the option to request help. Further, in these and still other embodiments, the webpage may provide the user with options to set up limitations and/or restrictions for different transaction activities that may be engaged in on the website. As a non-limiting example, the user may set up a restriction that excludes the user from participating in a particular game on the website or the user may set up a limit on the amount of funds the user may spend on the website over a one-month period.

Still further, according to various embodiments, the webpage may provide the user with the option to set up exclusions, limitations, and/or restrictions for one or more particular websites, one or more particular transaction activities, and/or one or more particular transaction activities on one or more particular websites (e.g., at different hierarchical levels). Thus, as discussed in greater detail below, the user may indicate whether the limitations, restrictions, and exclusions apply only to the particular website or to two or more of the participating websites associated with the OSP. Alternatively, the user may be advised that, if he chooses to self-exclude himself from one website, such exclusion will apply by law to all websites offering the same services, e.g., all gambling websites.

Therefore, the user selects one or more of the options and selects a "submit" button on the webpage. As a result, in Step 802, the self-exclusion module 800 receives the user's unique identifier, a session identifier (if applicable), and limitation/restriction/exclusion parameters. For instance, in one example, the user selects the options for a one-year self-exclusion from adult websites and a request for help. Therefore, in this particular example, the self-exclusion module 800 receives the user's unique identifier, a session identifier (if applicable), an indicator for the one-year exclusion, and a flag requesting help.

In Step 803, the self-exclusion module 800 updates the user's status in the self-exclusion database 308. That is, in particular embodiments, the self-exclusion module 800 inserts and/or updates one or more records in the self-exclusion database 308 to reflect the options selected by the user. In various embodiments, the self-exclusion database 308 (e.g., the management system for the database 308) may be configured to send updates (e.g., push updates) periodically to various entities such as participating websites and/or regulating authorities. In these particular embodiments, the various participating entities may maintain a "local" version of the self-exclusion database 308 within their system networks so that the systems can quickly reference the local versions of the database. Therefore, in Step 804, the self-exclusion module 800 advises (e.g., via an API call) the participating entities of the user's selected options. This step may be carried out in real-time or may be batched along with other exclusion updates to be sent to the participating entities at certain time intervals in various embodiments.

Further, in Step 805, the self-exclusion module 800 determines whether the user has requested help. For instance, in various embodiments, help may be provided to users in the form of information and/or counseling on compulsive behavior. Therefore, in various embodiments, if the self-exclusion module 800 determines the user has requested help the module extracts information from the OSP's system 304, such as name, telephone number, unique user identifier, and operator involved, shown as Step 807. In particular embodiments, the information extracted by the self-exclusion module 800 includes the location of the user. For instance, in one embodiment, the information includes the IP address for the computing device 301 being used by the user and the self-exclusion module 800 obtains the location of the user by performing the Geo-IP check, shown as Step 808. Once the self-exclusion module 800 has obtained the user's location, the module 800 queries a list of help centers for the particular compulsive behavior to locate one or more centers that are within a predetermined distance from the user's location, shown as Step 809. This list of help centers may be stored in storage media within the OSP's system 304 or external to the OSP's system 304.

Once the self-exclusion module 800 has the information on the help centers, in Step 810, the self-exclusion module 800 selects the help center nearest the user's location. In particular embodiments, the self-exclusion module 800 sends the information on the help centers to the user. In these particular embodiments, this may involve the self-exclusion module 800 facilitating the mailing of information on the help centers that are within the predetermined distance to the user and/or facilitating the emailing of the information to the user. In other embodiments, this may involve the self-exclusion module 800 facilitating contact of the user by at least one of the help centers. In still other embodiments, this may involve the self-exclusion module 800 presenting the list of available help centers to the user on a webpage and requesting the user to select a preferred help center. In this particular embodiment, the self-exclusion module 800 receives the user's selection of a particular help center, in Step 811, and forwards the help center's details to the user, shown as Step 812. In other embodiments, the self-exclusion module 800 may instead forward the user's details to the selected help center. Thus, in these particular embodiments, the OSP's system 304 may be in communication with one or more systems of help centers that assist individuals with treating compulsive behaviors. In many instances, these centers may then use the information to themselves initiate contact with the user directly so as to provide help, where requested.

Still further, it should be understood that according to various embodiments, a 'request for help' opportunity may be presented to a user beyond simply the context of self-exclusion, as previously described herein. As a non-limiting example, a user may be prompted via a 'pop-up' window with an inquiry as to whether they require help, in response to which the user may choose whether or not to actually request help. In these and still other embodiments, once the request for help is submitted, coordination between the help center and the user may occur in any of the various (and/or still other) manners, as have likewise been previously described herein. In at least one embodiment, it should be understood that the general-context (e.g., beyond selection of self-exclusion criteria) help request prompt may be configured to appear based upon the system identifying potentially problematic behavior, as will be described later herein in much greater detail. Of course, the system may be configured to offer users the opportunity to request help at any of a variety of times during use and/or based upon any of a variety of factors or considerations, as may be desirable for particular applications.

Returning to Step 805 and the context of "self-exclusion," if the self-exclusion module 800 determines the user has not requested help, the self-exclusion module 800 returns the user to the website, shown as Step 806. Depending on the options selected by the user, the user may then be instantly logged out of his session with the website. For instance, returning to the example in which the user selected the option for a one-year self-exclusion from adult websites, the user's option is communicated to the website by the OSP's system 304 directly or by updating the operator's local self-exclusion database and, as a result, the operator and/or website automatically logs the user out of the website. The same may apply at the conclusion of the self-exclusion module 800 sending the user's information to a counseling system, shown as Step 813.

As previously mentioned, the user may according to various embodiments indicate to have his selected options apply to two or more participating websites associated with the OSP. Therefore, in particular embodiments, if the user has excluded himself, the self-exclusion may apply across the multiple participating websites indicated by the user. For instance, returning to the example, the user may have selected the option to apply the one-year exclusion across all the participating adult websites associated with the OSP. Therefore, if the user attempts to register for adult-theme transaction activities after imposing the self-exclusion, the registration module 500 executes the self-exclusion check (e.g., Step 523 in FIG. 5) and determines that the user is not allowed to register for such transaction activities based on the user's self-imposed exclusion on the first adult website. In various embodiments, such a mechanism makes use of less computing capacities and use of less memory because in many instances the individual websites do not need to maintain their own system for recording and tracking individuals who should be excluded from participating in certain types of transaction activities on the websites. Further, in various embodiments, such a mechanism allows for a more robust system for monitoring and restricting compulsive behavior because having a centralized mechanism facilitates casting of a wider net over such compulsive behavior.

Further, in various embodiments, a user may indicate to enforce limitations and/or restrictions over two or more of the participating websites associated with the OSP. For example, the user may set a $500 limit on gambling losses for each month for all of the participating gambling websites associated with the OSP. In this example, the user visits a first gambling website and losses $350 gambling on the website. A couple of days later (and within the month), the user visits a second gambling website and logs into an interactive session with the second gambling website. Because the user has imposed the $500 limit across all of the participating gambling websites, in particular embodiments, the user will be limited to losses totaling $150 because of the loss the user has already experienced on the first gambling website.

In particular embodiments, the self-exclusion module 800 may also advise the user on the effects of implementing a particular restriction, limitation, and/or exclusion so that the user is educated before the user actually agrees to place the restriction, limitation, and/or exclusion into effect. For instance, if the user indicates that he would like to be excluded from being able to purchase firearms on any of the participating websites that provide such products, the self-exclusion module 800 may first provide a list of such participating websites to the user so that the user is aware of the extent of such an exclusion. The information may help the user avoiding placing a restriction, limitation, and/or exclusion into effect that he may not otherwise agree to once he realizes the extent of the restriction, limitation, and/or exclusion. Further, in particular embodiments, the self-exclusion module 800 may also advise the user on restrictions, limitations, and/or exclusions governed by regulatory authorities.

It should also be noted that in various embodiments, as at least previously alluded to and briefly described, the users may not be the only ones who can impose restrictions/limitations/exclusions on themselves. As a non-limiting example, regulatory authorities may impose restrictions/limitations/exclusions in particular embodiments. In addition, in particular embodiments, a website may impose restrictions/limitations/exclusions on users the website has perceived to exhibit problem behavior. These restrictions/limitations/exclusions may only apply to the particular website(s) or may apply to additional websites. That is, in particular embodiments, an agreement may be reached among one or more websites that allow a website to impose restrictions/limitations/exclusions on a user that apply with respect to the one or more website. Further, in particular embodiments, the OSP may also impose restrictions/limitations/exclusions on users and/or courts may impose restrictions/limitations/exclusions on users, for at least the non-limiting examples of preserving funds for child support obligations and enforcing a restriction imposed as part of or in light of a criminal sentence. In these and still other embodiments, the OSP may also be required to search one or more exclusion databases (as previously described herein) for such limitations and also, upon receiving notification of such limitations report the same to the one or more exclusion databases for posting as updated and accurate data.

Behavior Analysis Module

An advantage the OSP provides in various embodiments is that the OSP's system 304 is servicing multiple websites and as a result is collecting information on various transactions activities conducted by users on these multiple websites. For instance, in particular embodiments, the OSP may be appointed by some regulatory authority to provide one or more databases storing such information and particular websites may populate these databases with information on various transaction activities. Typically, such information represents a larger and broader sample of transaction information than a single website could compile on its own. Therefore, in various embodiments, the OSP server 400 may also include a behavior analysis module 900 that is configured to analyze various transaction activities conducted by users over multiple websites, to identify norms of behavior with respect to the transaction activities conducted on the websites, and to identify potentially problem users as users whose behavior deviates from the identified norms. It should be understood, of course, that norms of behavior may be refined by aligning factors such as the type or size of activity, the location of the user, and the address of the user to create categories of norms.

Accordingly, FIG. 9 illustrates a flow diagram of the behavior analysis module 900 according to various embodiments. This flow diagram may correspond to the steps carried out by the processor 405 in the OSP server 400 shown in FIG. 4 as it executes the module 900 in the server's RAM memory 467 according to various embodiments.

In Step 902, the behavior analysis module 900 queries transaction information. In various embodiments, this information covers transaction activities conducted over multiple websites by multiple users. For instance, the transaction information may encompass certain types of transaction activities engaged in by a plurality of users on a plurality of websites. For example, a plurality of gambling activities or a plurality of spending activities engaged in by a plurality of users on a plurality of websites.

As previously described, in various embodiments, when a user engages in an interactive session on a website, information on each transaction activity the user engages in on the website may be sent to the OSP's system 304 and may be stored so that the information can be later referenced. For example, a user may make a purchase on a particular website and the website may send information on the purchase such as the product purchased, the amount of the purchase, the user's unique identifier, and the session identifier. In turn, the OSP's system 304 receives the information and stores the information in storage media. The same process is carried out for the transaction activities (e.g., purchases) conducted by other users across one or more of the multiple websites associated with the OSP. Thus, the OSP has information on a variety of transaction activities conducted across multiple websites by multiple users. Therefore, the behavior analysis module 900 queries the information for a number of these transaction activities from the storage media.

In Step 903, the behavior analysis module 900 conducts an analysis of the transaction information to determine norms of behavior with respect to engaging in such transaction activities on the websites. A "norm of behavior" is considered a rule that a group (i.e., a set of users conducting the particular transaction activities on the websites) uses for defining appropriate and inappropriate values, beliefs, attitudes, and behaviors. Thus, in particular embodiments, the behavior analysis module 900 conducts an analysis with respect to one or more of the attributes included in the transaction information. For instance, the attributes may include one or more of: (1) purchase amount frequency, (2) deposit amount frequency; (3) wager amount frequency; (4) limits set by one or more websites on purchase/deposit amounts; (5) limits set by one or more websites on wager amounts; (6) limits set by one or more websites on purchase frequency; (7) limits set by one or more websites on deposit frequency; (8) limits set by one or more websites on wager frequency; (9) limits set by one or more users on purchase amounts; (10) limits set by one or more users on deposit amounts; (11) limits set by one or more users on wager amounts; (12) limits set by one or more users on purchase frequency; (13) limits set by one or more users on deposit frequency; (14) limits set by one or more users on wager frequency; (15) history of self-exclusion for one or more users; (16) history of exclusion imposed by one or more websites; (17) history of reactivation after exclusion for one or more users; (18) history of permanent exclusions for one or more users; (19) locations associated with one or more users; (20) number of devices used by one or more users and repeat usage of the devices; (21) dispute history for one or more users that comprise chargebacks, refunds, and declines; (22) ages of one or more users; (23) credit scores of one or more users; (24) time periods one or more users have been registered with one or more of the websites; (25) history of one or more users on amounts of winnings and losses; and (26) types of transaction activities engaged in by one or more users on the at least two websites.

The analysis may be carried out in various embodiments by the behavior analysis module 900 using one or more techniques known in the art, such as quantitative and/or qualitative methods or computationally-intensive methods such as computer simulation, artificial intelligence, predictive modeling, or other complex statistical methods. Further, in particular embodiments, the analysis may take into consideration factors to identify norms of behavior for particular groups (e.g., groups or classes of users, and the like). For instance, in one embodiment, the analysis may be broken down based on the locations of the users conducting the transaction activities. For example, users living in wealthy areas may exhibit norms with larger spending and/or deposits than users living in poorer areas. Once, the behavior analysis module 900 completes the analysis of the transaction information, the module 900 has identified one or more norms of behavior with respect to engaging in the particular transaction activities on the websites. For instance, such norms may be established with respect to one or more of: (1) amounts of purchases; (2) amounts of deposits; (3) frequency of purchases; (4) frequency of deposits; (5) purchases by product type; (6) wagers by game type; (7) amounts of wagers; (8) frequency of wagers; (9) amounts of purchases by age ranges; (10) amounts of deposits by age ranges; (11) frequency of purchases by age ranges; (12) frequency of deposits by age ranges; (13) amounts of wagers by age ranges; (14) frequency of wagers by age ranges; (15) patterns of purchases; (16) patterns of deposits; (17) patterns of wagers; (18) proximity of a user's engagement to a website's set limits; (19) proximity of a user's engagement to the user's set limits; (20) profiles of net winnings to deposits; (21) profiles of net winnings to wagers; (22) profiles of net losses to deposits; and (23) profiles of net losses to wagers.

In various embodiments, the behavior analysis module 900 saves the determined norms in one or more storage media available to the OSP's system 304, shown as Step 904. Further, in various embodiments, the OSP may provide the determined norms to one or more of the operators and/or websites. For instance, in one embodiment, the OSP may provide periodic updates of the norms to one or more of the websites for a licensing fee.

Thus, in Step 905, the behavior analysis module 900 in various embodiments compares transaction information for one or more of the individual users against the established norms of behavior. For instance, the behavior analysis module 900 may establish a norm for the frequency at which users place wagers on the multiple gambling websites. Therefore, the behavior analysis module 900 determines the frequencies at which particular users' place wagers across one or more of the gambling websites and compares the users' frequencies with the established norm frequency. This comparison may be carried out by the behavior analysis module 900 at the request of the OSP or at the request of one or more of the operators and/or websites. Further, the comparison may be carried out by the behavior analysis module 900 for one or more particular users for one or more particular websites. For instance, a website may request the OSP to have a comparison performed for users who have engaged in gambling activities on its website(s) over a particular time period, such as the last two years.

It should be apparent to one of ordinary skill that the behavior analysis module 900 may be configured to conduct the comparison at different times with respect to determining the norms of behavior. For instance, in particular embodiments, the behavior analysis module 900 may conduct the comparison immediately after determining the norms of behavior. While in other embodiments, the behavior analysis module 900 may retrieve the norms from storage and conduct the comparison at a later time after the norms of behavior have been determined As a result of conducting the comparison, in Step 906, the behavior analysis module 900 identifies one or more users as potentially problem users. For instance, in one embodiment, the behavior analysis module 900 identifies users in which one or more attributes associated with the users diverge from norms such as: (1) escalation of frequency of purchases; (2) escalation of frequency of deposits; (3) escalation of amount of purchases; (4) escalation of amount of deposits; (5) escalation of frequency of wagers; (6) escalation of amount of wagers; (7) erratic behavior with respect to frequency of purchases; (8) erratic behavior with respect to frequency of deposits; (9) erratic behavior with respect to amount of purchases; (10) erratic behavior with respect to amount of deposits; (11) erratic behavior with respect to frequency of wagers; (12) erratic behavior with respect to amount of wagers; (13) erratic behavior with respect to frequency of chargeback requests; (14) erratic behavior with respect to frequency of disputes; (15) indication of exclusion from engaging in transaction activities by one-self, by a website, or state; (16) indication of requesting help; (17) indication of defaults in use of credit cards; (18) indication of insolvency; (19) escalation of length of session time; and (20) escalation of cumulative length of session time over a predefined period. Further, comparison will be undertaken against the profiles of known defaulters/problem gamblers to identify similarities in behavior. Further, in various embodiments, the behavior analysis module 900 may also develop early warning indicators based on diverging norms identified for the one or more potentially problem users, shown as Step 907. Similar to the determined norms, the behavior analysis module 900 may save the indicators in one or more storage media available to the OSP's system 304, shown as Step 908. Further, in various embodiments, the OSP may provide the early warning indicators to one or more of the websites. The websites may use the early warning indicators to monitor transaction activities on the websites to identify users who may begin to exhibit problem behavior. In addition, the OSP may also monitor transaction activities based on the indicators to potentially identify users who may begin to exhibit problem behavior. In certain of these and still other embodiments, the OSP may likewise present the user with an option to submit a request for help, as described elsewhere herein, upon identification of one or more divergent behaviors relative to the norm.

According to various embodiments, potentially problem users may be posted by websites to the OSP, where they will be stored and/or posted in various databases (e.g., the self-exclusion lists, the externally-imposed exclusion lists, etc.), as may be desirable for particular applications. Indeed, when a website receives notification of a potentially problem user or searches this database and determines a match, it may be, according to certain embodiments, for that website to determine its own appropriate course of action that it takes with regard to that user. That being said, it could be that in still other embodiments, the website will defer to the OSP and/or at least coordinate with the OSP so as to determine the appropriate course of action.

In Step 909, the behavior analysis module 900 saves information on the one or more identified users. For instance, in at least one embodiment, the behavior analysis module 900 saves the information in the self-exclusion database 308. Therefore, in these and still other embodiments, the registration module 500 and/or the validation module 600 may also query this information during performing a self-exclusion check. As a result, users who may have exhibited compulsive behavior and may have not voluntarily restricted/limited/excluded themselves may also be identified. Further, in particular embodiments, the OSP may share the information on the one or more identified users with other entities such as regulation authorities and one or more of the websites associated with the OSP. Thus, these entities may become aware of users that may potentially have compulsive behavior problems that they may not otherwise know. For example, a user may be identified as a potentially problem user based on abnormal transactions conducted on a first website. The user may then try and register with a second website. During the registration process, the user may be identified during a self-exclusion check as a user having potential problems (e.g., as a user exhibiting a potential for compulsive gambling behavior) and this may be communicated to the second website. As a result, the second website may decide not to allow the user to register and engage in transaction activities on the second website.

Chargeback Module

In many instances, a user engages in a transaction activity on a website by charging the user's credit card. For instance, a user may purchase a good, pay a licensing fee to view a video, make a deposit on a particular website by charging the user's credit card for an identified amount. As mentioned above, in various embodiments, the OSP may record one or more credit cards for a user during the registration process.

As a result of accepting credit card payments as a mechanism for conducting various transaction activities, websites will sometimes receive chargeback requests for transaction activities that were previously conducted on the websites. In general, a chargeback request is originated by a user's issuing bank, when that bank will not accept a clearing file transaction. In many instances, this may involve the user disputing the charge to the user's credit card. For example, the user may argue that he did not engage in the transaction activity that resulted in the charge to his credit card. In some instances, the user and/or the user's issuing bank may first submit a retrieval request to request information from the website on the transaction activity in question. Many times in these particular instances, the website may not have adequate information (e.g., compelling evidence) to "prove" that the user did actually engage in the transaction activity.

As previously mentioned, the OSP server 400 may also include a chargeback module 1000 that is configured to provide a website with information, such as information gathered and stored by the OSP on transaction activities conducted by various users on websites as described herein, that can be used as sufficient (e.g., whether to a requisite compelling standard or otherwise) evidence to argue that a user did indeed engage in a transaction activity the website is now receiving a chargeback request for. An advantage to receiving such information from the OSP in various embodiments is that the operator and/or website may argue that such information is from an independent third-party source and is therefore a more reliable (e.g., unbiased) source of proof. That is, the information may be considered more persuasive and/or compelling since the information is being provided by an independent third-party source. FIG. 10 illustrates a flow diagram of the chargeback module 1000 according to various embodiments. This flow diagram may correspond to the steps carried out by the processor 405 in the OSP server 400 shown in FIG. 4 as it executes the module 1000 in the server's RAM memory 467 according to various embodiments.

In Step 1002, the chargeback module 1000 receives information on the chargeback request (e.g., retrieval request). For instance, in various embodiments, the information is typically sent from the issuing bank for the credit card involved in the chargeback request to the acquiring bank for the website involved in the chargeback request. The acquiring bank then forwards the request to the OSP's system 304. In another embodiment, the information may first be received by the ASP's system 305 from the acquiring bank. In particular embodiments, the ASP's system 305 may then forward the information to the OSP's system 304. While in other embodiments, the chargeback module 1000 receives the information directly from the acquiring bank.

According to various embodiments, the information on the chargeback request may include such parameters as the user's name, address, credit card number used to conduct the transaction activity, the amount of funds involved in the transaction activity, the website with whom the user conducted the transaction activity, the date and time of the transaction activity, specifics on the transaction activity such as the transaction reference number, the type of transaction activity, and the reason for the chargeback request. For example, the information may indicate Mark Smith of 123 Street, Oak Park, Ill. purchased a men's shirt on Oct. 3, 2009 at 9:00 a.m. on website koolshirts.com operated by KoolShirt Corp. and Mark Smith is disputing that he never made the purchase and is requesting a refund for the charge on his credit card.

In response, at Step 1003, the chargeback module 1000 retrieves information the OSP (or in the alternative, the ASP) has stored for the particular transaction activity. For instance, in one embodiment, the chargeback module 1000 queries stored user information to locate Mark Smith's unique user identifier by using his name and address. Once the chargeback module 1000 has obtained Mark Smith's unique user identifier, the chargeback module 1000 queries the stored information on transaction activities conducted by Mark Smith using the unique identifier and various other information provided in the received information to locate the particular transaction activity involved in the chargeback request.

In Step 1004, the chargeback module 1000 determines whether the transaction activity was located. If the chargeback module 1000 determines that information on the transaction activity was not located, the chargeback module 1000 reports back to the entity from which it received the information on the chargeback request that information on the transaction activity could not be located in the OSP's system 304, shown as Step 1005. For instance, in one embodiment, the chargeback module 1000 sends a message to the entity's system that indicates information on the particular transaction activity could not be found.

If the chargeback module 1000 determines information on the transaction activity was located, the chargeback module 1000 according to various embodiments retrieves historical information on one or more transaction activities conducted by Mark Smith, shown as Step 1006. This historical information typically involves different or similar types of transaction activities conducted by the user involved in the chargeback request with the particular website. For instance, returning to the example, the chargeback module 1000 may, in these and still other embodiments, query any transaction activities involving Mark Smith making clothing purchases involving the operator associated with the chargeback request in the past two years. Note that in some instances, the query may involve transaction activities conducted on multiple websites because the operator associated the chargeback request may have used more than one website. The query may return a total of twenty-two (22) records on clothing purchases made by Mark Smith on the website involved in the chargeback request over the past two years.

In response to retrieving the historical information, in Step 1007, the chargeback module 1000 according to various embodiments compares the parameters of the particular transaction involved with the chargeback request with the parameters of the historical transactions. For instance, returning to the example, the chargeback module 1000 compares the types of items purchased for each of the transaction activities, the times of day the purchases were placed, the credit card numbers involved with each purchase, etc. The chargeback module 1000 then determines whether there are any correlations between the parameters of the transaction activity involved in the chargeback request and the parameters of the historical transaction activities. Thus, in particular embodiments, the OSP establishes correlation rules that are executed by the chargeback module 1000 in order for the chargeback module 1000 to determine whether any correlations exist between the transaction activity involved in the chargeback request and the historical transaction activities. For example, the OSP may institute a correlation rule that indicates that if the transaction activity involves a purchase for men's clothing, the price of the purchase for the transaction activity must be within plus or minus twenty dollars ($20) of the average price of purchase of the historical transaction activities in order for a correlation to exist. In another example, the OSP may institute a correlation rule in which the location associated with the IP address of the computing device used to conduct the transaction activity involved with the chargeback request must match the locations associated with the IP addresses of the computing devices used to conduct one or more of the historical transaction activities.

In similar fashion, in another example, the OSP may according to various embodiments institute a correlation rule in which the location associated with the IP address of the computing device used to conduct the transaction activity involved with the chargeback request must match the locations associated with a home address provided by the user during conducting one or more of the historical transaction activities. In still another example, the OSP may in at least one embodiment institute a correlation rule in which the username provided during the transaction activity associated with the chargeback request must match the usernames provided during one or more of the historical transaction activities. Further, in another example, the OSP may institute a correlation rule in which a fingerprint associated the computing device (e.g., MAC address) used to conduct the transaction activity involved with the chargeback request must match fingerprints of the computing devices used to conduct one or more of the historical transaction activities. One of ordinary skill in the art can envision several additional correlation rules that can be fashioned in light of this disclosure, as may be desirable for particular applications, without departing substantively from the general nature of the present invention.

Depending on the embodiment, a "match" can be made to varying levels. For instance, in various embodiments, the chargeback module 1000 may be configured to perform "exact" type matching with respect to one or more correlation rules. For example, in one embodiment, the chargeback module 1000 may be configured to determine whether the location associated with the IP address of the computing device used to conduct the transaction activity involved with the chargeback request exactly matches the locations associated with the IP addresses of the computing devices used to conduct one or more of the historical transaction activities in order to establish a correlation. In other embodiments, the chargeback module 1000 may be configured to perform more "fuzzy" type matching with respect to one or more correlation rules. For instance, in one embodiment, the chargeback module 1000 may be configured to determine whether the location associated with the IP address of the computing device used to conduct the transaction activity involved with the chargeback request is within a predetermined distance from the locations associated with the IP addresses of the computing devices used to conduct one or more of the historical transaction activities in order to establish a correlation. Thus, in various embodiments, the "matching" functionality of the chargeback module 1000 may vary in degree with respect to establishing a correlation and the type of matching may vary among the different correlation rules.

As yet another non-limiting example, in various embodiments, the "matching" functionality of the chargeback module 1000 may search for matches in timing or amounts of transactions conducted by the user to identify behavioral patterns. Further, in one embodiment if the user has subsequently received a benefit from making the transaction, this would constitute compelling evidence, as previously described herein. For instance, a real world example would be where the website is a gambling operator and the user is a player who is disputing a deposit transaction, but has subsequently placed a bet or received a bonus or incentive resulting from the disputed transaction.

Further, the OSP may institute the rules in different ways according to various embodiments. For instance, in one embodiment, the rules may be stored in a database and queried by the chargeback module 1000 for use. In another embodiment, the rules may simply be hard-coded in the chargeback module 1000. In addition, the rules may be identified for particular types of transaction activities (e.g., for clothing purchase activities, a set of rules may be identified for women's clothing purchases, men's clothing purchases, and/or children's clothing purchases) and/or for particular websites and/or industries. For instance, particular industries may require certain information to demonstrate correlations for the transaction in question in order to meet the level of sufficient (e.g., compelling) evidence required by the credit card companies to allow a re-presentment. For example, for an online airline ticket purchase made for an international flight, the airline operator may be required to demonstrate that the user's passport number associated with the international flight matches the passport number associated with the international flights in one or more historical transactions in order to establish compelling evidence that the user actually purchased the airline ticket. Alternatively, in certain embodiments, the airline operator may only have to demonstrate that the user received air-miles for the transaction and flight that is subject to a chargeback. Of course, one of ordinary skill in the art can envision several various evidentiary standards and/or rules for chargeback requests that may be employed in light of this disclosure, as may be desirable for particular applications, without departing substantively from the general nature of the present invention.

In Step 1008, the chargeback module 1000 determines whether any correlations have been established. If, according to various embodiments, the chargeback module 1000 has failed to establish any correlations, the chargeback module 1000 reports to the entity that sent the information on the chargeback request that no correlations were established between the transaction involved in the chargeback request and the historical transactions, shown as Step 1009. In these and other embodiments, the OSP may be authorized to process the chargeback request in particular embodiments on the websites' behalf. However, if the chargeback module 1000 has established one or more correlations, the chargeback module 1000 sends information on the one or more correlations to the entity that sent the information on the chargeback request and re-presents the transaction, shown as Step 1010.

As a result, the entity that sent the information on the chargeback request may now use the information on the correlations to establish compelling evidence that the user actually conducted the transaction activity involved in the chargeback request. For instance, the acquiring bank for the operator involved in the chargeback request may now use the information on the correlations as sufficient (e.g., compelling) evidence that the user did indeed engage in the transaction activity on the website. In particular industries, the website need only to provide such evidence to successfully refute the chargeback request. Accordingly, in certain embodiments, the website and/or acquiring bank may then re-present the disputed transaction with the supporting evidence across the credit card company's re-presentment system.

Returning now to the previously introduced and non-limiting example, the chargeback module 1000 may compare the parameters for the transaction activity involved with the chargeback request and the parameters of the twenty-two historical transaction activities. In these and other embodiments, the chargeback module 1000 determines a correlation exists in that the typical price of purchase (e.g., average price) for the purchases made by Mark Smith has made on the website for the historical transaction activities is one-hundred dollars ($100) and the purchase made in the transaction activity involved in the chargeback request is one-hundred and twenty dollars ($120). Further, the chargeback module 1000 determines a correlation exists in that twelve of the twenty-two historical transaction activities involve purchasing men's dress shirts and that the transaction activity involved with the chargeback request also was a purchase for a men's dress shirt. Finally, the chargeback module 1000 determines a correlation exists in that the same credit card was used in all of the transaction activities (i.e., the historical transaction activities and the transaction activity involved in the chargeback request). In at least certain embodiments, the chargeback module 1000 determines whether this evidence meets the credit card companies' rules (e.g., sufficiency and/or compelling nature) for re-presentment and will convey the decision to the website, KoolShirt Corp. Depending on contract terms between the website and the OSP, the OSP will seek the websites authorization to process the chargeback and/or re-present the transaction with the sufficient (e.g., compelling) evidence, or the OSP will be empowered to act accordingly.

Finally, it is noted that in particular embodiments the chargeback module 1000 is configured to evaluate a parameter that indicates whether the user has attempted to reconcile the chargeback request with the website directly. If the indicator shows the user has not, the chargeback module 1000 may notify the entity that has submitted the information on the chargeback request that the user should first attempt to reconcile the chargeback with the website. Of course, one of ordinary skill in the art can envision any of a variety of configurations that can be fashioned in light of this disclosure, as may be desirable for particular applications, without departing substantively from the general nature of the present invention.

Authorization Module

As previously mentioned, the validation module 600 according to various embodiments validates what transaction activities users can engage in when they are visiting various websites. Such transaction activities may include debiting a credit card for a user. For instance, in certain embodiments, a website may seek authorization for debiting a credit card when the user makes a purchase on the website and/or when the user deposits funds on the website so the user may have the funds available to conduct such activities as making a purchase, paying rental fees for media, or placing a wager. It should be noted that by multiple websites following the practice of seeking authorization for debiting credit cards through the OSP, better efficiency is realized in various embodiments because each website does not need to have the system infrastructure to communicate and interact directly with the parties involved with seeking authorization for debiting credit cards of users. For instance, each website does not need to have the infrastructure to communicate with the various card issuer networks associated with credit card issuing banks.

Therefore, in various embodiments, the OSP server 400 may also include an authorization module 1100 that is configured to facilitate a website seeking authorization for debiting a credit card of a particular user.

FIG. 11 illustrates a flow diagram of the authorization module 1100 according to various embodiments. This flow diagram may correspond to the steps carried out by the processor 405 in the OSP server 400 shown in FIG. 4 as it executes the module 1100 in the server's RAM memory 467 according to various embodiments.

Typically, according to various embodiments, this process begins after a user has been validated on a particular website and decides to conduct a transaction activity such as make a purchase or deposit funds. In particular embodiments, the user selects a button on the website and is directed to a webpage for providing information on the purchase/deposit. Because the user has been validated and assigned a session identifier, there is no need in various embodiments to perform certain checks such as a jurisdiction check and/or an age check. In response to the user being directed to the webpage, the website or webpage sends the OSP's system 304 certain information on the user. This information may include the user's unique identifier and the session identifier, which is linked to one or more fingerprints of the user's device for the current session.

In Step 1102, according to various embodiments, the authorization module 1100 uses the session identifier and the user identifier to confirm the legality of the transaction and to determine whether limits and/or restrictions have been imposed on the user with regard to the transaction activity (e.g., limits and/or restrictions on making a purchase/deposit). Next, in Step 1103, the authorization module 1100 extracts the user's address from the stored information on the user by using the user's unique identifier.

Depending on the embodiment, the website may host the webpage or the website may direct the user to a webpage hosted by the OSP. The webpage requests information from the user and/or website with regard to seeking authorization for the transaction activity. For instance, in one embodiment, the webpage may request an amount of funds the website would like to debit the credit card (e.g., the price of a good the user is purchasing or the amount of funds the user would like to deposit with the website). In addition, the webpage may request the user to enter a credit card or may request the user to select a registered credit card with the OSP. As previous described, in various embodiments, the user may set up one or more credit cards during the registration process. In these particular instances, the webpage may display information on the registered cards (obtained from the OSP's system 304) to the user so that the user may select an appropriate card to use in the transaction activity. Further, the webpage may request the user to enter the CVC/CVV and/or the expiration date for the selected credit card, shown as Step 1104.

Once, according to various embodiments, the user has entered the required information and/or the website has provided the required information, the user selects a button such as "purchase" or "submit." In response, the website's webpage sends the transaction activity information to the OSP's system 304 for authorization or the OSP directly seeks authorization through the acquiring bank. The authorization module 1100 may pass the information to the ASP's system 305 or the OSP will store the information.

Next, according to various embodiments, the acquiring bank system receives the authorization request and identifies the appropriate card issuer and issuing bank and routes the authorization request to the issuing bank via the appropriate credit card company (e.g., the VISA, MasterCard, or American Express networks). Upon receiving the request, the issuing bank system verifies that the credit card is operational and valid and that sufficient funds are available for the transaction. Upon approving the authorization request, the issuing bank system sends an approval message to the acquiring bank system via the appropriate credit card company or an authorized processor and the acquiring bank system receives the approval message and transmits the approval message to the ASP's system 305 or, alternatively to the OSP directly. In Step 1106, the ASP's system 305 receives and stores the approval message and transmits the approval message to the authorization module 1100 on the OSP's system 304.

In Step 1107, according to various embodiments, the authorization module 1100 determines whether the transaction activity has been authorized. If the authorization module 1100 determines the transaction activity has not been authorized, the authorization fails, shown as Step 1108. In particular embodiments, this step may entail the authorization module 1100 sending information to the webpage and/or website conveying that the transaction activity has not been authorized. In turn, the webpage and/or website communicate the information to the user. Instead, if the authorization module 1100 determines the transaction activity has been authorized, the module 1100 records the transaction activity along with the authorization, the user's unique identifier, and the session identifier in one or more storage media that is accessible by the OSP, shown as Step 1109. In addition, the module 1100 reports such information to the website, shown as Step 1110. As a result, the website processes the transaction activity (e.g., completes the purchase made by the user or deposits funds into an account set up for the user on the website).

As mentioned, in particular embodiments, the user registers one or more credit cards with the OSP during the registration process. At that time, the OSP may verify that the one or more credit cards are valid with the issuing bank and that the user is authorized to use the credit card for transaction activities by conducting a "$1 authorization" (or any authorization having any of a variety of monetary values). In these particular instances, the OSP may not request authorization for the subsequent transaction activity at the time the user request to conduct the activity. Instead, the OSP records the authorization request and submits the authorization to the acquiring bank (who may in turn pass through such to additional parties, including, for example, the issuing bank) at a later time. FIG. 11A illustrates a flow diagram of the authorization module 1100 configured to carry out such a process according to various embodiments. Again, this flow diagram may correspond to the steps carried out by the processor 405 in the OSP server 400 shown in FIG. 4 as it executes the module 1100 in the server's RAM memory 467 according to various embodiments.

Therefore, similar to the process described in FIG. 11, in Step 1102A, the authorization module 1100 receives information that includes the session identifier and the user identifier and the module 1100 validates both identifiers. In this particular instance, the webpage displays information on the registered cards to the user and the user selects an appropriate card to use for the transaction activity. In turn, the authorization module 1100 receives the selection for the credit card, shown as Step 1103A.

Next, according to various embodiments, the webpage may request the user to enter the CVC/CVV and/or the expiration date for the selected credit card and may request the user to enter (or the website provides) the amount to be debited to the selected credit card, shown as Step 1104A. Once the user has entered the required information and/or the website has provided the required information, the user selects a button such as "purchase" or "submit." In response, the webpage sends the transaction activity information to the OSP's system 304 and the authorization module 1100 verifies the correct CVC/CVV and/or expiration date has been entered for the selected card and stores the transaction activity information, shown as Step 1105A. For instance, in one embodiment, the authorization module 1100 stores the transaction activity information in a database that resides on storage media located either within or outside of the OSP's system 304. Thus, the authorization module 1100 does not seek authorization for debiting the credit card with the issuing bank at the time the user requests to conduct the transaction activity.

In this particular embodiment, the authorization module 1100 then determines a batch authorization time (that is a cut off time for the transactions period and the elapsed time before a batch authorization) for the authorizations, shown as Step 1106A. According to various embodiments, the batch authorization time may be agreed upon between the particular website, the OSP and the acquiring bank. Information on the batch authorization time may be stored by the OSP's system 304 or may be requested from the particular website at the time the transaction activity is being conducted. The batch authorization time indicates the appropriate time in for example a 24 hour period at which authorization requests for the transaction activities should be submitted to the issuing bank. Thus, at this particular time, the OSP's system 304 automatically calls for the transaction data from the website and submits the authorization requests to the acquiring bank for processing. Therefore, the authorization module 1100 determines the batch authorization time for the transaction activity and saves the time along with the transaction activity. As a result, in at least one embodiment, the OSP's system 304 monitors the batch authorization time, calls for the data file from the website, and submits the authorization requests for the transaction activity.

In Step 1107A according to various embodiments, the authorization module 1100 determines whether the authorization requests file has been successfully recorded. This accomplished by attaching a reference number to the file and counts of the number and amount of transactions. The acquiring bank will acknowledge and reconcile a perfect file has been received. If the authorization module 1100 determines the authorization requests file has not been successfully recorded, the recordation fails, shown as Step 1108A, and will be investigated and resubmitted. The result of the authorization requests will be received by the OSP or website. The Website will communicate any authorization failure to the user and seek an alternative payment method. However, if the authorization module 1100 determines the authorization requests have been successfully, the module 1100 reports such information to the website, shown as Step 1109A according to various embodiments. As a result, the OSP processes the authorization request batch file at the predetermined time.

Clearing and Settlement Module

In particular embodiments, various operators and/or websites utilize the OSP to clear and settle transaction activities involving users' credit cards and other payment methods. Similar to verifying credit card authorization requests for transaction activities, such practice provides better efficiency in various embodiments because each website does not need to have the system infrastructure to communicate and interact directly with the parties involved with settling transaction activities involving credit cards. Therefore, in various embodiments, the OSP server 400, and/or the ASP server may also include a clearing and settlement module 1200 that is configured to facilitate settlement of transaction activities for a particular website. In particular, this module 1200 is configured to reconcile settlement files received from an issuing bank with clearing files submitted on behalf of a website.

FIG. 12 illustrates a flow diagram of the settlement module 1200 according to various embodiments. This flow diagram may correspond to the steps carried out by the processor 405 in the OSP server 400 shown in FIG. 4 as it executes the module 1200 in the server's RAM memory 467 according to various embodiments. Thus, in certain embodiments, a website sends the OSP's system 304 or the OSP calls the website at a designated time(s) for an automated upload of one or more clearing files containing various completed transaction activities for settlement. Typically, the website batches all of the completed transaction activities for a particular time period (i.e., the previous twenty-four hours) and responds to a call from the OSP for the batched transaction activities in the clearing files at a set time of the day to be sent to the OSP's system 304.

According to various embodiments, in Step 1202, the clearing and settlement module 1200 receives the one or more clearing files from the website. In response, the clearing and settlement module 1200 records, in particular embodiments, information on each transaction listed in the clearing files in one or more storage media accessible by the OSP, shown as Step 1203. Further, in particular embodiments, the settlement module 1200 arranges an upload of the one or more clearing files for a particular acquiring bank based on the information in the files, shown as Step 1204. The clearing files typically include the authorized completed transaction activities over the particular time period. In addition, the clearing and settlement module 1200 may include a counter for the number of transaction activities and total monetary (e.g., dollar) amount of transactions listed in the files, together with a reference number for the file. In response to receiving the files, the OSP's system 305 may send back the counter to verify that the system 305 has received all of the transaction activities' information listed in the clearing files. Next, in step 1205, the clearing and settlement module 1200 stores the clearing files on the OSP's system 304. It should be noted, however, that in particular embodiments, the settlement module 1200 may generate the clearing files based on transaction activities previously stored by the OSP's system 304 instead of receiving them from the website.

In step 1206, the OSP's system 305 transfers one or more of the clearing files to the appropriate acquiring bank. In turn, the acquiring bank receives the files, splits the transactions by credit-card company name, and transmits the files to the appropriate credit card companies, who then forward the transactions to the designated issuing banks. The issuing banks processes settlement for the completed transaction activities listed in clearing files and transfer settlement files listing the settled transaction activities to the respective credit card companies, who divide and amalgamate the files by acquiring bank. The acquiring bank sorts its settlement files by OSP and by website and transfers them accordingly to the OSP, when an OSP is involved. The OSP may make the clearing and settlement data available to the ASP's system 305, shown as Step 1207 or the Acquiring bank may supply the files direct to the ASP. Hence reconciliation of the clearing and settlement files may either be undertaken by the acquiring bank, the OSP or the ASP.

In certain embodiments, the ASP's system 305 takes the clearing and settlement files received from the clearing and settlement module 1200 and reconciles the information in the clearing files and the settlement files, shown as Step 1208.

Further, the results of the reconciliation performed in step 1208 may be summarized in a reconciliation report (or "advice note") by the ASP according to various embodiments of the invention. The ASP will then make adjustments to the settlement funds. These will include debiting chargebacks that are to be processed, debiting fees that are due, debiting for taxes, and making debit and credit adjustments to a rolling reserve and/or a segregated users' deposits account. Finally, in step 1209, the ASP's system 305 organizes the net settlement payments for each party and the amount for transferring to the appropriate bank accounts for each party and transfers the payments to the accounts. It should be noted that in various embodiments, the ASP's system's 305 transfers of payments are made electronically. That is, data representing the payments are transferred to the appropriate parties, who then show the funds deposited electronically into the appropriate accounts based on at least a portion of the received data.

As mentioned, in various embodiments, the ASP's system 305 summarizes the results from reconciling the clearing and settlement files provided by the clearing and settlement module 1200 and any adjustments in a net settlement reconciliation report. In Step 1210, this report is received by the settlement module 1200 from the ASP's system 305. In turn, the OSP may send the report to each website periodically (e.g., daily or weekly). Further, in Step 1211, the clearing and settlement module 1200 may record information on the results displayed in the net settlement reconciliation report in one or more storage media accessible by the OSP. In various embodiments, the reconciliation report summarizes the amounts that the website can expect to receive in the website's bank account by a particular date. In addition, in various embodiments, the net settlement reconciliation report shows the following deductions and additions made from/to the operator's and/or website's funds: (1) less commission and charges (covering payments to all participants in the payment chain); (2) less a "trust deduct" corresponding to a percentage of the total amount that is withheld for a certain time period (e.g., 6 months or a year) in a rolling reverse account as security against, against the website's default, including fines, fees, chargebacks and refunds. In this way the users are protected in the event of a dispute with the website and the parties to the credit card value chain are provided with a timely resolution to a website defaulting; (3) plus the "trust money" that was withheld on a rolling reserve during the certain time period and one day before the date of the advice note; (4) less any chargebacks communicated by the acquiring bank on the day of the advice note relating to previous transactions; (5) less taxes due; (6) less new deposits lodged by users and winnings received by users to be placed into a segregated deposit account; (7) plus bets placed by users against such deposits and plus user withdrawals from their website deposit account.

According to various embodiments, before transferring funds to and from the appropriate parties' accounts, the OSP reviews the net settlement reconciliation report, including the dates on which payments are indicated to be paid and sends the ASP authorization to affect the transfers to and from the appropriate bank accounts (shown as Step 1212). The OSP may then forward the net settlement reconciliation report to the appropriate website and the acquiring bank if required. Upon receiving approval from the OSP for the net settlement reconciliation report, the ASP's system 305 transfers (e.g., credits or debits) the funds to and from the appropriate parties' bank accounts according to various embodiments. Further, in particular embodiments, the settlement module 1200 changes the status of the transactions indicated as settled in the report and that had previously been stored by the OSP's system 304 to "settled."

ASP Module

As mentioned above with regard to the clearing and settlement module 1200, in various embodiments, the ASP coordinates reconciliation of the settlement funds for the completed transaction activities for the various websites. In particular embodiments, this provides a safety mechanism because the ASP can act as a third-party between the various websites and the OSP and can provide a guarantee that the funds received from the acquiring bank are distributed accordingly among the websites and the OSP and other third parties such as tax jurisdictions. Thus, in various embodiments, the ASP's system 305 may include a module 1300 for facilitating this function.

Thus, in various embodiments, the ASP's system 305 may include one or more computing devices with similar functionality as the OSP server 400. Accordingly, FIG. 13 illustrates a flow diagram of the ASP module 1300 according to various embodiments. This flow diagram may correspond to the steps carried out by a processor in such a computing device residing in the ASP's system 305 as it executes the module 1300 in the device's RAM memory according to various embodiments.

In Step 1302, the ASP module 1300 receives one or more clearing files from an OSP associated with a website. As mentioned above, the one or more clearing files include information on completed transaction activities conducted over a certain time period on the websites. In particular embodiments, the website may first send the files to the OSP and the OSP may then forward the files to the ASP. Further, in Step 1303, the ASP module 1300 receives settlement files from the OSP or the acquiring bank. For instance, as explained above, the OSP's system 305 (e.g., the ASP module 1300) transfers the one or more clearing files to the appropriate acquiring bank. In response, the acquiring bank splits and sends the files to the appropriate credit card companies, who pass transactions to the designated issuing banks and receives settlement files back from the issuing banks. The acquiring bank may pass the settlement files to the ASP. Thus, in various embodiments, the settlement funds are re-presented electronically via data in one or more settlement files.

Thus, in Step 1304 according to various embodiments, the ASP module 1300 electronically credits funds into one or more settlement accounts. In certain embodiments, these settlement accounts are typically controlled by the ASP and may hold funds associated with settlements for a number of websites. In particular embodiments, each settlement account may be associated with a single website. "Control" in particular embodiments may be understood to mean that the ASP (and/or, in some instances, the website) have authorization to deposit and/or withdraw funds from the account. Thus, in these particular embodiments, the only funds placed in each settlement account are funds associated with settlements received for the particular website.

In Step 1305, the ASP module 1300 takes the clearing files received from the website and the settlement files received from the OSP or the acquiring bank and reconciles the information from the two sources. Thus, in Step 1306, the ASP module 1300 determines whether the clearing files and the settlement files reconcile. For instance, in one embodiment, the ASP module 1300 determines whether the amount for each completed transaction activity listed in the clearing files matches an amount identified in the settlement files. If the clearing files and the settlement files do not reconcile, the ASP module 1300 generates an error report listing the transaction activities that could not be reconciled, shown as Step 1307. In particular embodiments, the ASP 1300 may send the error report to the website, the OSP, and/or the acquiring bank. Thus, the various parties may use the error report to correct the problems shown with respect to one or more of the transaction activities listed in the error report. The ASP module 1300 then continues with the settlement process with respect to the transaction activities that were able to be reconciled.

With respect to the completed transaction activities that do reconcile, the ASP module 1300 according to various embodiments makes adjustments for fees, chargebacks, taxes, rolling reserve management and segregated users' deposits' management. The ASP then, in certain embodiments, generates a net settlement reconciliation report, shown as Step 1308, and sends the report to the OSP, shown as step 1309 and the acquiring bank, if required. As previously described, the OSP receives the report and after reviewing the report, sends the ASP authorization to transfer the funds to and from the appropriate bank accounts. Therefore, in Step 1310 according to these and still other embodiments, the ASP module 1300 receives the authorization and moves forward with transferring the funds to and from the appropriate bank accounts.

In Step 1311, the ASP module 1300 determines whether any taxes are owed on the completed transaction activities that were settled and reconciled. In particular embodiments, information on the taxes owed on the transaction activities may be provided along with the clearing files. In other embodiments, the ASP module 1300 may determine what taxes are owed on the transaction activities. For instance, in particular embodiments, the ASP module 1300 identifies one or more relevant tax jurisdictions associated with the financial transactions. For example, in one embodiment, the ASP module 1300 determines the locations of the users involved in the transaction activities settled and reconciled and performs a look-up in one or more databases 307 to determine the one or more relevant tax jurisdictions, which could be determined by residency or the user's location, or the website's location. In other embodiments, the ASP module 1300 may also consider other locations associated with the transactions such as the location of the locations where the websites are hosted.

Next, according to various embodiments, the ASP module 1300 queries the one or more databases 307 to determine one or more types of tax associated with the identified tax jurisdictions. For instance, the types of tax may include sales tax, deposit tax, withholding tax, and/or wager tax due on the transaction activities. If one or more types of tax are associated with the identified tax jurisdictions, then the ASP module 1300 applies corresponding taxation rates for the types of tax to the transaction activities to determine the tax owed on the transaction activities and deducts the amount owed from the funds in the one or more settlement accounts. For instance, the ASP module 1300 may receive information from the website on one or more bets placed by a plurality of users over a determined period of time, such as the period of time the one or more transaction activities were conducted, and may calculate the amount of wager tax to be paid by the website and adjust downwards the net settlement funds to enable the payment of the wagering tax on a due date. For instance the ASP may receive from the OSP or the website information on the one or more deposits and withdrawals made by the plurality of users over a determined period of time to calculate the amount of a deposit tax, based on net deposits by deducting withdrawals, that is due to be paid by the website. The ASP will deduct this amount from the net settlement funds and pay such amount to the appropriate tax jurisdictions based on the location of the users and each applicable jurisdiction's legislation governing deposit taxes. For instance ASP may receive from the OSP or website information on purchases made by a plurality of users over a determined period and refunds to such users.

The ASP module 1300 may then according to various embodiments also calculate the sales tax due as a percentage of the one or more purchases based on the applicable jurisdictions, determined by the user's location as validated on log in. In certain embodiments, the module may further and/or alternatively pay the sales tax due in conjunction with reporting to at least one of the appropriate tax jurisdiction and the merchant, information on the one or more transaction activities, the sales tax due, and the payment thereof.

If the ASP module 1300 determines taxes are owed on the transaction activities, in Step 1312, the ASP module 1300 deducts funds from the settlement accounts for the taxes owed. In Step 1313, the ASP module 1300 electronically credits the deducted funds into one or more tax accounts. In various embodiments, the taxes due are typically calculated for a predetermined time period (daily) and deducted from the settlement accounts to be placed in the tax accounts.

Similar to the settlement accounts, in various embodiments, the ASP module 1300 may place all of the tax funds in one tax account regardless of the taxing authority the taxes are owed to. While in other embodiments, the ASP module 1300 may place the tax funds in particular accounts based on the taxing authority the funds are owed to. For instance, in one embodiment, each taxing authority may have an individual account in which the funds owed to the authority are placed. Typically, these tax accounts are controlled by the ASP. However, in certain instances, the individual taxing authorities may also have authority to withdraw funds directly from these accounts. Further, in particular embodiments, the OSP may also have control of these accounts.

In similar fashion, in Step 1314, the ASP module 1300 determines whether any fees are owed on the transaction activities. For instance, the OSP may charge a fee for each transaction activity processed by the OSP and/or for each service provided in regard to a particular transaction activity. Further, the ASP may charge a fee for each transaction activity the ASP is requested to settle and reconcile. Thus, in Step 1315, if the ASP module 1300 determines one or more fees are due for the transaction activities that were settled and reconciled, the ASP module 1300 deducts funds for the fees from the settlement funds. In Step 1316, the ASP module 1300 then electronically credits the fees into one or more fee accounts. In particular embodiments, there may only be one fee account or more than one fee account. Further, the one or more fee accounts may be controlled by various parties.

Further, in Step 1317, the ASP module 1300 determines whether any funds are to be placed in one or more rolling reserve accounts. For instance, in particular embodiments, various participants may require a certain portion (e.g., percentage) of the settlement funds be used to fund one or more rolling reserve accounts. For example, the ASP module 1300 may allocate 7.5% of the funds associated with settled transaction activities and to be received by each website to a rolling reserve account for each website. The funds in these rolling reserve accounts may then be applied to meet any unfulfilled obligations of the websites such as unpaid penalties, fees, and/or legal obligations. For instance, the funds in the rolling reserve accounts may be used to fund a valid chargeback request received in relation to a transaction activity conducted on one of the webpages when the website is unable or unwilling to fund directly the valid chargeback request. Thus, in Step 1318, the ASP module 1300 deducts the funds from the settlement accounts and electronically credits the funds into the one or more service accounts, shown as Step 1319.

In particular embodiments in which the service accounts are rolling reserves, the portion of the funds allocated to the accounts are typically held in the accounts for a predetermined time period and forwarded to the appropriate website accounts if not used at the end of the predetermined time period. Thus, "old" funds are continuously "rolling" out of the accounts as the predetermined time period elapses for the funds and "new" funds are continuously "rolling" into the accounts as transaction activities are settled and reconciled. In various embodiments, the portion of funds allocated to the rolling reserve accounts and/or predetermined time period may be adjusted based on the amount of use of these funds to meet the websites' unfulfilled obligations.

Further, the one or more services accounts may reside as part of the ASP's system 305 or may reside or be maintained by an independent bank or other financial institution. Thus, in particular embodiments, the ASP and/or independent bank or other financial institution control the accounts and have clear title to the funds in the accounts in the event of certain occurrences such as, for example, bankruptcy of the websites and/or OSP. Such an arrangement provides protection for all members of the value chain. For instance, if the OSP were to go bankrupt, the websites are secure in knowing that their funds in the service accounts are not accessible to creditors of the OSP.

In various embodiments, the funds remaining in the settlement accounts (e.g., net settlement figures) are due to one or more websites. In particular embodiments, the ASP's system 305 (e.g., ASP module 1300) is typically configured to transfer the funds in the one or more settlement accounts to one or more accounts associated with the websites after a predetermined period of time. However, in other embodiments, the websites may have authority to withdraw the funds directly from the settlement accounts. Further in particular embodiments, the ASP's system 305 (e.g., ASP module 1300) is typically configured to transfer the funds in the one or more tax accounts to the appropriate taxing authorities after a predetermined period of time (e.g., due date), as well as transfer the funds in the one or more fee accounts to accounts for the appropriate parties.

In particular embodiments, the ASP module 1300 reports the results of the reconciliation (e.g., reports the amounts placed in each account) in a reconciliation report (or "advice note") to the one or more websites, and in some instances, to the users impacted by the process. For example, in one embodiment, the ASP module 1300 sends a net settlement report to the OSP and the OSP sends the report to the corresponding website In another example the ASP sends a reconciliation report to a tax jurisdiction with payment of the taxes due by the website, and a copy of the same report to the website as confirmation that taxes due have been paid.

In addition, in particular embodiments, the ASP will request information from one or more websites on the plurality of users' gambling activity, including bets placed, winnings and losses, deposits, withdrawals and any withholding tax deductions. For example this information may be supplied daily by overnight batch for the previous 24 hours gambling activity. Such batch will configure the information by the unique user identifier and the session identifier. The ASP module will collate on an aggregating basis for each user the key tax information the user will require for the annual tax assessment.

At the end of each calendar year an electronic report will be prepared, equivalent to a miscellaneous 1099 report and in compliance with regulations in place. Such reports may comprise data sufficient to summate the withholding tax due over a predetermined period of time (e.g., the annual period). Still further, such reports will be passed to the websites for them to make available to their users within the permitted statutory window. Such reports may then be used to aid the user in filing out his tax returns The Form 1099 may include the user's deposits, withdraws, gross winnings, gross losses, gross wagers, net winnings, net losses, and net wagers, and the tax withheld over the past year. Thus, each user may access his Form 1099 through the website and may use the Form 1099 for preparation of the user's income tax return. In particular embodiments, the ASP, OSP, or website may also electronically submit tax reports to the proper tax authorities and/or jurisdictions for the users.

General Considerations

As described elsewhere herein, various embodiments provide a registration process in which a user may register to engage in one or more transaction activities across multiple operators and/or websites. Such capabilities may provide better efficiencies and may reduce needed computing capacities in these various embodiments because each individual operator and/or website may not be required to conduct various aspects of the registration process for a particular user or the registration process at all to determine whether the user may engage in transaction activities with each individual operator and/or website.

For example, during a previous registration process for a particular user based on various aspects of the current invention, the user's age may have been verified. Therefore, in a current registration process for the same user, the process may use the result obtained in the previous registration (e.g., the verified age) and may not need to execute the step in the current registration process to verify the user's age. Thus, the registration process involved in various embodiments of the current invention will not need to "waste" the time, resources, and computing capacity to re-verify the user's age.

In addition, various embodiments provide a validation process for validating the types of transaction activities a user may engage in one or more websites. In certain embodiments, certain checks are performed during the validation process for a user to identify types of transaction activities the user may or may not engage in on a particular website. In particular embodiments, a number of these checks may be bypassed in a current validation process because the checks were previously performed during the registration process for the user or during a previous validation process for the user. Thus, various embodiments of the current invention facilitate the use of the results of past checks performed for a current validation process. Such capability may streamline the validation process and may result in the use of less processing capacity and storage media.

Further, various embodiments of the current invention may provide archived information gathered on a user to one or more websites. This can result in more efficient processing with respect to systems practicing various aspects of the current invention and the one or more websites because the systems and the websites may not need to re-gather information for the user in connection to the user engaging in transaction activities on the one or more websites.

In addition, because the systems practicing various aspects of various embodiments of the current invention are configured to provide services to multiple operators and/or websites, in many instances such operators and/or websites may not need to have the infrastructure to carry out certain functions that they may otherwise need to perform in order to conduct transaction activities with users. For instance, as discussed elsewhere in this disclosure, in various embodiments, multiple operators and/or websites may follow the practice of seeking authorization for debiting credit cards through systems practicing various aspects of the current invention. By following such a practice, better efficiency may be realized in various embodiments because each operator and/or website does not need to have the system infrastructure to communicate and interact directly with the parties involved with seeking authorization for debiting credit cards of users. For example, each operator and/or website does not need to have the infrastructure to communicate with the various card issuer networks associated with credit card issuing banks. These and further technical advantages, efficiencies, and improved capabilities are realized and discussed throughout the disclosure of this application.

Conclusion

The foregoing description of the various embodiments of the present invention has been presented for purposes of illustration and description. It is not intended to be exhaustive or to limit the invention to the precise form disclosed. Many modifications and other embodiments of the inventions set forth herein will come to mind to one of ordinary skill in the art to which these inventions pertain having the benefit of the teachings presented in the foregoing descriptions and the associated drawings. With this in mind, the embodiments were chosen and described to provide the best illustration of the principles of the invention and its practical application to thereby enable one of ordinary skill in the art to utilize the invention in various embodiments and with various modifications as may be suited to a particular contemplated use. All such modifications and variations are within the scope of the invention as determined by the appended claims when interpreted in accordance with the breadth to which they are fairly, legally and equitably entitled. The drawings and preferred embodiments do not and are not intended to limit the ordinary meaning of the claims in their fair and broad interpretation in any way. Lastly, although specific terms are employed herein, they are used in a generic and descriptive sense only and not for purposes of limitation.

What is claimed is:

1. A system for registering a user with two or more websites, the system comprising:
  at least one processor configured to:
    (a) receive a request from at least one of the two or more websites to register the user with the two or more websites;
    (b) receive an IP address for a computing device being used by the user;
    (c) after receiving the IP address:
      (1) obtain a location associated with the IP address; and
      (2) identify whether the user is in a jurisdiction that permits the user to register with the two or more websites;
    (d) receive one or more parameters obtained from the user, the one or more parameters comprising characteristics of the user;
    (e) after receiving the one or more parameters:
      (1) verify an age of the user based on at least one of the one or more parameters;
      (2) after verifying the age of the user, determine which of the one or more types of transaction activities the user is permitted to conduct on the two or more websites based on the age of the user;
      (3) query one or more registration attempts across the two or more websites over a predetermined previous time period, the query retrieving one or more parameters associated with the one or more registration attempts, the one or more parameters including at least one or more IP addresses associated with the one or more registration attempts;
(4) identify duplicate or similar parameters, the duplicate or similar parameters being identified by comparing the retrieved one or more parameters associated with the one or more registration attempts with the one or more parameters obtained from the user;
(5) identify duplicate IP addresses, the duplicate IP addresses being identified by comparing the IP addresses associated with the one or more registration attempts to the IP address for the computing device being presently used by the user; and
(6) verify the user's identity based at least on one of the one or more parameters obtained from the user and the IP address for the computing device being presently used by the user; and
(f) after:
(1) not identifying duplicate or similar parameters from (e)(2); and (2) verifying the user's identity from (e)(3), generate a unique user identifier associated with the user, the unique user identifier being configured to identify the user across the two or more websites.

2. The system of claim 1, wherein the processor is further configured to transmit the unique user identifier to the two or more websites.

3. The system of claim 1, wherein the processor is further configured to:
transmit the unique user identifier to the user; and
facilitate creation of a password associated with the unique user identifier.

4. The system of claim 1, wherein the processor is further configured to:
generate a password associated with the unique user identifier; and
transmit the unique user identifier and the password to the user.

5. The system of claim 1, wherein, after not identifying duplicate or similar parameters and verifying the user's identity, the processor is further configured to automatically provide the user with a password along with the unique user identifier so that the user can provide the unique user identifier and the password to the two or more website.

6. The system of claim 1, wherein the at least one processor is configured to:
associate the location with the unique user identifier; and
store the location in the memory.

7. The system of claim 1, wherein the at least one processor is configured to:
associate the one or more parameters with the unique user identifier; and
store the one or more parameters in the memory.

8. The system of claim 1, wherein the at least one processor is configured to, after verifying the user's identity:
associate an identity verification flag with the unique user identifier; and
store the identity verification flag in the memory.

9. The system of claim 1, wherein the one or more parameters comprise one or more of a username, a first name, a last name, an email address, a date-of-birth, a gender, an address, a landline telephone number, a mobile telephone number, a social security number, a driver's license number and state or country of issue, or a device fingerprint of the device being used by the user.

10. A method for registering a user with two or more websites, the method comprising the steps of:
(a) receiving, over a network from at least one of the two or more websites, a request to register the user with the two or more websites;
(b) receiving an IP address for a computing device being used by the user over the network;
(c) after receiving the IP address:
(1) obtaining a location associated with the IP address; and
(2) identify, based on the location by at least one computing device comprising at least one processor, whether the user is in a location which permits registration with the two or more websites;
(d) receiving one or more parameters obtained from the user and sent over the network, the one or more parameters comprising characteristics of the user;
(e) after receiving the one or more parameters:
(1) verifying an age of the user based on at least one of the one or more parameters;
(2) after verifying the age of the user, determining which of the one or more types of transaction activities the user is permitted on the two or more websites based on the age of the user by the at least one processor;
(3) querying one or more registration attempts across the two or more websites over a predetermined previous time period from memory, the querying retrieving one or more parameters associated with the one or more registration attempts, the one or more parameters including at least one or more IP addresses associated with the one or more registration attempts;
(4) identifying duplicate or similar parameters, the duplicate or similar parameters being identified by comparing the retrieved one or more parameters associated with the one or more registration attempts with the one or more parameters obtained from the user by the at least one processor;
(5) identifying duplicate IP addresses, the duplicate IP addresses being identified by comparing the IP addresses associated with the one or more registration attempts to the IP address for the computing device being presently used by the user; and
(6) verifying the user's identity based at least on one of the one or more parameters obtained from the user and the IP address for the computing device being presently used by the user; and
(f) after:
(1) not identifying duplicate or similar parameters during step (e)(3); and (2) verifying the user's identity during step (e)(4), generating a unique user identifier associated with the user, the unique user identifier being configured to identify the user across the two or more websites.

11. The method of claim 10, further comprising the step of transmitting the unique user identifier to the two or more websites.

12. The method of claim 10, further comprising the steps of:
transmitting the unique user identifier to the user; and
facilitating creation of a password associated with the unique user identifier.

13. The method of claim 10, further comprising the steps of:
generating a password associated with the unique user identifier; and
transmitting the unique user identifier and the password to the user.

14. The method of claim 10, further comprising the step of, after not identifying duplicate or similar parameters and verifying the user's identity, automatically providing the user with a password along with the unique user identifier so that the user can provide the unique user identifier and the password to the two or more websites.

15. The method of claim 10, further comprising the steps of:

associating the location with the unique user identifier; and storing the location in the memory.

16. The method of claim 10, further comprising the steps of:

associating the one or more parameters with the unique user identifier; and storing the one or more parameters in the memory.

17. The method of claim 10, further comprising the steps of, after verifying the user's identity:

associating an identity verification flag with the unique user identifier; and storing the identity verification flag in the memory.

18. The method of claim 10, wherein the one or more parameters comprise one or more of a username, a first name, a last name, an email address, a date-of-birth, a gender, an address, a landline telephone number, a mobile telephone number, a social security number, a driver's license number and state or country of issue, and a device fingerprint of the device being used by the user.

19. The system of claim 1, wherein the processor is further configured to transmit the unique user identifier to a party other than the user so as to maintain further communication as between the party other than the user and the user.

20. The method of claim 10, further comprising the step of transmitting the unique user identifier to a party other than the user so as to maintain further communication as between the party other than the user and the user.

* * * * *